United States Patent
Constantz et al.

(10) Patent No.: US 8,333,944 B2
(45) Date of Patent: *Dec. 18, 2012

(54) METHODS OF SEQUESTERING CO2

(75) Inventors: Brent R. Constantz, Portola Valley, CA (US); Andrew Youngs, Antelope, CA (US); Philip Brian Tuet, Milpitas, CA (US); Sidney Omelon, Willowdale (CA); Kasra Farsad, San Jose, CA (US); Ryan J. Gilliam, San Jose, CA (US); Valentin Decker, San Jose, CA (US); Donald W. Kirk, Caledon (CA); J. Douglas Way, Boulder, CO (US); Allen J. Bard, Austin, TX (US); Robert Danziger, Carmel, CA (US); Miguel Fernandez, San Jose, CA (US); Cecily Ryan, San Jose, CA (US)

(73) Assignee: Calera Corporation, Los Gatos, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 12/942,558

(22) Filed: Nov. 9, 2010

(65) Prior Publication Data

US 2011/0059000 A1 Mar. 10, 2011

Related U.S. Application Data

(63) Continuation of application No. 12/344,019, filed on Dec. 24, 2008, now Pat. No. 7,887,694, and a continuation-in-part of application No. PCT/US2008/088242, filed on Dec. 23, 2008, and a continuation-in-part of application No. PCT/US2008/088246, filed on Dec. 23, 2008.

(60) Provisional application No. 61/017,405, filed on Dec. 28, 2007, provisional application No. 61/057,173, filed on May 29, 2008, provisional application No. 61/073,319, filed on Jun. 17, 2008, provisional application No. 61/082,766, filed on Jul. 22, 2008, provisional application No. 61/088,340, filed on Aug. 12, 2008, provisional application No. 61/088,347, filed on Aug. 13, 2008, provisional application No. 61/101,626, filed on Sep. 30, 2008, provisional application No. 61/121,872, filed on Dec. 11, 2008.

(51) Int. Cl.
*B01D 53/62* (2006.01)
*B01D 53/78* (2006.01)

(52) U.S. Cl. ......... 423/225; 423/220; 423/230; 423/234

(58) Field of Classification Search .................. 423/210, 423/220, 225, 230, 234
See application file for complete search history.

(56) References Cited

U.S. PATENT DOCUMENTS 1,169,766 A 2/1916 Brassert
(Continued)

FOREIGN PATENT DOCUMENTS

AU 2001213118 B2 12/2001
(Continued)

OTHER PUBLICATIONS

Various authors, "Calcium Carbonate: From the Cretaceous Period into the 21$^{st}$ Century." Birkhauser Verlag (2001), pp. 1-54. http://books.google.com/books?id=pbkKGa19k5QC&Ipg=PA15&ots=gjUUiWmGIR&dq=vaterite%20limestone&pg=PA54#v=two page&q&f=true—viewed Jul. 14, 2011.*

(Continued)

*Primary Examiner* — Daniel C McCracken
*Assistant Examiner* — Daniel Berns
(74) *Attorney, Agent, or Firm* — Calera Corporation

(57) ABSTRACT

Methods of sequestering carbon dioxide ($CO_2$) are provided. Aspects of the methods include precipitating a storage stable carbon dioxide sequestering product from an alkaline-earthmetal-containing water and then disposing of the product, e.g., by placing the product in a disposal location or using the product as a component of a manufactured composition. Also provided are systems for practicing methods of the invention.

12 Claims, 19 Drawing Sheets

U.S. PATENT DOCUMENTS

| | | |
|---|---|---|
| 1,172,930 A | 2/1916 | Brassert et al. |
| 1,176,747 A | 3/1916 | Ferguson |
| 1,493,579 A | 5/1924 | Walter |
| 1,543,942 A | 6/1925 | Mathesius |
| 1,655,171 A | 1/1928 | Wagner |
| 1,678,345 A | 7/1928 | Mattison |
| 1,759,361 A | 5/1930 | Miller |
| 1,785,365 A | 12/1930 | Seil |
| 1,823,269 A | 9/1931 | Grilli |
| 1,865,833 A | 7/1932 | Chesny |
| 1,897,725 A | 2/1933 | Gaus et al. |
| 1,924,503 A | 8/1933 | Lambert |
| 1,986,736 A | 1/1935 | Mauthe et al. |
| 2,006,295 A | 6/1935 | Chewning et al. |
| 2,054,315 A | 9/1936 | Ebner et al. |
| 2,082,101 A | 6/1937 | Dougherty |
| 2,204,771 A | 6/1940 | Rice et al. |
| 2,227,465 A | 1/1941 | Roche, Jr. et al. |
| 2,241,674 A | 5/1941 | Mohr, Jr. et al. |
| 2,242,294 A | 5/1941 | Fox et al. |
| 2,273,795 A | 2/1942 | Heise et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,606,839 A | 8/1952 | Evans |
| 2,810,450 A | 10/1957 | Hartmann |
| 2,934,419 A | 4/1960 | Cook |
| 2,967,807 A | 1/1961 | Osborne et al. |
| 3,046,152 A | 7/1962 | Tsuneyoshi |
| 3,120,426 A | 2/1964 | Crawford, Jr. |
| 3,165,460 A | 1/1965 | Zang et al. |
| 3,179,579 A | 4/1965 | Gustave et al. |
| 3,196,092 A | 7/1965 | Beer |
| 3,202,522 A | 8/1965 | Chi-Sun Yang et al. |
| 3,222,267 A | 12/1965 | Tirrell et al. |
| 3,262,865 A | 7/1966 | Waters, Jr. |
| 3,264,125 A | 8/1966 | Bourlin et al. |
| 3,322,574 A | 5/1967 | Justi et al. |
| 3,340,003 A | 9/1967 | Judd |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,471,999 A | 10/1969 | Schon |
| 3,511,595 A | 5/1970 | Fuchs |
| 3,511,712 A | 5/1970 | Giner |
| 3,525,675 A | 8/1970 | Gaudin |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,663,379 A | 5/1972 | Kendall |
| 3,686,372 A | 8/1972 | Hiatt et al. |
| 3,721,621 A | 3/1973 | Hough |
| 3,725,267 A | 4/1973 | Gelblum |
| 3,733,788 A | 5/1973 | Crowley |
| 3,816,592 A | 6/1974 | Rinaldi et al. |
| 3,834,129 A | 9/1974 | Darlinger et al. |
| 3,847,632 A | 11/1974 | Blengsli |
| 3,861,928 A | 1/1975 | Slater et al. |
| 3,864,236 A | 2/1975 | Lindstrom |
| 3,904,496 A | 9/1975 | Harke et al. |
| 3,907,526 A | 9/1975 | Saleem et al. |
| 3,912,801 A | 10/1975 | Stephens |
| 3,917,795 A | 11/1975 | Pelczarski et al. |
| 3,925,534 A | 12/1975 | Singleton et al. |
| 3,953,568 A | 4/1976 | Seko et al. |
| 3,959,419 A | 5/1976 | Kitterman |
| 3,963,592 A | 6/1976 | Lindstrom |
| 3,970,528 A | 7/1976 | Zirngiebl et al. |
| 3,975,503 A | 8/1976 | Hauschild et al. |
| 3,997,303 A | 12/1976 | Newton |
| 4,000,991 A | 1/1977 | Melin, Jr. et al. |
| 4,002,721 A | 1/1977 | Guffy et al. |
| 4,026,716 A | 5/1977 | Urschel, III et al. |
| 4,036,749 A | 7/1977 | Anderson |
| 4,045,524 A | 8/1977 | Bornert |
| 4,069,063 A | 1/1978 | Ball |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,117,060 A | 9/1978 | Murray |
| 4,128,462 A | 12/1978 | Ghiringhelli et al. |
| 4,140,510 A | 2/1979 | Scholze et al. |
| 4,147,599 A | 4/1979 | O'Leary et al. |
| 4,157,250 A | 6/1979 | Regehr et al. |
| 4,164,537 A | 8/1979 | Drostholm et al. |
| 4,188,291 A | 2/1980 | Anderson |
| 4,217,186 A | 8/1980 | McRae |
| 4,219,396 A | 8/1980 | Gancy et al. |
| 4,242,185 A | 12/1980 | McRae |
| 4,246,075 A | 1/1981 | Hilbertz |
| 4,253,922 A | 3/1981 | Welch |
| 4,263,021 A | 4/1981 | Downs et al. |
| 4,264,367 A | 4/1981 | Schutz |
| 4,303,549 A | 12/1981 | Boylan |
| 4,307,066 A | 12/1981 | Davidson |
| 4,308,298 A | 12/1981 | Chen |
| 4,312,646 A | 1/1982 | Fattinger et al. |
| 4,315,872 A | 2/1982 | Senjo et al. |
| 4,335,788 A | 6/1982 | Murphey et al. |
| 4,337,230 A | 6/1982 | Ellestad et al. |
| 4,340,572 A | 7/1982 | Ben-Shmuel et al. |
| 4,361,475 A | 11/1982 | Moeglich |
| 4,363,667 A | 12/1982 | Birchall |
| 4,370,307 A | 1/1983 | Judd |
| 4,376,101 A | 3/1983 | Sartori et al. |
| 4,377,554 A | 3/1983 | Johnson |
| 4,410,606 A | 10/1983 | Loutfy et al. |
| 4,432,175 A * | 2/1984 | Smith .................. 52/223.6 |
| 4,450,009 A | 5/1984 | Childs et al. |
| 4,477,573 A | 10/1984 | Taufen |
| 4,508,545 A | 4/1985 | DeLoach |
| 4,561,945 A | 12/1985 | Coker et al. |
| 4,588,443 A | 5/1986 | Bache |
| 4,620,969 A | 11/1986 | Wilkinson |
| 4,634,533 A | 1/1987 | Somerville et al. |
| 4,670,234 A | 6/1987 | Holter et al. |
| 4,716,027 A | 12/1987 | Morrison |
| 4,738,695 A | 4/1988 | Carr et al. |
| 4,804,449 A | 2/1989 | Sweeney |
| 4,818,367 A | 4/1989 | Winkler |
| 4,838,941 A | 6/1989 | Hill |
| 4,852,344 A | 8/1989 | Warner |
| 4,880,447 A | 11/1989 | Bloch |
| 4,899,544 A | 2/1990 | Boyd |
| 4,915,877 A | 4/1990 | Shepherd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,127,765 A | 7/1992 | Millgard et al. |
| 5,141,620 A | 8/1992 | Molter |
| 5,230,734 A | 7/1993 | Kumasaka et al. |
| 5,244,304 A | 9/1993 | Weill et al. |
| 5,246,551 A | 9/1993 | Pletcher et al. |
| 5,275,794 A | 1/1994 | Luna |
| 5,282,935 A | 2/1994 | Cawlfield et al. |
| 5,318,758 A | 6/1994 | Fujii et al. |
| 5,348,712 A | 9/1994 | Marquis et al. |
| 5,362,688 A | 11/1994 | Porta et al. |
| 5,364,611 A | 11/1994 | Iijima et al. |
| 5,366,513 A | 11/1994 | Goldmann et al. |
| 5,376,343 A | 12/1994 | Fouche |
| 5,378,279 A | 1/1995 | Conroy |
| 5,388,456 A | 2/1995 | Kettel |
| 5,427,608 A | 6/1995 | Auer et al. |
| 5,439,509 A | 8/1995 | Spink et al. |
| 5,455,013 A | 10/1995 | Shibata et al. |
| 5,470,671 A | 11/1995 | Fletcher et al. |
| 5,520,898 A | 5/1996 | Pinnavaia et al. |
| 5,531,821 A | 7/1996 | Wu |
| 5,531,865 A | 7/1996 | Cole |
| 5,536,310 A | 7/1996 | Brook et al. |

| Patent | Kind | Date | Inventor | | Patent | Kind | Date | Inventor | |
|---|---|---|---|---|---|---|---|---|---|
| 5,547,027 | A | 8/1996 | Chan et al. | | 6,712,946 | B2 | 3/2004 | Genders et al. | |
| 5,569,558 | A | 10/1996 | Takeuchi et al. | | 6,755,905 | B2 | 6/2004 | Oates et al. | |
| 5,584,923 | A | 12/1996 | Wu | | 6,776,972 | B2 | 8/2004 | Vohra et al. | |
| 5,584,926 | A | 12/1996 | Borgholm et al. | | 6,786,963 | B2 | 9/2004 | Matherly et al. | |
| 5,595,641 | A | 1/1997 | Traini et al. | | 6,841,512 | B1 | 1/2005 | Fetcenko et al. | |
| 5,614,078 | A | 3/1997 | Lubin et al. | | 6,881,256 | B2 | 4/2005 | Orange et al. | |
| 5,618,392 | A | 4/1997 | Furuya | | 6,890,419 | B2 | 5/2005 | Reichman et al. | |
| 5,624,493 | A | 4/1997 | Wagh et al. | | 6,890,497 | B2 | 5/2005 | Rau et al. | |
| 5,690,729 | A | 11/1997 | Jones, Jr. | | 6,908,507 | B2 | 6/2005 | Lalande et al. | |
| 5,702,585 | A | 12/1997 | Hillrichs et al. | | 6,936,573 | B2 | 8/2005 | Wertz et al. | |
| 5,749,930 | A | 5/1998 | Wolf et al. | | 6,938,425 | B2 | 9/2005 | Simpson et al. | |
| 5,766,338 | A | 6/1998 | Weber | | 7,037,434 | B2 | 5/2006 | Myers et al. | |
| 5,766,339 | A | 6/1998 | Babu et al. | | 7,040,400 | B2 | 5/2006 | de Rouffignac et al. | |
| 5,776,328 | A | 7/1998 | Traini et al. | | 7,132,090 | B2 | 11/2006 | Dziedzic et al. | |
| 5,785,868 | A | 7/1998 | Li et al. | | 7,135,604 | B2 | 11/2006 | Ding et al. | |
| 5,792,440 | A | 8/1998 | Huege | | 7,147,692 | B2 | 12/2006 | Fornai et al. | |
| 5,803,894 | A | 9/1998 | Kao et al. | | 7,182,851 | B2 | 2/2007 | Gomez | |
| 5,833,736 | A | 11/1998 | Durham et al. | | 7,198,722 | B2 | 4/2007 | Hussain | |
| 5,846,669 | A | 12/1998 | Smotkin et al. | | 7,255,842 | B1 | 8/2007 | Yeh et al. | |
| 5,849,075 | A | 12/1998 | Hopkins et al. | | 7,261,912 | B2 | 8/2007 | Zeigler | |
| 5,853,686 | A | 12/1998 | Doxsee | | 7,282,189 | B2 | 10/2007 | Zauderer | |
| 5,855,666 | A | 1/1999 | Kao et al. | | 7,285,166 | B2 | 10/2007 | Luke et al. | |
| 5,855,759 | A | 1/1999 | Keating et al. | | 7,314,847 | B1 | 1/2008 | Siriwardane | |
| 5,879,948 | A | 3/1999 | Van Pelt et al. | | 7,347,896 | B2 | 3/2008 | Harrison | |
| 5,885,478 | A | 3/1999 | Montgomery et al. | | 7,390,444 | B2 | 6/2008 | Ramme et al. | |
| 5,897,704 | A | 4/1999 | Baglin | | 7,427,449 | B2 | 9/2008 | Delaney et al. | |
| 5,925,255 | A | 7/1999 | Mukhopadhyay | | 7,440,871 | B2 | 10/2008 | McConnell et al. | |
| 5,958,353 | A | 9/1999 | Eyal | | 7,452,449 | B2 | 11/2008 | Weinberg et al. | |
| 5,965,201 | A | 10/1999 | Jones, Jr. | | 7,455,854 | B2 | 11/2008 | Gower et al. | |
| 5,994,838 | A | 11/1999 | Klinedinst et al. | | 7,459,134 | B2 | 12/2008 | Cadours et al. | |
| 6,024,848 | A | 2/2000 | Dufner et al. | | 7,541,011 | B2 | 6/2009 | Hu | |
| 6,059,974 | A | 5/2000 | Scheurman, III | | 7,595,001 | B2 | 9/2009 | Arakel et al. | |
| 6,071,336 | A | 6/2000 | Fairchild et al. | | 7,597,747 | B1 | 10/2009 | Nagel | |
| 6,080,297 | A | 6/2000 | Ayers | | 7,628,847 | B2 | 12/2009 | Pope et al. | |
| 6,080,320 | A | 6/2000 | von Phul | | 7,674,443 | B1 | 3/2010 | Davis | |
| 6,090,197 | A | 7/2000 | Vivian et al. | | 7,704,369 | B2 | 4/2010 | Olah et al. | |
| 6,129,832 | A | 10/2000 | Fuhr et al. | | 7,704,370 | B2 | 4/2010 | Coustry et al. | |
| 6,139,605 | A | 10/2000 | Carnell et al. | | 7,727,374 | B2 | 6/2010 | Jones | |
| 6,174,507 | B1 | 1/2001 | Wallace et al. | | 7,735,274 | B2 | 6/2010 | Constantz et al. | |
| 6,180,012 | B1 | 1/2001 | Rongved | | 7,736,430 | B2 | 6/2010 | Barron et al. | |
| 6,180,074 | B1 | 1/2001 | Fourcot et al. | | 7,744,761 | B2 | 6/2010 | Constantz et al. | |
| 6,186,426 | B1 | 2/2001 | Killer | | 7,749,476 | B2 | 7/2010 | Constantz et al. | |
| 6,190,428 | B1 | 2/2001 | Rolison et al. | | 7,753,618 | B2 | 7/2010 | Constantz et al. | |
| 6,200,381 | B1 | 3/2001 | Rechichi | | 7,754,169 | B2 * | 7/2010 | Constantz et al. | 423/165 |
| 6,200,543 | B1 | 3/2001 | Allebach et al. | | 7,771,684 | B2 | 8/2010 | Constantz et al. | |
| 6,217,728 | B1 | 4/2001 | Lehmann et al. | | 7,790,012 | B2 | 9/2010 | Kirk et al. | |
| 6,221,225 | B1 | 4/2001 | Mani | | 7,815,880 | B2 | 10/2010 | Constantz et al. | |
| 6,228,145 | B1 | 5/2001 | Falk-Pedersen et al. | | 7,829,053 | B2 | 11/2010 | Constantz et al. | |
| 6,235,186 | B1 | 5/2001 | Tanaka et al. | | 7,842,264 | B2 | 11/2010 | Cooper et al. | |
| 6,248,166 | B1 | 6/2001 | Solsvik | | 7,875,163 | B2 | 1/2011 | Gilliam et al. | |
| 6,251,356 | B1 | 6/2001 | Mathur | | 7,887,694 | B2 | 2/2011 | Constantz et al. | |
| 6,264,736 | B1 | 7/2001 | Knopf et al. | | 7,906,028 | B2 | 3/2011 | Constantz et al. | |
| 6,264,740 | B1 | 7/2001 | McNulty, Jr. | | 7,914,685 | B2 | 3/2011 | Constantz et al. | |
| 6,280,505 | B1 | 8/2001 | Torkildsen et al. | | 7,922,809 | B1 | 4/2011 | Constantz et al. | |
| 6,284,208 | B1 | 9/2001 | Thomassen | | 7,931,809 | B2 | 4/2011 | Constantz et al. | |
| 6,293,731 | B1 | 9/2001 | Studer | | 7,939,336 | B2 | 5/2011 | Constantz et al. | |
| 6,309,570 | B1 | 10/2001 | Fellabaum | | 7,966,250 | B2 | 6/2011 | Constantz et al. | |
| 6,331,207 | B1 | 12/2001 | Gebhardt | | 7,993,500 | B2 | 8/2011 | Gilliam et al. | |
| 6,352,576 | B1 | 3/2002 | Spencer et al. | | 7,993,511 | B2 | 8/2011 | Gilliam et al. | |
| 6,375,825 | B1 | 4/2002 | Mauldin et al. | | 8,006,446 | B2 | 8/2011 | Constantz et al. | |
| 6,387,174 | B2 | 5/2002 | Knopf et al. | | 8,062,418 | B2 | 11/2011 | Constantz et al. | |
| 6,387,212 | B1 | 5/2002 | Christian | | 8,114,214 | B2 | 2/2012 | Constantz et al. | |
| 6,402,831 | B1 | 6/2002 | Sawara et al. | | 2001/0022952 | A1 | 9/2001 | Rau et al. | |
| 6,416,574 | B1 | 7/2002 | Steelhammer et al. | | 2001/0023655 | A1 | 9/2001 | Knopf et al. | |
| 6,428,767 | B1 | 8/2002 | Burch et al. | | 2001/0054253 | A1 | 12/2001 | Takahashi et al. | |
| 6,444,107 | B2 | 9/2002 | Hartel et al. | | 2002/0009410 | A1 | 1/2002 | Mathur | |
| 6,447,437 | B1 | 9/2002 | Lee et al. | | 2002/0127474 | A1 | 9/2002 | Fleischer et al. | |
| 6,468,074 | B1 * | 10/2002 | Wu | 432/103 | 2002/0151017 | A1 | 10/2002 | Stemmer et al. | |
| 6,475,460 | B1 | 11/2002 | Max | | 2002/0155103 | A1 * | 10/2002 | Crippen et al. | 424/125 |
| 6,495,013 | B2 | 12/2002 | Mazur et al. | | 2003/0017088 | A1 | 1/2003 | Downs et al. | |
| 6,517,631 | B1 | 2/2003 | Bland | | 2003/0027023 | A1 | 2/2003 | Dutil et al. | |
| 6,518,217 | B2 | 2/2003 | Xing et al. | | 2003/0123930 | A1 | 7/2003 | Jacobs et al. | |
| 6,537,456 | B2 | 3/2003 | Mukhopadhyay | | 2003/0126899 | A1 | 7/2003 | Wolken | |
| 6,602,630 | B1 | 8/2003 | Gopal | | 2003/0146163 | A1 | 8/2003 | Sasowsky et al. | |
| 6,613,141 | B2 * | 9/2003 | Key, Jr. | 106/751 | 2003/0188668 | A1 | 10/2003 | Bland | |
| 6,620,856 | B1 | 9/2003 | Mortimer et al. | | 2003/0213937 | A1 | 11/2003 | Yaniv | |
| 6,623,555 | B1 | 9/2003 | Haverinen et al. | | 2003/0229572 | A1 | 12/2003 | Raines et al. | |
| 6,638,413 | B2 | 10/2003 | Weinberg et al. | | 2004/0014845 | A1 | 1/2004 | Takamura et al. | |
| 6,648,949 | B1 | 11/2003 | Der et al. | | 2004/0028963 | A1 | 2/2004 | Kormann et al. | |

| | | |
|---|---|---|
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0109927 A1 | 6/2004 | Ang et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0151957 A1 | 8/2004 | Brooks et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031515 A1 | 2/2005 | Charette |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0103234 A1 | 5/2005 | McNulty |
| 2005/0112044 A1 | 5/2005 | Kuma et al. |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0252215 A1 | 11/2005 | Beaumont |
| 2005/0255174 A1 | 11/2005 | Shelley et al. |
| 2006/0039853 A1 | 2/2006 | Fan et al. |
| 2006/0048517 A1 | 3/2006 | Fradette et al. |
| 2006/0051274 A1 | 3/2006 | Wright et al. |
| 2006/0057036 A1 | 3/2006 | Ayala Hermosillo |
| 2006/0060532 A1 | 3/2006 | Davis |
| 2006/0093540 A1 | 5/2006 | Fan et al. |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0186562 A1 | 8/2006 | Wright et al. |
| 2006/0189837 A1 | 8/2006 | Forrester |
| 2006/0195002 A1 | 8/2006 | Grandjean et al. |
| 2006/0196836 A1 | 9/2006 | Arakel et al. |
| 2006/0245993 A1 | 11/2006 | Magumbe et al. |
| 2006/0249380 A1 | 11/2006 | Gestermann et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0084344 A1 | 4/2007 | Moriya et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0184394 A1 | 8/2007 | Comrie |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0233616 A1 | 10/2007 | Richards et al. |
| 2007/0240570 A1 | 10/2007 | Jadhav et al. |
| 2007/0251393 A1 | 11/2007 | Pope et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0035036 A1 | 2/2008 | Bassani et al. |
| 2008/0059206 A1 | 3/2008 | Jenkins |
| 2008/0099122 A1 | 5/2008 | Andersen et al. |
| 2008/0104858 A1 | 5/2008 | Carin et al. |
| 2008/0112868 A1 | 5/2008 | Blencoe et al. |
| 2008/0134891 A1 | 6/2008 | Jarvenpaa |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0213146 A1 | 9/2008 | Zauderer |
| 2008/0223727 A1 | 9/2008 | Oloman et al. |
| 2008/0233029 A1 | 9/2008 | Fan et al. |
| 2008/0236143 A1 | 10/2008 | Lo |
| 2008/0241337 A1 | 10/2008 | Durand et al. |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0276803 A1 | 11/2008 | Molaison et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0078162 A1 | 3/2009 | Clausi et al. |
| 2009/0081092 A1 | 3/2009 | Yang et al. |
| 2009/0081093 A1 | 3/2009 | Comrie |
| 2009/0081096 A1 | 3/2009 | Pellegrin |
| 2009/0081112 A1 | 3/2009 | Virtanen |
| 2009/0090277 A1 | 4/2009 | Joshi et al. |
| 2009/0101008 A1 | 4/2009 | Lackner et al. |
| 2009/0107038 A1 | 4/2009 | Wan |
| 2009/0117019 A1 | 5/2009 | Comrie |
| 2009/0120288 A1 | 5/2009 | Lackner |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0037653 A1 | 2/2010 | Enis et al. |
| 2010/0051859 A1 | 3/2010 | House et al. |
| 2010/0063902 A1 | 3/2010 | Constantz et al. |
| 2010/0068109 A1 | 3/2010 | Comrie |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0089142 A1 | 4/2010 | Sukhija et al. |
| 2010/0111810 A1 | 5/2010 | Constantz et al. |
| 2010/0116683 A1 | 5/2010 | Gilliam |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |

| | | | | | | |
|---|---|---|---|---|---|---|
| 2010/0239467 A1 | 9/2010 | Constantz et al. | JP | 63-312988 A2 | 12/1988 | |
| 2010/0239487 A1 | 9/2010 | Constantz et al. | JP | 03-170363 A | 7/1991 | |
| 2010/0247410 A1 | 9/2010 | Constantz et al. | JP | 04-190829 | 7/1992 | |
| 2010/0258035 A1 | 10/2010 | Constantz et al. | JP | 04-317721 A | 11/1992 | |
| 2010/0258506 A1 | 10/2010 | Berkowitz et al. | JP | 7061842 A | 3/1995 | |
| 2010/0276299 A1 | 11/2010 | Kelly et al. | JP | 10-287461 | * 10/1998 | |
| 2010/0290967 A1 | 11/2010 | Detournay et al. | JP | 10287461 | 10/1998 | |
| 2010/0313793 A1 | 12/2010 | Constantz et al. | JP | 2000226402 A | 10/1998 | |
| 2010/0313794 A1 | 12/2010 | Constantz et al. | JP | 03-020491 A2 | 11/1998 | |
| 2010/0319586 A1 | 12/2010 | Blount et al. | JP | 10305212 A | 11/1998 | |
| 2010/0326328 A1 | 12/2010 | Constantz et al. | JP | 03184892 B2 | 7/2001 | |
| 2011/0030586 A1 | 2/2011 | Constantz et al. | JP | 2002-273163 A | 9/2002 | |
| 2011/0030957 A1 | 2/2011 | Constantz et al. | JP | 2003041388 | 2/2003 | |
| 2011/0033239 A1 | 2/2011 | Constantz et al. | JP | 2004-174370 | 6/2004 | |
| 2011/0035154 A1 | 2/2011 | Kendall et al. | JP | 2005-052762 | 3/2005 | |
| 2011/0036728 A1 | 2/2011 | Farsad et al. | JP | 2006-076825 | 3/2006 | |
| 2011/0042230 A1 | 2/2011 | Gilliam et al. | JP | 2009279530 A | 12/2009 | |
| 2011/0054084 A1 | 3/2011 | Constantz et al. | NL | 7607470 A | 1/1978 | |
| 2011/0067600 A1 | 3/2011 | Constantz et al. | RU | 1819854 A1 | 6/1993 | |
| 2011/0067603 A1 | 3/2011 | Constantz et al. | WO | WO 93/16216 A1 | 8/1993 | |
| 2011/0067605 A1 | 3/2011 | Constantz et al. | WO | WO 94/18119 | 8/1994 | |
| 2011/0071309 A1 | 3/2011 | Constantz et al. | WO | WO 96/34997 A1 | 11/1996 | |
| 2011/0079515 A1 | 4/2011 | Gilliam et al. | WO | WO 99/13967 A1 | 3/1999 | |
| 2011/0083968 A1 | 4/2011 | Gilliam et al. | WO | WO 01/07365 A1 | 2/2001 | |
| 2011/0091366 A1 | 4/2011 | Kendall et al. | WO | WO 01/96243 A1 | 12/2001 | |
| 2011/0091955 A1 | 4/2011 | Constantz et al. | WO | WO 02/00551 A2 | 1/2002 | |
| 2011/0132234 A1 | 6/2011 | Constantz et al. | WO | WO 02/085788 A1 | 10/2002 | |
| 2011/0147227 A1 | 6/2011 | Gilliam et al. | WO | WO 03/008071 A1 | 1/2003 | |
| 2011/0203489 A1 | 8/2011 | Constantz et al. | WO | WO 03/054508 A2 | 7/2003 | |
| 2011/0226989 A9 | 9/2011 | Seeker et al. | WO | WO 03/068685 A1 | 8/2003 | |
| 2011/0240916 A1 | 10/2011 | Constantz et al. | WO | WO 2004/041731 A1 | 5/2004 | |
| 2011/0247336 A9 | 10/2011 | Farsad et al. | WO | WO 2004/094043 A2 | 11/2004 | |
| 2011/0277474 A1 | 11/2011 | Constantz et al. | WO | WO 2004/098740 A2 | 11/2004 | |
| 2011/0277670 A1 | 11/2011 | Self et al. | WO | WO 2005/028379 A1 | 3/2005 | |
| | | | WO | WO 2005/078836 A2 | 8/2005 | |
| FOREIGN PATENT DOCUMENTS | | | WO | WO 2005/086843 A2 | 9/2005 | |
| | | | WO | WO 2005/108297 A2 | 11/2005 | |
| AU | 2007100157 A4 | 4/2007 | WO | WO 2006/009600 A2 | 1/2006 | |
| AU | 2007201171 A1 | 10/2007 | WO | WO 2006/032797 | 3/2006 | |
| AU | 2007101174 A4 | 1/2008 | WO | WO 2006/034339 A1 | 3/2006 | |
| AU | 2008256636 B2 | 12/2008 | WO | WO 2006/036396 A2 | 4/2006 | |
| AU | 2008101140 A4 | 1/2009 | WO | WO 2006/094968 A1 | 9/2006 | |
| CA | 1303822 C | 6/1988 | WO | WO 2006/099599 A2 | 9/2006 | |
| CA | 1335974 A1 | 6/1995 | WO | WO 2006/113997 A1 | 11/2006 | |
| CA | 2308224 C | 4/1999 | WO | WO 2006/134080 A1 | 12/2006 | |
| CA | 2255287 A1 | 6/2000 | WO | WO 2007/003013 A1 | 1/2007 | |
| CA | 2353830 A1 | 6/2000 | WO | WO 2007/016271 A2 | 2/2007 | |
| CA | 2440325 A1 | 1/2003 | WO | WO 2007/022595 A1 | 3/2007 | |
| CA | 2646462 | 9/2007 | WO | WO 2007/060149 A1 | 5/2007 | |
| CA | 2617325 A1 | 11/2007 | WO | WO 2007/069902 A1 | 6/2007 | |
| CA | 2682952 A1 | 10/2008 | WO | WO 2007/071633 A1 | 6/2007 | |
| CA | 2659447 A1 | 12/2008 | WO | WO 2007/082505 A2 | 7/2007 | |
| CN | 101219330 A | 7/2008 | WO | WO 2007/094691 A1 | 8/2007 | |
| CN | 101289200 A | 10/2008 | WO | WO 2007/096671 A1 | 8/2007 | |
| DE | 2653649 A1 | 6/1978 | WO | WO 2007/106372 A2 | 9/2007 | |
| DE | 3146326 A1 | 6/1983 | WO | WO 2007/106883 A2 | 9/2007 | |
| DE | 3638317 A1 | 6/1987 | WO | WO 2007/123917 A2 | 11/2007 | |
| DE | 19512163 A1 | 10/1995 | WO | WO 2007/139392 A1 | 12/2007 | |
| DE | 19523324 A1 | 3/1996 | WO | WO 2007/140544 A1 | 12/2007 | |
| DE | 19631794 A1 | 8/1997 | WO | WO 2007/142945 A2 | 12/2007 | |
| EP | 0522382 A1 | 1/1993 | WO | WO 2008/018928 A2 | 2/2008 | |
| EP | 0487102 B1 | 8/1995 | WO | WO 2008/026201 A1 | 3/2008 | |
| EP | 0591350 B1 | 11/1996 | WO | WO 2008/031834 A1 | 3/2008 | |
| EP | 0628339 B1 | 9/1999 | WO | WO 2008/061305 A1 | 5/2008 | |
| EP | 0844905 B1 | 3/2000 | WO | WO 2008/068322 A1 | 6/2008 | |
| EP | 1379469 B1 | 3/2006 | WO | WO 2008/089523 A1 | 7/2008 | |
| EP | 1650162 A1 | 4/2006 | WO | WO 2008/095057 A2 | 8/2008 | |
| EP | 1716911 A1 | 11/2006 | WO | WO 2008/101293 A1 | 8/2008 | |
| EP | 1554031 B1 | 12/2006 | WO | WO 2008/108657 A1 | 9/2008 | |
| EP | 1571105 B1 | 12/2007 | WO | WO 2008/115662 A2 | 9/2008 | |
| EP | 2253600 A1 | 11/2010 | WO | WO 2008/124538 A1 | 10/2008 | |
| GB | 911386 A | 11/1962 | WO | WO 2008/140821 A1 | 11/2008 | |
| GB | 1392907 | 5/1975 | WO | WO 2008/142017 A2 | 11/2008 | |
| GB | 2032441 | 5/1980 | WO | WO 2008/142025 A2 | 11/2008 | |
| GB | 2050325 A | 1/1981 | WO | WO 2008/148055 A1 | 12/2008 | |
| GB | 2208163 A | 3/1989 | WO | WO 2008/151060 A1 | 12/2008 | |
| GB | 2210035 A | 6/1989 | WO | WO 2009/006295 A2 | 1/2009 | |
| GB | 2371810 A | 8/2002 | WO | WO 2009/024826 A1 | 2/2009 | |
| JP | 51102357 A1 | 9/1976 | WO | WO 2009/032331 A2 | 3/2009 | |
| JP | 59100280 | 6/1984 | | | | |

| | | |
|---|---|---|
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/102816 A2 | 8/2009 |
| WO | WO 2009/102817 A2 | 8/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 9/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

Metz, "IPCC special report on carbon dioxide capture and storage." Cambridge Univ. Press, 2005, p. 324. http://books.google.com/books?id=HWgRvPUgyvQC&dq=serpentine+olivine+close+by+cement+plant&source=gbs_navlinks_s—viewed Jul. 15, 2011.*

U.S. Appl. No. 60/921,598, filed Apr. 3, 2007, Little et al.

Aker, "Aker Clean Carbon, Carbon Capture Solutions Provider" Aker Clean Carbon Presentation for UN's IPCC; Jan. 24, 2008; 8pp.

Alexander, G. et al., "Evaluation of reaction variables in the dissolution of serpentine for mineral carbonation"; Elsevier; ScienceDirect Fuel 86 (2007) 273-281.

Allen, L.M. 1992. Boron and Sulfur Isotopic Fractionation in the Coal Combustion System. A Thesis Submitted to the Faculty of the Department of Hydrology and Water Resources. The University of Arizona.

Avery, G.B. et al. 2006. Carbon isotopic characterization of dissolved organic carbon in rainwater: Terrestrial and marine influences. *Science Direct.* 40(39): 7539-7545. Retrieved from the internet on May 20, 2010.

Back, M. et al.,"Reactivity of Alkaline Lignite Fly Ashes Towards CO in Water." Environmental Science & Technology. vol. 42, No. 12 (2008) pp. 4520-4526.

Baer, D.S., et al. 2002. Sensitive absorption measurements in the near-infrared region using off-axis integrated-cavity-output spectroscopy. *Appl. Phys. B.* 5 pages.

Bauer, C.F., et al. 1981. Identification and Quantitation of Carbonate Compounds in Coal Fly Ash. *American Chemical Society.* 15(7): 783-788.

Berg et al., "A 3-Hydroxyproprionate/ 4-Hydroxybutyrate Autotrophic Carbon Dioxide Assimilation Pathway in Archea"; Science Dec. 14, 2007; vol. 318, No. 5857 DOI 10.1126/science 1149976; pp. 1782-1786.

Biello, D. Cement from CO2: A Concrete Cure for Global Warming? *Scientific American* Aug. 7, 2008., pp. 1-3 [online] [retrieved on Dec. 29, 2009] <URL: http://www.scientificamerican.com/article.cfm>.

Biennier, L., et al. 2004. Multiplex integrated cavity output spectroscopy of cold PAH cations. *Chemical Physics Letters.* 387: 287-294.

"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.

Bommaraju, T.V. et al. 2001. Brine Electrolysis. <http://electrochem.cwru.edu/encycl/art-b01-brine.htm>. Retrieved on Oct. 6, 2010. pp. 1-25.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

Bottomley, D.J. et al. 1999. The origin and evolution of Canadian Shield brines: evaporation or freezing of seawater? New lithium isotope and geochemical evidence from the Slave craton. *Chemical Geology.* 155: 295-320.

Cannell, M.G.R. 2003. "Carbon sequestration and biomass energy offset: theoretical, potential and achievable capacities globally, in Europe and the UK." Biomass and Bioenergy. 24: 97-116.

Carbon Sequestration. National Energy Technology Laboratory, Jul. 1, 2008, (online) [retrieved on Dec. 12, 2009] <URL: http://web.archive.org/web/20080701213124/http://www.netl.doe.gov/technologies/carbon_seq/index.html>.

Cerling, T.E. 1984. The stable isotopic composition of modern soil carbonate and its relationship to climate. *Earth and Planetary Science Letters.* 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

CICCS "Aims and Research"; www.nottingham.ac.uk/carbonmanagement/ccs_aims.php 2pp Aug. 3, 2007.

Criss, R.E. 1995. Stable Isotope Distribution: Variations from Temperature, Organic and Water-Rock Interactions. Washington University, St. Louis, Department of Earch and Planetary Sciences. *American Geophysical Union.* pp. 292-307.

Dickens, A. et al. 2004. Reburial of fossil organic carbon in marine sediments. *Nature.* 427: 336-339. Retrieved from the internet on May 20, 2010.

Druckenmiller, M. et al., "Carbon sequestration using brine of adjusted pH to form mineral carbonates"; Elsevier; www.elsevier.com/locate/fuproc; Fuel Processing Technology 86 (2005) 1599-1614.

Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

"Electrochemical cell", Wikipedia (2009), http:en.wikipedia.org/wiki/Electrochemical_Cell, Nov. 24, 2009, 5 pp.

Elswick, E.R., et al. 2007. Sulfur and carbon isotope geochemistry of coal and derived coal-combustion by-products: An example from an Eastern Kentucky mine and power plant. *Applied Geochemistry.* 22: 2065-2077.

EURODIA. Bipolar Membrane Electrodialysis. Available online as of 2001.; visited Oct. 6, 2010, at http://www.eurodia.com/html/eb.html.

Fallick, A.E., et al. 1991. A Stable Isotope Study of the Magnesite Deposits Associated with the Alpine-Type Ultramafic Rocks of Yugoslavia. *Economic Geology.* 86: 847-861.

Faure, et al. 1963. The Isotopic Composition of Strontium in Oceanic and Continental Basalts: Application to the Origin of Igneous Rocks. *Journal of Petrology.* 4(1): 31-50. (abstract only). Http://petrology.oxfordjournals.org/cgi/content/abstract/4/1/31 (retrieved on Jun. 1, 2010).

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research.* 70(3): 565-585.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Gillery et al. Bipolar membrane electrodialysis: the time has finally come! Presented 16th Intl. Forum on Appl. Electrochem; Cleaner Tech.-Challenges and Solutions. Nov. 10-14, 2002. Amelia Island Plantation, FL. 4 pages. Retrieved form the Internet on Aug. 14, 2009. http://www.ameridia.com/html.ebc.html.

Goldberg et al. Jun. 2009. "CO2 Mineral Sequestration Studies in US"; National Energy Technology Laboratory; goldberg@netl.doe.gov; 10pp.

Golden, D.C., et al. 2001. A Simple Inorganic Process for Formation of Carbonates, Magnetite, and Sulfides in Martian Meteorite ALH84001. *American Mineralogist.* 86: 370-375.

Graff "Just Catch—CO2 Capture Technology" Aker Kvaermer; Pareto Clean Energy Tech Seminar Oct. 11, 2007 25pp.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hassan, A.M. et al. 1989. Corrosion Resistant Materials for Seawater RO Plants. *Desalination.* 74: 157-170.

Hill et al. Mar. 18, 2006. "Preliminary Investigation of Carbon Sequestration Potential in Brine from Pennsylvania's Oriskany Sandstone Formation in Indiana County, PA"; The Energy Institute and the Department of Energy & Geo-Environmental Engineering. College of Engineering Research Symposium, Session 3C. 16pp.

Holdgate, G.R., et al. 2009. Eocene-Miocene carbon-isotope and floral record from brown coal seams in the Gippsland Basin of southeast Australia. *Global and Planetary Change.* 65: 89-103.

Holze, S. et al. 1994. Hydrogen Consuming Anodes for Energy Saving in Sodium Sulphate Electrolysis. *Chem. Eng. Technol.* 17: 382-389.

Horkel, K., et al. 2009. Stable isotopic composition of cryptocrystalline magnesite from deposits in Turkey and Austria. *Geophysical Research Abstracts.* 11. (abstract only).

Horner, G. et al. 2004. Isotope selective analysis of CO2 with tunable diode laser (TDL) spectroscopy in the NIR. *The Analyst.* 129: 772-778.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huijgen, W.J.J., et al. 2005. Mineral CO2 Sequestration by Steel Slag Carbonation. *Environ. Sci. Technol.* 39: 9676-9682.

Huijgen, W.J.J., et al. 2006. Energy Consumption and Net CO2 Sequestration of Aqueous Mineral Carbonation. *Ind. Eng. Chem. Res.* 45: 9184-9194.

Huntzinger, D.N. et al. 2009. A life-cycle assessment of Portland cement manufacturing: comparing the traditional process with alternative technologies. *Journal of Cleaner Production.* 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Jan. 20, 2009 of PCT/US2007/010032.

International Search Report dated Feb. 19, 2009 of PCT/US08/88242.

International Search Report dated Mar. 3, 2010 of EP08867440.3.

International Search Report dated May 6, 2010 of EP09716193.9.

International Search Report dated Jun. 22, 2010 of EP08772151.0.

International Search Report dated Jul. 29, 2010 of EP08873036.1.

International Search Report dated Mar. 11, 2009 of PCT/US2008/088318.

International Search Report dated Mar. 11, 2009 of PCT/US2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.

International Search Report dated Dec. 14, 2009 of PCT/US09/061748.

International Search Report dated Jan. 4, 2010 of PCT/US09/062795.

International Search Report dated Jan. 13, 2010 of PCT/US09/059135.

International Search Report dated Jul. 7, 2010 of PCT/US10/026880.

International Search Report dated Jul. 9, 2010 of PCT/US10/025970.

International Search Report dated Feb. 2, 2010 of PCT/US09/059141.

International Search Report dated Feb. 24, 2010 of PCT/US09/067764.

International Search Report dated Mar. 10, 2010 of PCT/US10/022935.

International Search Report dated May 21, 2010 of PCT/US09/064117.

International Search Report dated Sep. 13, 2010 of PCT/US10/035041.

"Isotopic Signature", Wikipedia (2010), http://en.wikipedia.org/wiki/Isotopic_signature, Apr. 14, 2009, 3 pp.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Lackner, K. "Carbonate Chemistry for Sequestering Fossil Carbon"; Annual Review Energy Environ. 2002 27:193-232.

Lackner, K.S. et al. "Carbon Dioxide Disposal in Carbonate Minerals." Energy. 1995. 20(11): 1153-1170.

Levy, D. "Burnt biomass causes short-term global cooling, long-term warming." http://news-service.stanford.edu/news/2004/august4/biomass-84.html. 3 pages.

Li, et al., "Using Electrolytic Method to Promote CO2 Sequestration in Serpentine by Mineral Carbonation," Journal of China University of Mining and Technology, 26(6), pp. 817-821 (2007).

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

Lopez-Capel, E. et al. 2005. Application of simultaneous thermal analysis mass spectrometry and stable carbon isotope analysis in a carbon sequestration study. *Rapid Communications in Mass Spectrometry.* 19: 3192-3198.

Mazrou, S., et al. 1997. Sodium hydroxide and hydrochloric acid generation from sodium chloride and rock salt by electro-electrodialysis. *Journal of Applied Electrochemistry* 27: 558-567.

McCrea, J.M. 1950. On the Isotopic Chemistry of Carbonates and a Paleotemperature Scale. *The Journal of Chemical Physics.* 18(6): 849-857.

Melezhik, V.A., et al. 2001. Palaeproterozoic magnesite: lithological and isotopic evidence for playa/sabkha environments. *Sedimentology.* 48: 379-397.

Mihalcea, R.M., et al. 1998. Diode-laser absorption measurements of CO2 near 2.0 μm at elevated temperatures. *Applied Optics.* 37(36): 8341-8347.

Miljevic, N., et al. 2007. Potential Use of Environmental Isotopes in Pollutant Migration Studies. *Environmental Isotopes in Pollutant Studies.* 58: 251-262.

Montes-Hernandez, G. et al.,"Mineral sequestration of CO2 by aqueous carbonation of coal combustion fly-ash." Journal of Hazardous Materials vol. 161 (2009). pp. 1347-1354.

Mook, W.G., et al. 1968. Isotopic Equilibrium between Shells and Their Environment. *Science.* 159(3817): 874-875.

Mook, W.G., et al. 1974. Carbon Isotope Fractionation Between Dissolved Bicarbonate and Gaseous Carbon Dioxide. 22:169-176.

Mottana, A. et al. 1979. Der grosse Mineralienfuhrer, BLV Verlagsgese11schaft mbH, Munchen, XP002577921, p. 194. (In German with English Translation).

Nayak, V.S. "Nonelectrolytic Production of Caustic Soda and Hydrochloric Acid from Sodium Chloride"; Ind. Eng. Chem. Res. 1996. 35: 3808-3811.

Noda, H., et al. 1990. Electrochemical Reduction of Carbon Dioxide at Various Metal Electrodes in Aqueous Potassium Hydrogen Carbonate Solution. *The Chemical Society of Japan.* 63: 2459-2462.

O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, (May 2001) 12pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

O'Neil, J.R., et al. 1971. C13 and O18 compositions in some freshwater carbonates associated with ultramafic rocks and serpentines: western United States*. *Geochimica et Cosmochimica Acta.* 35: 687-697.

Park, A., et al. 2004. CO2 mineral sequestration: physically activated dissolution of serpentine and pH swing process. *Chemical Engineering Science* 59 (22-23): 5241-5247.

Philp, R.P. 2007. The emergence of stable isotopes in environmental and forensic geochemistry studies: a review. *Environ Chem Lett.* 5:57-66.

Portier et al. 2005. Modeling CO2 solubility in pure water and NaCl-type waters from 0 to 300° C. and from 1 to 300 bar Application to the Utsira Formation at Sleipner. *Chemical Geology.* 217: 187-199.

Power, I.M., et al. 2007. Biologically induced mineralization of dypingite by cyanobacteria from an alkaline wetland near Atlin, British Columbia, Canada. *Geochemical Transactions.* 8: 16 pages.

Quay, P.D., et al. 1992. Oceanic Uptake of Fossil Fuel CO$_2$$: Carbon—13 Evidence. *Science.* 256 (5053): 74-79.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. *Energy Conversion and Management.* 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Saad, N. et al. 2009. Measurement of Isotopic CO2 in Dissolved Inorganic Carbons of Water Samples from Various Origins Using Wavelength-Scanned Cavity Ring-Down Spectrophotometer. *Geophysical Research Abstracts.* 11. (abstract only).

Sadhwani et al., "Case Studies on environmental impact of seawater desalination" Science Direct; http.//www.sciencedirect.com/science?_ob=ArticleURL&_udi=B6TFX-4HMX97J-3&_u . . . 3pp.

Sample, J.C. et al. 1995. Isotope Geochemistry of Syntectonic Carbonate Cements and Veins from the Oregon Margin: Implications for the Hydrogelogic Evolution of the Accretionary Wedge. *Proceedings of the Ocean Drilling Program, Scientific Results.* 146: 137-148.

Sakata, M. 1987. Movement and Neutralization of Alkaline Leachate at Coal Ash Disposal Sites. *Environ. Sci. Technol.* 21(8): 771-777.

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Schwab, E. 2004. Calciumhydroxid, XP-002577920. Retrieved from the Internet: <URL:http://www.roempp.com/prod/index1.html> (In German with English Translation).

Schouten, S., et al. 2004. Stable Carbon Isotopic Fractionations Associated with Inorganic Carbon Fixation by Anaerobic Ammonium-Oxidizing Bacteria. *Applied and Environmental Microbiology.* 70(6): 3785-3788.

Schroll, E. 2002. Genesis of magnesite deposits in the view of isotope geochemistry. *Boletim Paranaense de Geociencias.* 50: 59-68.

Sheppard, S.M.F., et al. 1970. Fractionation of Carbon and Oxygen Isotopes and Magnesium between Coexisting Metamorphic Calcite and Dolomite. *Contr. Mineral. And Petrol.* 26. 161-198.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Sethi, S. et al. 2006. Existing & Emerging Concentrate Minimization & Disposal Practices for Membrane Systems. *Florida Water Resources Journal.* pp. 38, 40, 42, 44, 46, 48.

Shell Global Solutions, 2003. "ADIP-X and Sulfinol-X—new regenerable acid-gas removal processes"; Shell Global Solutions International; OG 130210370903-En(A); www.shellglobalsoultions.com 2 pp (presented at the 12th International Oil, Gas, and Petrochemicals Congress, Tehran, Iran Feb. 24-26, 2003).

Sial, A.N., et al. 2000. Carbon isotope fluctuations in Precambrian carbonate sequences of several localities in Brazil. *An. Acad. Bras. Ci.* 72(4): 539-558.

Socolow, R. 1997. Fuels Decarbonization and Carbon Sequestration: Report of a Workshop. Center for Energy and Environmental Studies School of Engineering and Applied Science. Princeton University, Princeton, NJ.

Soong, Y. et al. 2004. Experimental and simulation studies on mineral trapping of CO2 with brine. *Energy Conversion and Management.* 45: 1845-1859.

Stanley, S.M., et al. 2002. Low-magnesium calcite produced by coralline algae in seawater of Late Cretaceous composition. *PNAS.* 99(24): 15323-15326.

TECECO PTY Ltd, "Eco-Cement"; www.tececo.com/simple.ecocement.php; Dec. 29, 2008; 6pp.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/126,776, filed May 23, 2008, Constantz, Brent R., et al, Non-Final Office Action dated Feb. 25, 2010; 21 pp.

U.S. Appl. No. 12/163,205, filed Jun. 27, 2008, Constantz, Brent R., et al, Non-Final Office Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/163,205, filed Jun. 27, 2008, Constantz, Brent R., et al, Non-Final Office Action dated Mar. 25, 2010.

U.S. Appl. No. 12/700,129, filed Feb. 4, 2010, Constantz, Brent R., et al, Non-Final Office Action dated Oct. 20, 2010.

U.S. Appl. No. 12/700,193, filed Feb. 4, 2010, Constantz, Brent R., et al, Non-Final Office Action dated Oct. 20, 2010.

U.S. Appl. No. 12/344,019, filed Dec. 24, 2008, Constantz, Brent R., et al, Non-Final Office Action dated Nov. 16, 2009.

U.S. Appl. No. 12/344,019, filed Dec. 24, 2008, Constantz, Brent R., et al, Non-Final Office Action dated Mar. 11, 2010.

U.S. Appl. No. 12/344,019, filed Dec. 24, 2008, Constantz, Brent R., et al, Non-Final Office Action dated Jul. 14, 2010.

U.S. Appl. No. 12/698,741, filed Feb. 2, 2010, Constantz, Brent R., et al, Non-Final Office Action dated Sep. 28, 2010.

U.S. Appl. No. 12/698,802, filed Feb. 2, 2010, Constantz, Brent R., et al, Non-Final Office Action dated Sep. 29, 2010.

U.S. Appl. No. 12/698,483, filed Feb. 2, 2010, Constantz, Brent R., et al, Non-Final Office Action dated Sep. 28, 2010.

U.S. Appl. No. 12/375,632, filed Mar. 5, 2009, Kirk, Donald W. et al, Non-Final Office Action dated Mar. 19, 2010.

U.S. Appl. No. 12/375,632, filed Mar. 5, 2009, Kirk, Donald W. et al, Non-Final Office Action dated Sep. 8, 2009.

U.S. Appl. No. 12/475,378, filed May 29, 2009, Constantz Brent. et al, Final Office Action dated May 5, 2010.

U.S. Appl. No. 12/475,378, filed May 29, 2009, Constantz Brent. et al, Non-Final Office Action dated Mar. 17, 2010.

U.S. Appl. No. 12/475,378, filed May 29, 2009, Constantz Brent. et al, Non-Final Office Action dated Mar. 2, 2010.

U.S. Appl. No. 12/794,198, filed Jun. 4, 2010, Constantz Brent. et al, Non-Final Office Action dated Nov. 4, 2010.

U.S. Appli. No. 12/486,692, filed Jun. 17, 2009, Constantz Brent. et al, Final Office Action dated May 3, 2010.

U.S. Appl. No. 12/486,692, filed Jun. 17, 2009, Constantz Brent. et al, Non-Final Office Action dated Mar. 23, 2010.

U.S. Appl. No. 12/486,692, filed Jun. 17, 2009, Constantz Brent. et al, Non-Final Office Action dated Mar. 1, 2010.

U.S. Appl. No. 12/501,217, filed Jul. 10, 2009, Constantz Brent. et al, Non-Final Office Action dated Mar. 12, 2010.

U.S. Appl. No. 12/557,492, filed Sep. 10, 2009, Constantz, Brent R., et al. Final Office Action dated Sep. 16, 2010.

U.S. Appl. No. 12/557,492, filed Sep. 10, 2009, Constantz, Brent R., et al. Non-Final Office Action dated May 6, 2010.

U.S. Appl. No. 12/604,383, filed Oct. 22, 2009, Constantz Brent R. et al, Non-Final Office Action dated Apr. 5, 2010.

U.S. Appl. No. 12/604,383, filed Oct. 22, 2009, Constantz Brent R. et al, Final Office Action dated Jun. 11, 2010.

U.S. Appl. No. 12/571,398, filed Sep. 30, 2009, Constantz Brent R. et al, Non-Final Office Action dated May 3, 2010.

U.S. Appl. No. 12/826,209, filed Jun. 29, 2010, Constantz Brent R. et al, Non-Final Office Action dated Nov. 5, 2010.

U.S. Appl. No. 12/609,491, filed Oct. 30, 2009, Constantz Brent. et al, Non-Final Office Action dated Mar. 31, 2010.

U.S. Appl. No. 12/609,491, filed Oct. 30, 2009, Constantz Brent. et al, Final Office Action dated Jul. 16, 2010.

U.S. Appl. No. 12/790,317, filed May 28, 2010, Constantz Brent. et al, Non-Final Office Action dated Aug. 17, 2010.

U.S. Appl. No. 12/571,400, filed Sep. 30, 2009, Constantz, Brent. et al, Office Action dated Jul. 26, 2010.

U.S. Appl. No. 12/571,400, filed Sep. 30, 2009, Constantz, Brent. et al, Final Office Action dated Nov. 2, 2010.

U.S. Appl. No. 12/521,256, filed Mar. 5, 2010, Gilliam, Ryan et al, Office Action dated Jul. 28, 2010.

U.S. Appl. No. 12/226,632, filed Sep. 9, 2009, House, Kurt Z. et al, Final Office Action dated Oct. 13, 2010.

U.S. Appl. No. 12/541,055, filed Aug. 13, 2009, Gilliam, Ryan J. et al, Office Action dated Jul. 22, 2010.

U.S. Appl. No. 12/617,005, filed Nov. 12, 2009, Gilliam, Ryan J. et al, Office Action dated Oct. 5, 2010.

Vagin, S.P., et al. 1979. Measurement of the Temperature of Gas Media Containing Carbon Dioxide by the Laser-Probing Method. *Plenum*.

Wang, W., et al. 2005. Effects of biodegradation on the carbon isotopic composition of natural gas—A case study in the bamianhe oil field of the Jiyang Depression, Eastern China. *Geochemical Journal*. 39(4): 301-309. (abstract) [online] [retrieved on Dec. 29, 2009] <URL: http://www/jstage.jst.go.jp/article/geochemj/39/4/39_301/_article> ab.

Webber, M.E., et al. 2001. In situ combustion measurements of CO2 by use of a distributed-feedback diode-laser sensor near 2.0 μm. *Applied Optics*. 40(6): 821-828.

Wen-Zhi et al., "Using Electrolytic Method to Promote CO2 Sequestration in Serpentine by Mineral Carbonation"; Journal of China University of Mining and Technology; vol. 36, No. 6; Nov. 2007 (Publication and English Translation).

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc.* 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL:.http://www.anl.gov/PCS/acsfuel/preprint%20archive/Files/33_1_TORONTO_06-88_0114.PDF>.

Wright, L.L., et al. 1993. "U.S. Carbon Offset Potential Using Biomass Energy Systems." Water, Air, and Soil Pollution. 70: 483-497.

Zedef, V., et al. 2000. Genesis of Vein Stockwork and Sedimentary Magnesite and Hydromagnesite Deposits in the Ultramafic Terranes of Southwestern Turkey: A Stable Isotype Study. 95: 429-446.

Zhang, C.L. et al. 2001. Temperature-dependent oxygen and carbon isotope fractionations of biogenic siderite. *Geochimica et Cosmochimica Acta*. 65(14): 2257-2271.

Bagotsky, V.S. 2006. Conductive Polymers: Polymers with Ionic Functions. *Fundamentals of Electrochemistry*. Second Edition. New Jersey: John Wiley & Sons. pp. 454-455.

Bradfield, D.L. 1984. Conventional Uranium Processing: The Yeelirrie Uranium Project. *Practical Hydromet '83—7th Annual Symposium on Uranium and Precious Metals*. pp. 39-47. Lakewood, CO.

Gregerson, J. 1999. Conquering Corrosion (in concrete). *Building Design & Construction*. 40(8): 50.

Hein, J.R. et al. 2006. Methanogen c calc te, $^{13}C$-depleted b valve shells, and gas hydrate from a mud volcano offshore southern Cal forn a. *Geological Society of America*. 34(2): 109-112.

Horii, Y. et al. 2007. Novel evidence for natural formation of dioxins in ball clay. *Chemosphere*. 70: 1280-1289.

International Search Report dated Mar. 21, 2011 of EP10739828.1.
International Search Report dated Mar. 25, 2011 of EP10739829.9.
International Search Report dated Mar. 25, 2011 of EP10737735.0.
International Search Report dated Mar. 4, 2011 of EP10737736.8.
International Search Report dated Dec. 14, 2010 of EP09812408.4.
International Search Report dated Jan. 4, 2011 of EP09818485.6.

Jensen, P. et al. 1992. 'Bubbling reefs' in the Kattegat: submarine landscapes of carbonate-cemented rocks support a diverse ecosystem at methane seeps. *Marine Ecology Progress Series*. 83: 103-112.

Merritt, R.C. 1971. Carbonate Leaching. The Extractive Metallurgy of Uranium: pp. 82-97. Colorado School of Mines Research Institute. Prepared Under Contract with the United States Atomic Energy Commission.

Perkins, S. 2004. Sea Change: Carbon Dioxide Imperils Marine Ecosystems. *Science News.* 166(3): 35.

Shaffer, R. 2008. A Devlish Green Angel. *Fast Company.* N127: 92-97.

Skrzypek, G. et al. 2006. $\delta^{13}C$ analyses of calcium carbonate: comparison between the GasBench and elemental analyzer techniques. *Rapid Communications in Mass Spectrometry.* 20:2915-2920.

Technology for Commercialization of Slag. 1995. *New Technology Japan.* ISSN: 0385-6542. p. 35.

Constantz, B. 2009. The Risk of Implementing New Regulations on Game-Changing Technology: Sequestering CO2 in the Built Environment. AGU, 92(22), Jt. Assem, Suppl., Abstract.

Eldorado Beaverlodge Operation. 1960. *Canadian Mining Journal.* 81(6): 111-138.

International Search Report dated Apr. 13, 2011 of PCT/US10/57821.

International Search Report dated Apr. 6, 2011 of EP10192919.8.

International Search Report dated May 18, 2011 of EP09812407.6.

International Search Report dated Apr. 19, 2011 of PCT/US2010/059835.

Jones. 1996. Principles and Prevention of Corrosion. Second Edition. Lebanon, Indiana: Prentice Hall. pp. 50-52.

Kostowskyj et al. 2008. Silver nanowire catalysts for alkaline fuel cells. *International Journal of Hydrogen Energy.* 33: 5773-5778.

Eloneva et al., "Fixation of CO2 by carbonating calcium derived from blast furnace slag" Energy (2008) 33, pp. 1461-1467.

\* cited by examiner

US 8,333,944 B2

METHODS OF SEQUESTERING CO2

CROSS-REFERENCE TO RELATED APPLICATIONS

This application is a continuation of U.S. patent application Ser. No. 12/344,019, filed on Dec. 24, 2008, which pursuant to 35 U.S.C. §119(e), claims priority to U.S. Provisional Patent Application Ser. No. 61/017,405 filed on Dec. 28, 2007; U.S. Provisional Patent Application Ser. No. 61/057,173 filed on May 29, 2008; U.S. Provisional Patent Application 61/073,319 filed on Jun. 17, 2008; U.S. Provisional Patent Application 61/082,766 filed on Jul. 22, 2008; U.S. Provisional Patent Application Ser. No. 61/088,340 filed on Aug. 12, 2008; U.S. Provisional Patent Application Ser. No. 61/088,347 filed on Aug. 13, 2008; U.S. Provisional Patent Application Ser. No. 61/101,626 filed on Sep. 30, 2008; and U.S. Provisional Patent Application No. 61/121,872 filed on Dec. 11, 2008; and which pursuant to 35 U.S.C. §120, claims priority to PCT Application No. PCT/US08/88242 entitled "Low-Energy Electrochemical Hydroxide System and Method," filed on Dec. 23, 2008, and PCT Application No. PCT/US08/88246 entitled "Low-Energy Electrochemical Proton Transfer System and Method," filed on Dec. 23, 2008; the disclosures of all of which applications are incorporated herein by reference in their entirety.

INTRODUCTION

Carbon dioxide ($CO_2$) emissions have been identified as a major contributor to the phenomenon of global warming and ocean acidification. $CO_2$ is a by-product of combustion and it creates operational, economic, and environmental problems. It is expected that elevated atmospheric concentrations of $CO_2$ and other greenhouse gases will facilitate greater storage of heat within the atmosphere leading to enhanced surface temperatures and rapid climate change. $CO_2$ has also been interacting with the oceans driving down the pH toward 8.0 from 8.2. $CO_2$ monitoring has shown atmospheric $CO_2$ has risen from approximately 280 ppm in the 1950s to approximately 380 pmm today, and is expect to exceed 400 ppm in the next decade. The impact of climate change will likely be economically expensive and environmentally hazardous. Reducing potential risks of climate change will require sequestration of atmospheric $CO_2$.

Many types of industrial plants (such as cement refineries, steel mills and power plants) combust various carbon-based fuels, such as fossil fuels and syngases. Fossil fuels that are employed include coal, natural gas, oil, used tires, municipal waste, petroleum coke and biofuels. Fuels are also derived from tar sands, oil shale, coal liquids, and coal gasification and biofuels that are made via syngas. $CO_2$ concentrations in the exhaust gases of various fuels vary from a few % to nearly pure $CO_2$. Cement plants are a major source of $CO_2$ emissions, from both the burning of fossil fuels and the $CO_2$ released from calcination which changes limestone, shale and other ingredients to Portland cement. Similarly, power plants which utilize combustion of carbon-based fuels to generate electricity are also a major source of $CO_2$ emissions. Many industrial plants also produce several other pollutants including NOx, SOx, VOCx, particulates and mercury, in addition to wasted heat. Furthermore, many industrial plants can produce materials such as cement kiln dust from a cement production plant or ash from coal-fired power plants, that must sometimes be disposed in hazardous material landfill sites.

Methods proposed to separate $CO_2$ from flue gas, contain it and store $CO_2$ include storage in geological formations, injection into the deep-ocean, and uptake by phytoplankton via fertilization of the ocean. The limited capacity and duration, expense, and environmental outcomes of these methods are largely unresolved and may prohibit their utility.

SUMMARY

Methods of sequestering carbon dioxide ($CO_2$) are provided. Aspects of the methods include precipitating a storage stable carbon dioxide sequestering product from an alkaline-earth-metal-containing water and then disposing of the product, e.g., by placing the product in a disposal location or using the product as a component of a manufactured item, such as a building material. Also provided are systems for practicing methods of the invention.

RELEVANT CHEMICAL REACTIONS

Figure 1:
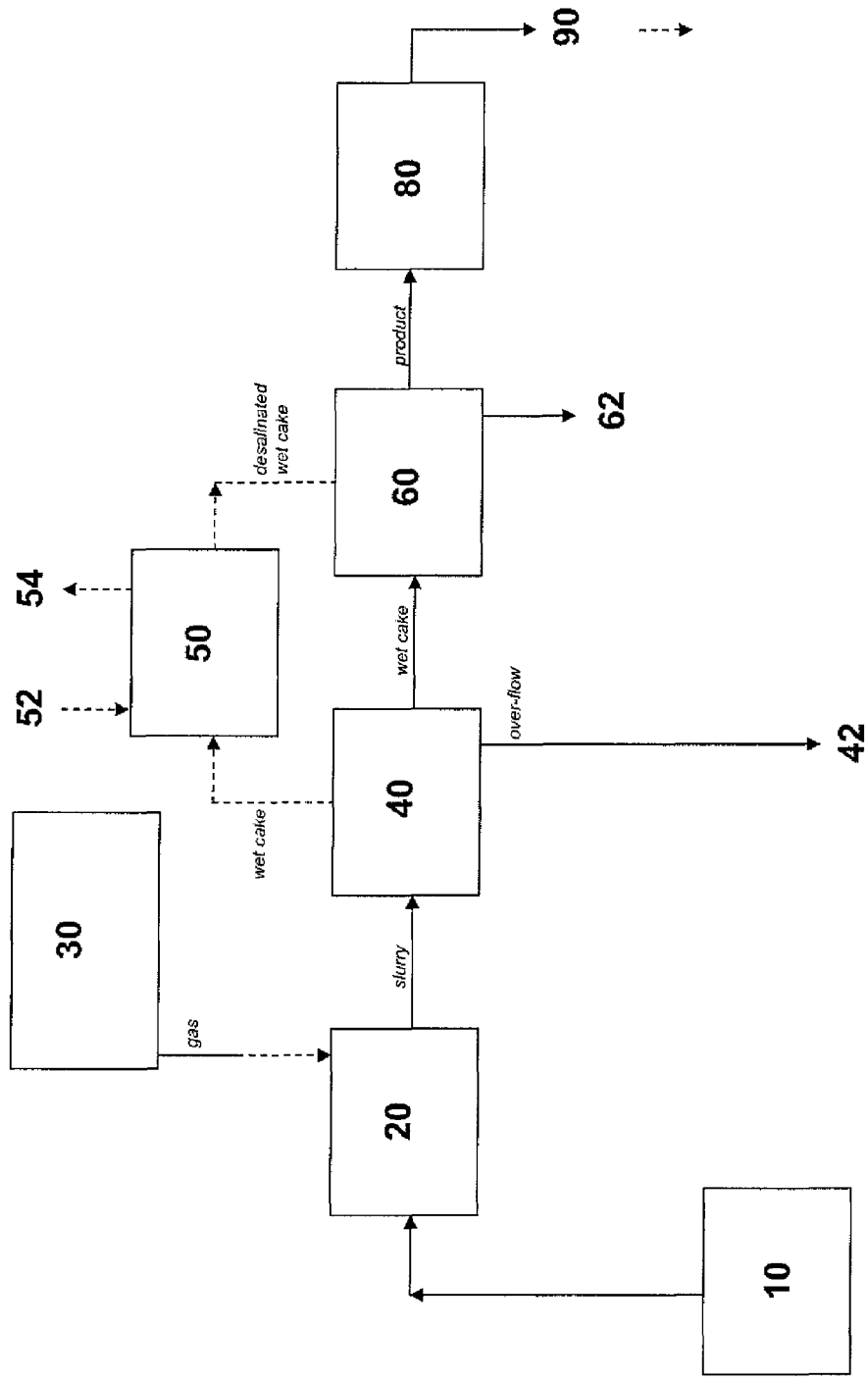
FIG. 1 provides a schematic diagram of a $CO_2$ sequestration method according to one embodiment of the invention.

The methods and systems of the invention utilize processes summarized by the following chemical reactions:

(1) Combustion of a carbon-containing fuel source in liquid, gas, or solid phase forms gaseous carbon dioxide:

(2) Contacting the source of carbon dioxide with a water source solvates the carbon dioxide to give an aqueous solution of carbon dioxide:

(3) Carbon dioxide dissolved in water establishes equilibrium with aqueous carbonic acid:

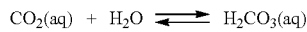

(4) Carbonic acid is a weak acid which dissociates in two steps, where the equilibrium balance is determined in part by the pH of the solution, with, generally, pHs below 8-9 favoring bicarbonate formation and pHs above 9-10 favoring carbonate formation. In the second step, a hydroxide source may be added to increase alkalinity:

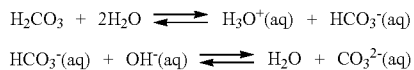

Reaction of elemental metal cations from Group IIA with the carbonate anion forms a metal carbonate precipitate:

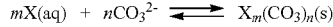

wherein X is any element or combination of elements that can chemically bond with a carbonate group or its multiple and m and n are stoichiometric positive integers.

DETAILED DESCRIPTION

Methods of sequestering carbon dioxide ($CO_2$) are provided. Aspects of the methods include precipitating a storage stable carbon dioxide sequestering product from an alkaline-earth-metal-containing water and then disposing of the product, e.g., by placing the product in a disposal location or using the product as a component of a manufactured item, such as a building material. Also provided are systems for practicing methods of the invention.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing the subject invention, the methods of $CO_2$ sequestration according to embodiments of the invention are described first in greater detail. Next systems that find use in practicing various embodiments of the methods of the invention are reviewed.

Methods of $CO_2$ Sequestration

As reviewed above, the invention provides methods of $CO_2$ sequestration. By "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$ producing a storage stable carbon dioxide sequestering product from an amount of $CO_2$, such that the $CO_2$ from which the product is produced is then sequestered in that product. The storage stable $CO_2$ sequestering product is a storage stable composition that incorporates an amount of $CO_2$ into a storage stable form, such as an above-ground storage or underwater storage stable form, so that the $CO_2$ is no longer present as, or available to be, a gas in the atmosphere. As such, sequestering of $CO_2$ according to methods of the invention results in prevention of $CO_2$ gas from entering the atmosphere and allows for long term storage of $CO_2$ in a manner such that $CO_2$ does not become part of the atmosphere.

Embodiments of methods of the invention are negative carbon footprint methods. By "negative carbon footprint" is meant that the amount by weight of $CO_2$ that is sequestered (e.g., through conversion of $CO_2$ to carbonate) by practice of the methods is greater that the amount of $CO_2$ that is generated (e.g., through power production, base production, etc) to practice the methods. In some instances, the amount by weight of $CO_2$ that is sequestered by practicing the methods exceeds the amount by weight of $CO_2$ that is generated in practicing the methods by 1 to 100%, such as 5 to 100%, including 10 to 95%, 10 to 90%, 10 to 80%, 10 to 70%, 10 to 60%, 10 to 50%, 10 to 40%, 10 to 30%, 10 to 20%, 20 to 95%, 20 to 90%, 20 to 80%, 20 to 70%, 20 to 60%, 20 to 50%, 20 to 40%, 20 to 30%, 30 to 95%, 30 to 90%, 30 to 80%, 30 to 70%, 30 to 60%, 30 to 50%, 30 to 40%, 40 to 95%, 40 to 90%, 40 to 80%, 40 to 70%, 40 to 60%, 40 to 50%, 50 to 95%, 50 to 90%, 50 to 80%, 50 to 70%, 50 to 60%, 60 to 95%, 60 to 90%, 60 to 80%, 60 to 70%, 70 to 95%, 70 to 90%, 70 to 80%, 80 to 95%, 80 to 90%, and 90 to 95%, In some instances, the amount by weight of $CO_2$ that is sequestered by practicing the methods exceeds the amount by weight of $CO_2$ that is generated in practicing the methods by 5% or more, by 10% or more, by 15% or more, by 20% or more, by 30% or more, by 40% or more, by 50% or more, by 60% or more, by 70% or more, by 80% or more, by 90% or more, by 95% or more.

As summarized above, the methods of invention produce a precipitated storage stable carbon dioxide sequestering product, such that the carbon dioxide is sequestered in a "storage stable form". By "storage stable form" is meant a form of matter that can be stored, for example above ground or underwater, under exposed conditions (for example, open to the atmosphere, underwater environment, etc.), without significant, if any, degradation for extended durations, e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or 100,000,000 years or longer, or 1,000,000,000 years or longer. As the storage stable form undergoes little if any degradation while stored above ground under normal rain water pH, the amount of degradation if any as measured in terms of $CO_2$ gas release from the product will not exceed 5%/year, and in certain embodiments will not exceed 1%/year or 0.001% per year. The above-ground storage stable forms are storage stable under a variety of different environment conditions, e.g., from temperatures ranging from –100° to 600° C., humidity ranging from 0% to 100% where the conditions may be calm, windy or stormy. In some instances, the storage stable product is employed as a component of a manufactured item, such as a building material, e.g., component of a cement or concrete. In these embodiments, the product is still a storage stable $CO_2$ sequestering product, as use of the product in the manufactured item (such as building material) does not result in release of $CO_2$ from the product. In certain embodiments, the carbonate compounds of the precipitate when combined with portland cement may dissolve and combine with compounds of the portland cement, without releasing $CO_2$.

The amount of carbon present in storage stable carbon dioxide sequestering products produced by methods of the invention may vary. In some instances, the amount of carbon that is present in the precipitated product (as determined by using protocols described in greater detail below, such as isotopic analysis, e.g., $^{13}C$ isotopic analysis) in the product ranges from 1% to 15% (w/w), such as 5 to 15% (w/w), and including 5 to 14% (w/w), 5 to 13% (w/w), 6 to 14% (w/w), 6 to 12% (w/w), and 7 to 12% (w/w). Where the method employed to produce the precipitated product includes contacting a water with a source of $CO_2$ (for example as described in greater detail below), a substantial amount of the carbon may be carbon that originated (as determined by protocols described in greater detail below) in the source of $CO_2$. By substantial amount is meant that 10 to 100%, such as 50 to 100% and including 90 to 100% of the carbon present in the storage stable carbon dioxide sequestering product is from the carbon dioxide source (such as a carbon dioxide containing gaseous stream). In some instances, the amount of carbon present in the product that is traceable to the carbon dioxide source is 50% or more, 60% or more, 70% or more, 80% or more, 90% or more, 95% or more, 99% or more, including 100%.

In certain embodiments, the $CO_2$ sequestering product can store about 50 tons or more of $CO_2$, such as about 100 tons or more of $CO_2$, including 150 tons or more of $CO_2$, for instance about 200 tons or more of $CO_2$, such as about 250 tons or more of $CO_2$, including about 300 tons or more of $CO_2$, such as about 350 tons or more of $CO_2$, including 400 tons or more of $CO_2$, for instance about 450 tons or more of $CO_2$, such as about 500 tons or more of $CO_2$, including about 550 tons or more of $CO_2$, such as about 600 tons or more of $CO_2$, including 650 tons or more of $CO_2$, for instance about 700 tons or more of $CO_2$, for every 1000 tons of $CO_2$ sequestering product, e.g., a material to be used in the built environment such as cement or aggregate, produced. Thus, in certain embodiments, the $CO_2$ sequestering product comprises about 5% or more of $CO_2$, such as about 10% or more of $CO_2$, including about 25% or more of $CO_2$, for instance about 50% or more of $CO_2$, such as about 75% or more of $CO_2$, including about 90% or more of $CO_2$.

Storage stable $CO_2$ sequestering products produced by methods of the invention may include carbonate compounds that, upon combination with fresh water, dissolve and produce different minerals that are more stable in fresh water than compounds of the initial precipitate product composition. (Although the compounds of the initial precipitate product composition may dissolve upon combination with freshwater and then produce different components, $CO_2$ gas is not liberated in significant amounts, or in some cases at all, in any such reaction). The compounds of the initial precipitate product composition may be ones that are more stable in salt water than they are in freshwater, such that they may be viewed as saltwater metastable compounds. The amount of carbonate in the product, as determined by coulometry using the protocol described in coulometric titration, is 40% or higher, such as 70% or higher, including 80% or higher.

The storage stable precipitated product may include one or more different carbonate compounds, such as two or more different carbonate compounds, e.g., three or more different carbonate compounds, five or more different carbonate compounds, etc., including non-distinct, amorphous carbonate compounds. Carbonate compounds of precipitated products of the invention may be compounds having a molecular formulation $X_m(CO_3)_n$ where X is any element or combination of elements that can chemically bond with a carbonate group or its multiple, wherein X is in certain embodiments an alkaline earth metal (elements found in column IIA of the periodic table of elements) and not an alkali metal (elements found in column IA of the periodic table of elements); wherein m and n are stoichiometric positive integers. These carbonate compounds may have a molecular formula of $X_m(CO_3)_n \cdot H_2O$, where there are one or more structural waters in the molecular formula.

The carbonate compounds may be amorphous or crystalline. The particular mineral profile, i.e., the identity of the different types of different carbonate minerals and the amounts of each, in the carbonate compound composition may vary and will be dependent on the particular nature of the water source from which it is derived, as well as the particular conditions employed to derive it.

As indicated above, in some embodiments of the invention, the carbonate compounds of the compositions are metastable carbonate compounds that are more stable in saltwater than in freshwater, such that upon contact with fresh water of any pH they dissolve and reprecipitate into other fresh water stable minerals. In certain embodiments, the carbonate compounds are present as small particles, e.g., with particle sizes ranging from 0.1 microns to 100 microns, e.g., 1 to 100 microns, or 10 to 100 microns, or 50 to 100 microns, in some embodiments 0.5 to 10 microns, as determined by Scanning electron microscopy. In some embodiments, the particle sizes exhibit a bimodal or multi-modal distribution. In certain embodiments, the particles have a high surface are, e.g., ranging from 0.5 to 100 $m^2/gm$, 0.5 to 50 $m^2/gm$, such as from 0.5 to 2.0 $m^2/gm$, as determined by Brauner, Emmit, & Teller (BET) Surface Area Analysis. In some embodiments, the $CO_2$ sequestering products produced by methods of the invention may include rod-shaped crystals and amorphous solids. The rod-shaped crystals may vary in structure, and in certain embodiments have length to diameter ratio ranging from 500 to 1, such as 10 to 1. In certain embodiments, the length of the crystals ranges from 0.5 µm to 500 µm, such as from 5 µm to 100 µm. In yet other embodiments, substantially completely amorphous solids are produced.

The carbonate compounds of the precipitated products may include a number of different cations, such as but not limited to: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3 \cdot nH_2O$). Magnesium carbonate minerals of interest include, but are not limited to magnesite (Mg $CO_3$), barringtonite (Mg $CO_3 \cdot 2H_2O$), nesquehonite (Mg $CO_3 \cdot 3H_2O$), lanfordite ($MgCO_3 \cdot 5H_2O$), hydromagnisite, and amorphous magnesium calcium carbonate ($MgCO_3 \cdot nH_2O$). Calcium magnesium carbonate minerals of interest include, but are not limited to dolomite ($CaMgCO_3$), huntitte ($CaMg(CO_3)_4$) and sergeevite ($Ca_2Mg_{11}(CO_3)_{13} \cdot H_2O$). The carbon compounds of the product may include one or more waters of hydration, or may be anhydrous.

In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the precipitate ranges from 1.5-5 to 1, such as 2-4 to 1 including 2-3 to 1.

In some instances, the precipitated product may include hydroxides, such as divalent metal ion hydroxides, e.g., calcium and/or magnesium hydroxides. The principal calcium hydroxide mineral of interest is portlandite $Ca(OH)_2$, and amorphous hydrated analogs thereof. The principal magnesium hydroxide mineral of interest is brucite $Mg(OH)_2$, and amorphous hydrated analogs thereof.

As the precipitated products are derived from an alkaline-earth-metal-ion-containing water source, they will include one or more components that are present in the water source from which they are precipitated and identify the compositions that come from the water source, where these identifying components and the amounts thereof are collectively referred to herein as a water source identifier. For example, if the water source is sea water, identifying compounds that may be present in carbonate compound compositions include, but are not limited to: chloride, sodium, sulfur, potassium, bromide, silicon, strontium and the like. Any such source-identifying or "marker" elements are generally present in small amounts, e.g., in amounts of 20,000 ppm or less, such as amounts of 2000 ppm or less. In certain embodiments, the "marker" compound is strontium, which may be present in the precipitate incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The water source identifier of the compositions may vary depending on the particular water source, e.g., saltwater employed to produce the water-derived carbonate composition. In certain embodiments, the calcium carbonate content of the precipitate is 25% w/w or higher, such as 40% w/w or higher, and including 50% w/w or higher, e.g., 60% w/w. The carbonate compound composition has, in certain embodiments, a calcium/magnesium ratio that is influenced by, and therefore reflects, the water source from which it has been precipitated. In certain embodiments, the calcium/magnesium molar ratio ranges from 10/1 to 1/5 Ca/Mg, such as 5/1 to 1/3 Ca/Mg. In certain embodiments, the carbonate composition is characterized by having a water source identifying carbonate to hydroxide compound ratio, where in certain embodiments this ratio ranges from 100 to 1, such as 10 to 1 and including 1 to 1.

In methods of the invention, an alkaline-earth-metal-ion-containing water is subjected to carbonate compound precipitation conditions to produce the precipitated storage stable carbon dioxide sequestering product. The alkaline-earth-metal-ion-containing water may vary depending on the particular method of sequestration that is to be performed. One type of water of interest is saltwater. The term "saltwater" is employed in its conventional sense to refer a number of different types of aqueous fluids other than fresh water, where the term "saltwater" includes brackish water, sea water and brine (including man-made brines, such as geothermal plant wastewaters, desalination waste waters, etc, as well as natural brines such as surface brines found in bodies of water on the surface of the earth and deep brines, found underneath the earth), as well as other salines having a salinity that is greater than that of freshwater. The term "brine" refers to water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt. The saltwater source from which the carbonate mineral composition of the cements of the invention is derived may be a naturally occurring source, such as a sea, ocean, lake, swamp, estuary, lagoon, deep brine, alkaline lakes, inland seas, etc., or a man-made source.

Another type of water that may be employed in methods of the invention is freshwater. Any suitable freshwater source may be used, including sources ranging from relatively free of minerals to sources rich in minerals. Freshwater sources of interest include mineral rich freshwater sources. Mineral rich freshwater sources of interest may be naturally occurring, such as hard waters or lakes or inland seas, for example alkaline lakes or inland seas (such as Lake Van in Turkey) which may provide a source of alkalinity for removal of protons and/or pH shift and/or a source of minerals to be precipitated with the $CO_2$; such lakes are described further elsewhere herein. Mineral rich freshwater sources of interest may also be man-made, e.g., by producing a mineral rich water from a soft water. For example, a mineral poor (soft) water may be contacted with a source of desired ions, such as a calcium and/or magnesium ion source, to produce a mineral rich water that is suitable for use methods of the invention.

As indicated above, the alkaline-earth-metal-containing water employed in methods of the invention may be a water that is obtained from naturally occurring sources. Alternatively, the water may be one that prepared from an initial water, for example by adding one or more minerals to the water. As such, some methods include preparing the alkaline-earth-metal containing water from an initial water by adding to the initial water a source of one or more divalent metal ions, such as magnesium, calcium, etc. Sources of magnesium ions include, but are not limited, magnesium hydroxides, magnesium oxides, etc. sources of calcium ions include, but are not limited to, calcium hydroxides, calcium oxides, etc. Both naturally occurring and man-made sources of such ions may be employed. Specific naturally occurring sources of such ions include, but are not limited to: mafic minerals, such as olivine, serpentine, periodotite, talc, etc., and the like. Addition of supplementary magnesium (Mg) ions to the source water, e.g., seawater, prior to precipitation increases yields of precipitate as well as affects the composition of precipitate, providing a means for increasing $CO_2$ sequestration by utilizing minerals such as, but not limited to, Olivine, Serpentine and $Mg(OH)_2$ (Brucite). The particular Mg ion source may be naturally occurring or man-made sources, and may be pure with respect to the Mg mineral or impure, e.g., be a composition made up of the Mg mineral of interest and other minerals and components.

In some methods of the invention, the water (such as salt water or mineral rich water) is not contacted with a source of $CO_2$ prior to subjecting the water to precipitation conditions. In these methods, the water will have an amount of $CO_2$ associated with it, e.g., in the form of bicarbonate ion, which has been obtained from the environment to which the water has been exposed prior to practice of the method. Subjecting the water to precipitate conditions of the invention results in conversion of this $CO_2$ into a storage stable precipitate, and therefore sequestration of the $CO_2$. When the water subject to processes of the invention is again exposed to its natural environment, such as the atmosphere, more $CO_2$ from the atmosphere will be taken up by the water resulting in a net removal of $CO_2$ from the atmosphere and incorporation of a corresponding amount of $CO_2$ into a storage stable product, where the mineral rich freshwater source may be contacted with a source of $CO_2$, e.g., as described in greater detail below. Embodiments of these methods may be viewed as methods of sequestering $CO_2$ gas directly from the Earth's atmosphere. Embodiments of the methods are efficient for the removal of $CO_2$ from the Earth's atmosphere. For example, embodiments of the methods are configured to remove $CO_2$ from saltwater at a rate of 0.025 M or more, such as 0.05 M or more, including 0.1 M or more per gallon of saltwater.

It will be appreciated by those of skill in the art that, although industrial waste gas offers a relatively concentrated source of $CO_2$, the methods and systems of the invention are also applicable to removing $CO_2$ from less concentrated sources, e.g., atmospheric air, which contains a much lower concentration of $CO_2$ than, e.g., flue gas. Thus, in some embodiments the methods and systems of the invention encompass decreasing the concentration of $CO_2$ in atmospheric air by producing a stable precipitate, using the procedures outlined herein. In these cases the concentration of $CO_2$ in the atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in atmospheric $CO_2$ may be accomplished with yields as described herein, or with lower yields, and may be accomplished in one precipitation step or in a series of precipitation steps.

In some embodiments, a source of $CO_2$ is contacted with an alkaline-earth-metal containing water at some point during the method, such as before, during or even after the water has been subjected to precipitation conditions of the invention. The source of $CO_2$ that is contacted with the alkaline-earth-metal-ion containing water in these embodiments may be any convenient $CO_2$ source. The $CO_2$ source may be a liquid, solid (e.g., dry ice), a supercritical fluid, or gaseous $CO_2$ source.

In certain embodiments, the $CO_2$ source is a gaseous $CO_2$ source. This gaseous $CO_2$ source is, in certain instances, a waste feed from an industrial plant. The nature of the industrial plant may vary in these embodiments, where industrial plants of interest include power plants, chemical processing plants, mechanical processing plants, refineries, cement plants, steel plants, and other industrial plants that produce $CO_2$ as a byproduct of fuel combustion or other processing step (such as calcination by a cement plant). By waste feed is meant a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the subject methods include both reducing, e.g., syngas, shifted syngas, natural gas, and hydrogen and the like, and oxidizing condition streams, e.g., flue gases from combustion. Particular multi-component gaseous streams of interest that may be treated according to the subject invention include: oxygen containing combustion industrial plant flue gas, turbo charged boiler product gas, coal gasification product gas, shifted coal gasification product gas, anaerobic digester product gas, wellhead natural gas stream, reformed natural gas or methane hydrates and the like.

A variety of different gaseous waste streams may be treated according to methods of the invention in order to sequester $CO_2$. Gaseous waste streams of interest have, in certain embodiments, $CO_2$ present in amounts of 200 ppm to 1,000, 000 ppm, such as 200,000 ppm to 1000 ppm and including 200,000 ppm to 2000 ppm, for example 130,000 ppm to 2000 ppm. The waste streams may include one or more additional components, e.g., water, NOx (mononitrogen oxides; NO and $NO_2$), SOx (monosulfur oxides; SO, $SO_2$ and $SO_3$), VOC (Volatile organic compounds), mercury and particulates (particulate matter, particles of solid or liquid suspended in a gas).

The waste streams may be produced from a variety of different types of industrial plants. Of interest in certain embodiments are waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants. Of interest in certain embodiments are waste streams produced by power plants that combust syngas, i.e., gas that is produced by the gasification of organic matter, e.g., coal, biomass, etc., where in certain embodiments such plants are integrated gasification combined cycle (IGCC) plants. Of interest in certain embodiments are waste streams produced by Heat Recovery Steam Generator (HRSG) plants.

In some embodiments of the invention substantially 100% of the $CO_2$ contained in a flue gas from a power plant is sequestered as a stable mineral; this may be done in a single precipitation step or in multiple precipitation steps, and may further involve other processes for sequestering $CO_2$, e.g., as the concentration of $CO_2$ is decreased in the flue gas, more energy-intensive processes that be prohibitive in energy consumption for removing all of the original $CO_2$ in the gas may become practical in removing the final $CO_2$ in the gas. Thus, in some embodiments, the gas entering the power plant (ordinary atmospheric air) may contain a concentration of $CO_2$ that is greater than the concentration of $CO_2$ in the flue gas exiting the plant that has been treated by the processes and systems of the invention. Hence, in some embodiments, the methods and systems of the invention encompass a method comprising supplying a gas, e.g., atmospheric air, to a power plant, where the gas comprises $CO_2$; treating the gas in the power plant, e.g., by combustion of fossil fuel to consume $O_2$ and to produce $CO_2$ then treating exhaust gas to remove $CO_2$; and releasing gas from the power plant, where the gas released from the power plant has a lower $CO_2$ content than the gas supplied to the power plant. In some embodiments, the gas released from the power plant contains at least 10% less $CO_2$, or at least 20% less $CO_2$, or at least 30% less $CO_2$, or at least 40% less $CO_2$, or at least 50% less CO2, or at least 60% less $CO_2$, or at least 70% less $CO_2$, or at least 80% less $CO_2$, or at least 90% less $CO_2$, or at least 95% less $CO_2$, or at least 99% less $CO_2$, or at least 99.5% less $CO_2$, or at least 99.9% less $CO_2$, than the gas entering the power plant; in some embodiments the gas entering the power plant is atmospheric air and the gas exiting the power plant is treated flue gas.

Waste streams of interest also include waste streams produced by cement plants. Cement plants whose waste streams may be employed in methods of the invention include both wet process and dry process plants, which plants may employ shaft kilns or rotary kilns, and may include pre-calciners. Each of these types of industrial plants may burn a single fuel, or may burn two or more fuels sequentially or simultaneously.

A waste stream of interest is industrial plant exhaust gas, e.g., a flue gas. By "flue gas" is meant a gas that is obtained from the products of combustion from burning a fossil or biomass fuel that are then directed to the smokestack, also known as the flue of an industrial plant. In addition to $CO_2$ generated by the burning of fuels, $CO_2$ can also be released as a result of other industrial processing (e.g., calcination of minerals in a cement plant). The composition of the flue gas may vary. In certain embodiments, the amount of $CO_2$ in the flue gas may range from 350 ppm to 400,000 ppm, such as 2000 ppm to 200,000 ppm and including 2000 ppm to 180,000 ppm. Other components may also be present in the flue gas, e.g., water, NOx, SOx, VOC, mercury and particulates. The temperature of the flue gas may vary, e.g., from 0° C. to 2000° C., such as from 60° C. to 7000° C. and including 100° C. to 400° C.

The gaseous waste stream employed in methods of the invention may be provided from the industrial plant to the site of precipitation in any convenient manner that conveys the gaseous waste stream from the industrial plant to the precipitation plant. In certain embodiments, the waste stream is provided with a gas conveyer, e.g., a duct, which runs from a site of the industrial plant, e.g., a flue of the industrial plant, to one or more locations of the precipitation site. The source of the gaseous waste stream may be a distal location relative to the site of precipitation, such that the source of the gaseous waste stream is a location that is 1 mile or more, such as 10 miles or more, including 100 miles or more, from the precipitation location. For example, the gaseous waste stream may have been transported to the site of precipitation from a remote industrial plant via a $CO_2$ gas conveyance system, e.g., a pipeline. The industrial plant generated $CO_2$ containing gas may or may not be processed, e.g., remove other components, etc., before it reaches the precipitation site (i.e., a carbonate compound precipitation plant). In yet other instances, source of the gaseous waste stream is proximal to the precipitation site, where such instances may include instances where the precipitation site is integrated with the source of the gaseous waste stream, such as a power plant that integrates a carbonate compound precipitation reactor.

Where desired, a portion of but less than the entire gaseous waste stream from the industrial plant may be employed in precipitation reaction. In these embodiments, the portion of the gaseous waste stream that is employed in precipitation may be 75% or less, such as 60% or less and including 50% and less. In yet other embodiments, substantially all of the gaseous waste stream produced by the industrial plant, e.g., substantially all of the flue gas produced by the industrial plant, is employed in precipitation. In these embodiments, 80% or more, such as 90% or more, including 95% or more, up to 100% of the gaseous waste stream (e.g., flue gas) generated by the source may be employed during precipitation.

As indicated above, the gaseous waste stream may be one that is obtained from a flue or analogous structure of an industrial plant. In these embodiments, a line, e.g., duct, is connected to the flue so that gas leaves the flue through the line and is conveyed to the appropriate location(s) of a precipitation system (described in greater detail below). Depending on the particular configuration of the portion of the precipitation system at which the gaseous waste stream is employed, the location of the source from which the gaseous waste stream is obtained may vary, e.g., to provide a waste stream that has the appropriate or desired temperature. As such, in certain embodiments where a gaseous waste stream having a temperature ranging for 0° C. to 1800° C., such as 60° C. to 700° C. is desired, the flue gas may be obtained at the exit point of the boiler or gas turbine, the kiln, or at any point through the power plant or stack, that provides the desired temperature. Where desired, the flue gas is maintained at a temperature above the dew point, e.g., 125° C., in order to avoid condensation and related complications. Where such is not possible, steps may be taken to reduce the adverse impact of condensation, e.g., employing ducting that is stainless steel, fluorocarbon (such as poly(tetrafluoroethylene)) lined, diluted with water and pH controlled, etc., so the duct does not rapidly deteriorate.

To provide for efficiencies, the industrial plant that generates the gaseous waste stream may be co-located with the precipitation system. By "co-located" is meant that the distances between the industrial plant and precipitation system range from 10 to 500 yards, such as 25 to 400 yards, including 30 to 350 yards. Where desired, the precipitation and industrial plants may be configured relative to each other to minimize temperature loss and avoid condensation, as well as minimize ducting costs, e.g., where the precipitation plant is located within 40 yards of the industrial plant.

Also of interest in certain embodiments is a fully integrated plant that includes an industrial function (such as power generation, cement production, etc.) and a precipitation system of the invention. In such integrated plants, conventional industrial plants and precipitation system, such as described below, are modified to provide for the desired integrated plant. Modifications include, but are not limited to: coordination of stacks, pumping, controls, instrumentation, monitoring, use of plant energy, e.g., steam turbine energy to run portions of the precipitation component, e.g., mechanical press, pumps, compressors, use of heat from cement and/or power plant obtained from steam or heat from air to air heat exchanger, etc.

The pH of the water that is contacted with the $CO_2$ source may vary. In some instances, the pH of the water that is contacted with the $CO_2$ source is acidic, such that the pH is lower than 7, such as 6.5 or lower, 6 or lower, 5.5 or lower, 5 or lower, 4.5 or lower, 4 or lower. In yet other embodiments, the pH of the water may be neutral to slightly basic, by which is meant that the pH of the water may range from 7 to 9, such as 7 to 8.5, including 7.5 to 8.5

In some instances, the water, such as alkaline-earth-metal-ion-containing water (including alkaline solutions or natural saline alkaline waters), is basic when contacted with the CO2 source, such as a carbon dioxide containing gaseous stream. In these instances, while being basic the pH of the water is insufficient to cause precipitation of the storage stable carbon dioxide sequestering product. As such, the pH may be 9.5 or lower, such as 9.3 or lower, including 9 or lower.

In some instances, the pH as described above may be maintained at a substantially constant value during contact with the carbon dioxide containing gaseous stream, or the pH may be manipulated to maximize $CO_2$ absorption while minimizing base consumption or other means of removing protons, such as by starting at a certain pH and gradually causing the pH to rise as $CO_2$ continues to be introduced. In embodiments where the pH is maintained substantially constant, whereby "substantially constant" is meant that the magnitude of change in pH during some phase of contact with the carbon dioxide source is 0.75 or less, such as 0.50 or less, including 0.25 or less, such as 0.10 or less. The pH may be maintained at substantially constant value, or manipulated to maximize $CO_2$ absorption but prevent hydroxide precipitation without precipitation, using any convenient approach. In some instances, the pH is maintained at substantially constant value, or manipulated to maximize $CO_2$ absorption without precipitation, during $CO_2$ charging of the water by adding a sufficient amount of base to the water in a manner that provides the substantially constant pH. Any convenient base or combination of bases may be adding, including but not limited to oxides and hydroxides, such as magnesium hydroxide, where further examples of suitable bases are reviewed below. In yet other instances, the pH may be maintained at substantially constant value, or manipulated to maximize $CO_2$ absorption, through use of electrochemical protocols, such as the protocols described below, so that the pH of the water is electrochemically maintained at the substantially constant value. Surprisingly, as shown in Example IV, it has been found that it is possible to absorb, e.g., more than 50% of the $CO_2$ contained in a gas comprising about 20% $CO_2$ through simple sparging of seawater with addition of base (removal of protons).

In some embodiments, the methods and systems of the invention are capable of absorbing 5% or more, 10% or more, 15% or more, 20% or more, 25% or more 30% or more, 35% or more, 40% or more, 45% or more, 50% or more, 55% or more, 60% or more, 65% or more, 70% or more, 75% or more, 80% or more, 85% or more, 90% or more, 95% or more, or 99% or more of the $CO_2$ in a gaseous source of $CO_2$, such as an industrial source of $CO_2$, e.g., flue gas from a power plant or waste gas from a cement plant. In some embodiments, the methods and systems of the invention are capable of absorbing 50% or more of the CO2 in a gaseous source of $CO_2$, such as an industrial source of $CO_2$, e.g., flue gas from a power plant or waste gas from a cement plant.

In addition to charging the initial water with $CO_2$, e.g., as described above, some embodiments of the methods include adding a magnesium ion source to the initial water in a manner sufficient to produce a magnesium to calcium ratio in the water of 3 or higher, e.g., 4 or higher, such as 5 or higher, for example 6 or higher, including 7 or higher. In certain embodiments, the desired magnesium to calcium ion ratio ranges from 3 to 10, such as 4 to 8. Any convenient magnesium ion source may be added to the water to provide the desired magnesium to calcium ion ratio, where specific magnesium ion sources of interest include, but are not limited to: Mg(OH)$_2$, serpentine, olivine, mafic minerals, and ultramafic minerals. The amount of magnesium ion source that is added to the water may vary, e.g., depending on the specific magnesium ion source and the initial water from which the $CO_2$ charged water is produced. In certain embodiments, the amount of magnesium ion that is added to the water ranges from 0.01 to 100.0 grams/liter, such as from 1 to 100 grams/liter of water, including from 5 to 100 grams/liter of water, for example from 5 to 80 grams/liter of water, including from 5 to 50 grams/liter of water. In certain embodiments, the amount of magnesium ion added to the water is sufficient to produce water with a hardness reading of about 0.06 grams/liter or more, such as about 0.08 grams/liter or more, including about 0.1 grams/liter or more as determined a Metrohm Titrator (Metrohm AG, Switzerland) according to manufacturer's instructions. The magnesium ion source may be combined with the water using any convenient protocol, e.g. with agitation, mixing, etc.

In embodiments where a source of magnesium, calcium, or a combination of magnesium and calcium is added to the water, the source may be in solid form e.g., in the form of large, hard, and often crystalline particles or agglomerations of particles that are difficult to get into solution. For example, Mg(OH)$_2$ as brucite can be in such a form, as are many minerals useful in embodiments of the invention, such as serpentine, olivine, and other magnesium silicate minerals, as well as cement waste and the like. Any suitable method may be used to introduce divalent cations such as magnesium from such sources into aqueous solution in a form suitable for reaction with carbonate to form carbonates of divalent cations. Increasing surface area by reducing particle size is one such method, which can be done by means well known in the art such as ball grinding and jet milling. Jet milling has the further advantage of destroying much of the crystal structure of the substance, enhancing solubility. Also of interest is sonochemistry, where intense sonication may be employed to increase reaction rates by a desired amount, e.g., $10^6$X or more. The particles, with or without size reduction, may be exposed to conditions which promote aqueous solution, such as exposure to an acid such as HCl, $H_2SO_4$, or the like; a weak acid or a base may also be used in some embodiments. See, e.g., U.S. Patent Publication Nos. 2005/0022847; 2004/0213705; 2005/0018910; 2008/0031801; and 2007/0217981; European Patent Nos. EP1379469; and EP1554031; and PCT Publication Nos. WO 07/016,271 and WO 08/061,305, all of which are incorporated by reference herein in their entirety.

In some embodiments the methods and systems of the invention utilize serpentine as a mineral source. Serpentine is an abundant mineral that occurs naturally and may be generally described by the formula of $X_{2-3}Si_2O_5(OH)_4$, wherein X is selected from the following: Mg, Ca, $Fe^{2+}$, $Fe^{3+}$, Ni, Al, Zn, and Mn, the serpentine material being a heterogeneous mixture consisting primarily of magnesium hydroxide and silica. In some embodiments of the invention, serpentine is used not only as a source of magnesium, but also as a source of hydroxide. Thus in some embodiments of the invention, hydroxide is provided for removal of protons from water and/or adjustment of pH by dissolving serpentine; in these embodiments an acid dissolution is not ideal to accelerate dissolution, and other means are used, such as jet milling and/or sonication. It will be appreciated that in a batch or continuous process, the length of time to dissolve the serpentine or other mineral is not critical, as once the process is started at the desired scale, and sufficient time has passed for appropriate levels of dissolution, a continuous stream of dissolved material may be maintained indefinitely. Thus, even if dissolution to the desired level takes days, weeks, months, or even years, once the process has reached the first time point at which desired dissolution has occurred, it may be maintained indefinitely. Prior to the timepoint at which desired dissolution has occurred, other processes may be used to provide some or all of the magnesium and/or hydroxide to the process. Serpentine is also a source of iron, which is a useful component of precipitates that are used for, e.g., cements, where iron components are often desired.

Other examples of silicate-based minerals useful in the invention include, but are not limited to olivine, a natural magnesium-iron silicate ($(Mg,Fe)_2SiO_4$), which can also be generally described by the formula $X_2(SiO_4)_n$, wherein X is selected from Mg, Ca, $Fe^{2+}$, $Fe^{3+}$, Ni, Al, Zn, and Mn, and n=2 or 3; and a calcium silicate, such as wollastonite. The minerals may be used individually or in combination with each other. Additionally, the materials may be found in nature or may be manufactured. Examples of industrial by-products include but are not limited to waste cement and calcium-rich fly ash.

In embodiments in which an electrochemical process is used to remove protons and/or to produce base, often an acid stream, such as an HCl stream, is also generated, and this stream, alone or any other convenient source of acid, or a combination thereof, may be used to enhance dissolution of, e.g., magnesium-bearing minerals such as olivine or serpentine, or sources of calcium such as cement waste. Dissolution may be further enhanced by sonication methods, which can produce localized pockets of extreme temperature and pressure, enhancing reaction rates by one hundred to over one million-fold. Such methods are known in the art.

In some embodiments the methods of the invention allow large amounts of magnesium and, in some cases, calcium, to be added to the water used in some embodiments of the invention, increasing the amount of precipitate that may be formed per unit of water in a single precipitation step, allowing surprisingly high yields of carbonate-containing precipitate when combined with methods of dissolution of $CO_2$ from an industrial source in water, e.g., seawater or other saltwater source. In some embodiments, the methods of the invention include a method of removing $CO_2$ from a gaseous source, e.g., an industrial gaseous source of CO2 such as flue gas from a power plant, or such as exhaust gas from a cement plant, by performing a precipitation step on water into which $CO_2$ has been dissolved from the gaseous source of $CO_2$, where the precipitation step provides precipitate in an amount of 10 g/L or more in a single precipitation step, 15 g/L or more in a single precipitation step, 20 g/L or more in a single precipitation step, 25 g/L or more in a single precipitation step, 30 g/L or more in a single precipitation step, 40 g/L or more in a single precipitation step, 50 g/L or more in a single precipitation step, 60 g/L or more in a single precipitation step, 70 g/L or more in a single precipitation step, 80 g/L or more in a single precipitation step, 90 g/L or more in a single precipitation step, 100 g/L or more in a single precipitation step, 125 g/L or more in a single precipitation step, or 150 g/L or more in a single precipitation step, In some embodiments the precipitate comprises magnesium carbonate; in some embodiments the precipitate comprises calcium carbonate; in some embodiments, the precipitate comprises magnesium and calcium, and/or magnesium/calcium carbonates. In some embodiments the ratio of magnesium to calcium in the precipitated material produced in a single precipitation step is at least 0.5:1, or at least 1:1, or at least 2:1, or at least 3:1, or at least 4:1, or at least 5:1, or at least 6:1, or at least 7:1, or at least 8:1, or at least 9:1, or at least 10:1. In some embodiments the ratio of magnesium to calcium in the precipitated material produced in a single precipitation step is at least 2:1. In some embodiments the ratio of magnesium to calcium in the precipitated material produced in a single precipitation step is at least 4:1. In some embodiments the ratio of magnesium to calcium in the precipitated material produced in a single precipitation step is at least 6:1. In some embodiments, the precipitate contains calcium and magnesium carbonates, and contains components that allow at least a portion of the carbon in the carbonate to be traced back to a fossil fuel origin.

As reviewed above, methods of the invention include subjecting water (which may or may have been charged with $CO_2$, as described above) to precipitation conditions sufficient to produce a storage stable precipitated carbon dioxide sequestering product. Any convenient precipitation conditions may be employed, which conditions result in the production of the desired sequestering product.

Precipitation conditions of interest include those that modulate the physical environment of the water to produce the desired precipitate product. For example, the temperature of the water may be raised to an amount suitable for precipitation of the desired product to occur. In such embodiments, the temperature of the water may be raised to a value from 5 to 70° C., such as from 20 to 50° C. and including from 25 to 45° C. As such, while a given set of precipitation conditions may have a temperature ranging from 0 to 100° C., the temperature may be raised in certain embodiments to produce the desired precipitate. The temperature of the water may be raised using any convenient protocol. In some instances, the temperature is raised using energy generated from low or zero carbon dioxide emission sources, e.g., solar energy sources, wind energy sources, hydroelectric energy sources, geothermal energy sources, from the waste heat of the flue gas which can range up to 500° C., etc.

While the pH of the water may range from 7 to 14 during a given precipitation process, in some instances the pH is raised to alkaline levels in order to produce the desired precipitation product. In these embodiments, the pH is raised to a level sufficient to cause precipitation of the desired CO2 sequestering product, as described above. As such, the pH may be raised to 9.5 or higher, such as 10 or higher, including 10.5 or higher. Where desired, the pH may be raised to a level which minimizes if not eliminates $CO_2$ production during precipitation. For example, the pH may be raised to a value of 10 or higher, such as a value of 11 or higher. In certain embodiments, the pH is raised to between 7 and 11, such as between 8 and 11, including between 9 and 11, for example between 10 and 11. In this step, the pH may be raised to and maintained at the desired alkaline level, such that the pH is maintained at a constant alkaline level, or the pH may be transitioned or cycled between two or more different alkaline levels, as desired.

The pH of the water may be raised using any convenient approach. Approaches of interest include, but are not limited to: use of a pH raising agent, electrochemical approaches, using naturally alkaline water such as from an alkaline lake, etc. In some instances, a pH raising agent may be employed, where examples of such agents include oxides (such as calcium oxide, magnesium oxide, etc.), hydroxides (such as sodium hydroxide, potassium hydroxide, and magnesium hydroxide), carbonates (such as sodium carbonate) and the like. The amount of pH elevating agent which is added to the water will depend on the particular nature of the agent and the volume of water being modified, and will be sufficient to raise the pH of the water to the desired value.

In some embodiments, a source of an agent for removal of protons, during dissolution of CO2 and/or during the precipitation step in which pH is raised, may be a naturally-occurring source. For example, in some embodiments the agent may comprise serpentine dissolved into aqueous solution, as described above. In other embodiments the agent may comprise a natural body of highly alkaline water. Such bodies of water are well-known and are sources of large amounts of alkalinity, e.g., Lake Van in Turkey has an average pH of 9.7-9.8. In addition, flyash, slag, cement waste, and other industrial wastes can provide sufficient alkalinity to remove at least a portion of the protons and/or provide a sufficient pH change for precipitation.

In addition or as an alternative, protons may be removed from the water, e.g. while $CO_2$ is dissolved and/or at the precipitation step, using electrochemical approaches, which may remove protons without production of hydroxide (e.g., if proton production from $CO_2$ dissolution matches or exceeds proton removal by an electrochemical process) or with production of hydroxide. For example, electrodes (cathode and anode) may be provided in the reactor which holds the water source, where the electrodes may be separated by a selective barrier, such as a membrane, as desired. Where desired, byproducts of the hydrolysis product, e.g., $H_2$, sodium metal, etc. may be harvested and employed for other purposes, as desired. Additional electrochemical approaches of interest include, but are not limited, those described in U.S. Provisional Application Ser. Nos. 61/081,299 and 61/091,729; the disclosures of which are herein incorporated by reference.

In some instances, low-voltage electrochemical protocols are employed remove protons from the water, e.g. while $CO_2$ is dissolved and at the precipitation step. By "low-voltage" is meant that the employed electrochemical protocol operates at an average voltage of 2, 1.9, 1.8, 1.7, or 1.6 V or less, such as 1.5, 1.4, 1.3, 1.2, 1.1 V or less, such as 1V or less, including 0.9V or less, 0.8V or less, 0.7V or less, 0.6V or less, 0.5V or less, 0.4V or less, 0.3V or less, 0.2V or less, or 0.1V or less. Of interest are electrochemical protocols that do not generate chlorine gas. Also of interest are electrochemical protocols that do not generate oxygen gas. Also of interest are electrochemical protocols that do not generate hydrogen gas. In some instances, the electrochemical protocol is one that does not generate any gaseous by-byproduct.

Described below are two electrochemical processes and systems that may be used in embodiments of the invention. The first makes use of a hydrogen transfer member that can act as both a cathode and an anode (i.e., a bielectrode). The second makes use of one or more ion-selective membranes (a low-voltage system for producing hydroxide). These processes and systems are further described in PCT Application No. PCT/US08/88242 entitled "Low-Energy Electrochemical Hydroxide System and Method," filed on Dec. 23, 2008, and PCT Application No. PCT/US08/88246 entitled "Low-Energy Electrochemical Proton Transfer System and Method," filed on Dec. 23, 2008; the disclosures of which are herein incorporated by reference.

Bielectrode Methods and System

In various embodiments, the present method and system provides a low energy source of a deprotonated solution by positioning a hydrogen transfer member in an electrolytic cell wherein: on biasing a voltage on a first electrode positive relative to the hydrogen transfer member, and a second electrode in the cell negative relative to the hydrogen transfer member, a first electrolyte, in contact with the hydrogen transfer member and the first electrode, is deprotonated without forming oxygen or chlorine gas at the first electrode.

In one embodiment, the method comprises: positioning a conductive hydrogen transfer member to isolate a first electrolyte from a second electrolyte, the first electrolyte contacting a first electrode and the second electrolyte contacting a second electrode; and biasing a voltage on the first electrode positive relative to the hydrogen transfer member, and a voltage on the second electrode negative relative to the hydrogen transfer member to establish a current in the electrodes.

In an another embodiment, the method comprises: utilizing a hydrogen transfer member to isolate a first electrolyte from a second electrolyte; and biasing a voltage on a first electrode contacting the first electrolyte positive relative to the hydrogen transfer member; and biasing a voltage on the second electrode contacting the second electrolyte negative relative to the hydrogen transfer member wherein, whereby protons are removed from the first electrolyte and introduced into the second electrolyte.

In another embodiment, the system comprises: a first electrode contacting a first electrolyte; a second electrode contacting in a second electrolyte; a hydrogen transfer member isolating the first electrolyte from the second electrolyte; and a voltage regulator operable for biasing a voltage on the first electrode positive relative to the hydrogen transfer member, and biasing a voltage on the second electrode negative relative to the hydrogen transfer member.

In another embodiment, the system comprises: a first electrolytic cell comprising a first electrode contacting a first electrolyte; a second electrolytic cell comprising a second electrolyte contacting a second electrode; a hydrogen transfer member positioned to isolate the first electrolyte from the second electrolyte; a first conduit positioned for supplying positive ions to the first electrolyte; a second conduit positioned for supplying negative ions into the second electrolyte; and a voltage regulator operable to establish a current through the electrodes by biasing a voltage on the first electrode positive relative to the hydrogen transfer member, and a voltage on the second electrode negative relative to the hydrogen transfer member.

In another embodiment, the method comprises forming a carbonate-ion enriched solution from a first electrolyte by contacting the first electrolyte with $CO_2$ while transferring hydrogen ions from the first electrolyte to a second electrolyte solution utilizing a hydrogen transfer member. In accordance with the method, a voltage regulator is operable to establish a current through the electrodes by biasing a voltage on the first electrode positive relative to the hydrogen transfer member, and a voltage on the second electrode negative relative to the hydrogen transfer member.

By the present system and method, protons are removed from the first electrolyte in contact with a first electrode, while protons are introduced into another solution in contact with the second electrode (i.e., in some embodiments the PH of the first electrolyte in increased and the pH of the other solution is decreased) without forming chlorine or oxygen gas on the first electrode. In one embodiment, the solution comprising removed protons has a decreased $H^+$ concentration, corresponding to an increase $OH^-$ concentration, and is useable in sequestering $CO_2$ by precipitating calcium and magnesium carbonates and bicarbonates from a solution containing dissolved salts of these alkali metals, as described further herein. Further, the solution comprising the increase in $H^+$ concentration is useable in preparing the alkali solutions herein, and/or other industrial applications.

The bielectrode described herein is directed to electrochemical systems and methods for transferring H+ from one electrolyte solution to another. Thus, by transferring $H^+$ between aqueous electrolytic solutions, the concentration of $H^+$ in one solution may decrease, i.e. the solution becomes more basic, while the concentration of $H^+$ in the other solution also increases i.e., the solution become more acidic. Alternatively, if one solution contains a proton source or a proton sink, the pH my not change, or may change more slowly, or even change in the opposite direction from that predicted by proton removal or addition.

In various embodiments, the methods and apparatus produce a basic solution and an acidic solution. In various embodiments, the basic solution is useable to sequester $CO_2$, and the acidic solution is useable to dissolve calcium and magnesium bearing minerals to provide a calcium and magnesium ions for sequestering $CO_2$, as described further herein. In various embodiments, a hydrogen transfer material, such as palladium, separates the solutions and serve as a hydrogen transfer medium. Also, in various embodiments the hydrogen transfer material functions as a central electrode between an anode and a cathode in a bi-electrode configuration.

Figure 7A:
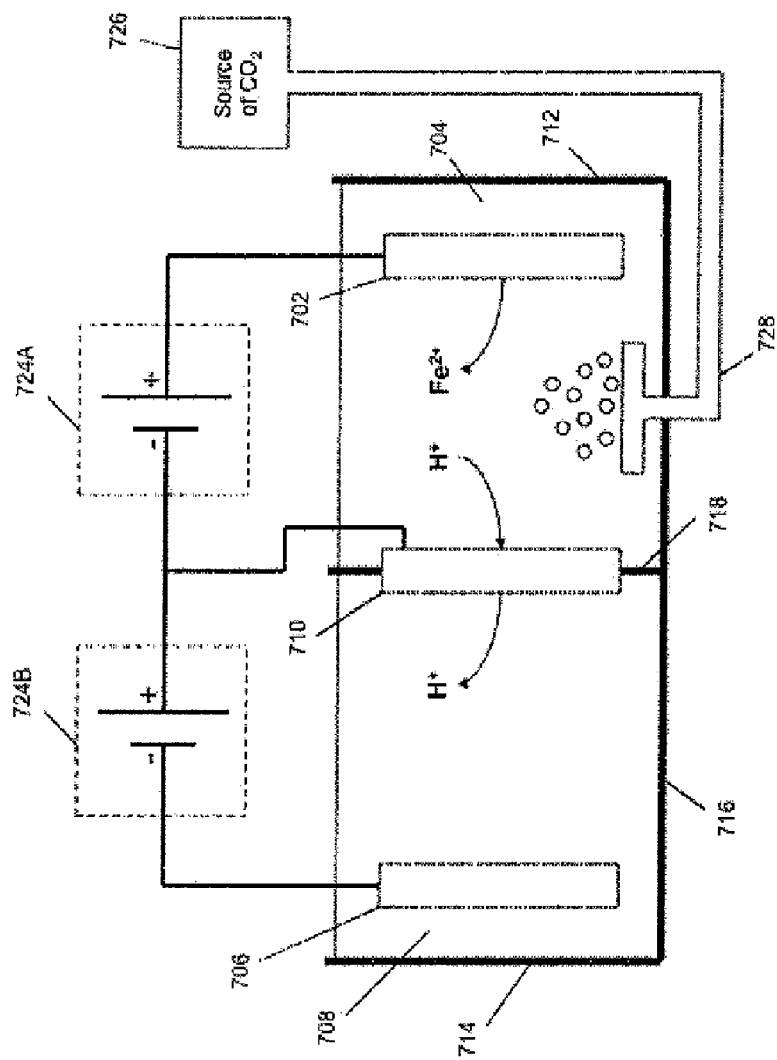
FIG. 7B provides a diagram of one embodiment of a bi-electrode apparatus for removing protons form solutions electrochemically.
Figure 7B:
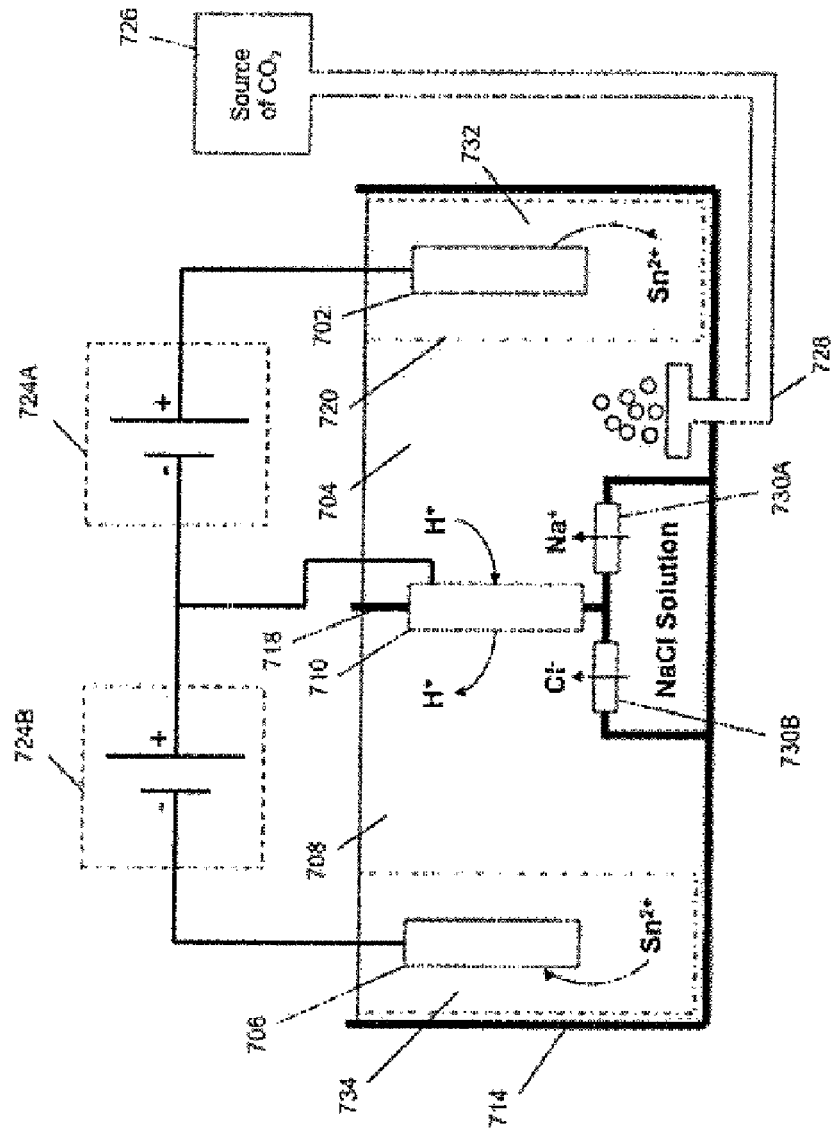

FIGS. 7A-7B illustrate various embodiments of the present system. These embodiments are illustrative only and in no way limit the methods or apparatuses. The system is adaptable for batch and continuous processes as described herein. Referring to FIG. 7A, system in one embodiment comprises a first electrode 702 contacting a first electrolyte 704; a second electrode 706 contacting a second electrolyte 708; a hydrogen transfer member 710 contacting and isolating first electrolyte 704 from second electrolyte 708; and voltage regulators 724A and 724B operable for biasing a voltage on first electrode 702 positive relative to hydrogen transfer member 710, and biasing a voltage on second electrode 706 negative relative to the hydrogen transfer member. In various embodiments, the voltage regulator is set to a voltage such that a gas, e.g., oxygen or chlorine gas does not form at the first electrode.

In the embodiment illustrated in FIG. 7A, first electrode 702 and first electrolyte 704 are contained in a first electrolytic chamber or cell 712; and second electrode 706 and second electrolyte 708 are contained in a second electrolytic chamber or cell 714. First electrolyte cell 712 and second electrolytic cell 714 are defined by positioning hydrogen transfer member 710 to isolate first electrolyte 704 from second electrolyte 708. In various embodiments, first and second electrolytic cells 712, 714 are comprised of a reservoir 716 such as a tank, a vessel, a chamber, bag or a conduit. As is illustrated in FIGS. 7A-7B, hydrogen transfer member 710 member may constitute an entire barrier 718 between electrolytes 704, 708, or a portion thereof. In embodiments where hydrogen transfer member 710 constitutes only a portion of barrier 718, the remainder of the barrier comprises an insulating material.

In various embodiments, hydrogen transfer material 710 comprises a noble metal, a transition metal, a platinum group metal, a metal of Groups IVB, VB, VIB, or VIII of the periodic table of elements, alloys of these metals, oxides of these metals, or combinations of any of the foregoing. Other exemplary materials include palladium, platinum, iridium, rhodium, ruthenium, titanium, zirconium, chromium, iron, cobalt, nickel, palladium-silver alloys, palladium-copper alloys or amorphous alloys comprising one or more of these metals. In various embodiments, the hydrogen transfer member also comprises a non-porous materials from the titanium and vanadium groups, or comprise complex hydrides of group one, two, and three light elements of the Periodic Table such as Li, Mg, B, and Al. In other embodiments, a non-conductive or poorly conductive material can be made conductive as needed to function as a hydrogen transfer member, e.g. with a thin metal coating that can be applied by sputter deposition. In various embodiments, the hydrogen storage material 710 comprise a supported film or foil. In some embodiments, the hydrogen storage material 710 comprises palladium.

In operation, first electrode 702 is disposed at least partially in first electrolyte solution 704 and in contact therewith, and second electrode 706 is likewise disposed at least partially in second electrolyte solution 708 and in contact therewith.

In various embodiments the electrolyte solution in first electrolytic cell 712 comprises a conductive aqueous such as fresh water or a salt water including seawater, brine, or brackish fresh water. Similarly, in second cell 714, the electrolyte comprises a conductive aqueous such as fresh water or a salt water including seawater, brine, or brackish fresh water as described herein. In either cell, the solution may be obtained form a natural source, or artificially created, or a combination of a natural source that has been modified for operation in the process and/or apparatus of the invention as described herein.

In an embodiment illustrated in FIGS. 7A-7B, first electrolytic solution 704 is enriched with cations ions obtained, for example, by selectively di-ionizing salt water. Similarly, electrolytic solution 708 is enriched with anions ions obtained, for example, by selectively di-ionizing salt water. As is illustrated in FIG. 7A by adding positive ions, e.g., sodium ions to first electrolytic solution 704, and suitably biasing first 702 and second 706 electrodes as described herein, protons are removed from the first solution; if protons are not replenished, or are replenished more slowly than they are removed, then the system provides a deprotonated first electrolyte 704. Further, by surrounding first electrode 702 with a porous material 720 to prevent mixing of cations 732 from first electrode 702 with other ions in first electrolytic cell solution 704, these electrode cations can be recovered at second electrode 706 in the second electrolytic cell by surrounding second electrode 706 with recovered cations 734 and adjusting the voltages in the system to preferentially plate out cations on second electrode 706. Although tin is the electrode material illustrated in FIG. 7A, it will be appreciated that any suitable material may be used. Similarly by introducing chloride ions in second electrolyte 708 wherein the proton concentration increases, an acid solution e.g., hydrochloric acid is obtained in second electrolytic cell 714. It will be appreciated that any suitable cationic and anionic species may be used, and that selection of species will depend on operating requirements of the system, the acid desired in second electrolyte 708, and the like. In some embodiments, the cation is sodium and the anion is chloride, as illustrated in FIG. 7A.

In various embodiments first electrode 702 comprises an anode, and second electrode 706 comprises a cathode. In various embodiments, first electrode 702 comprises a sacrificial anode comprising a material comprising iron, tin, magnesium, calcium or combinations thereof and a mineral. Other exemplary materials include a mineral, such as a mafic mineral e.g., olivine or serpentine that provides cations. Where a mineral is used as a part of first electrode 702 and functions as a source of cations, the mineral is positioned on a chemically inert conductive carrier such as stainless steel or platinum. Any suitable mineral may be used and selection of the mineral is based on the cation or cations desired for release, availability, cost and the like.

Figure 8:
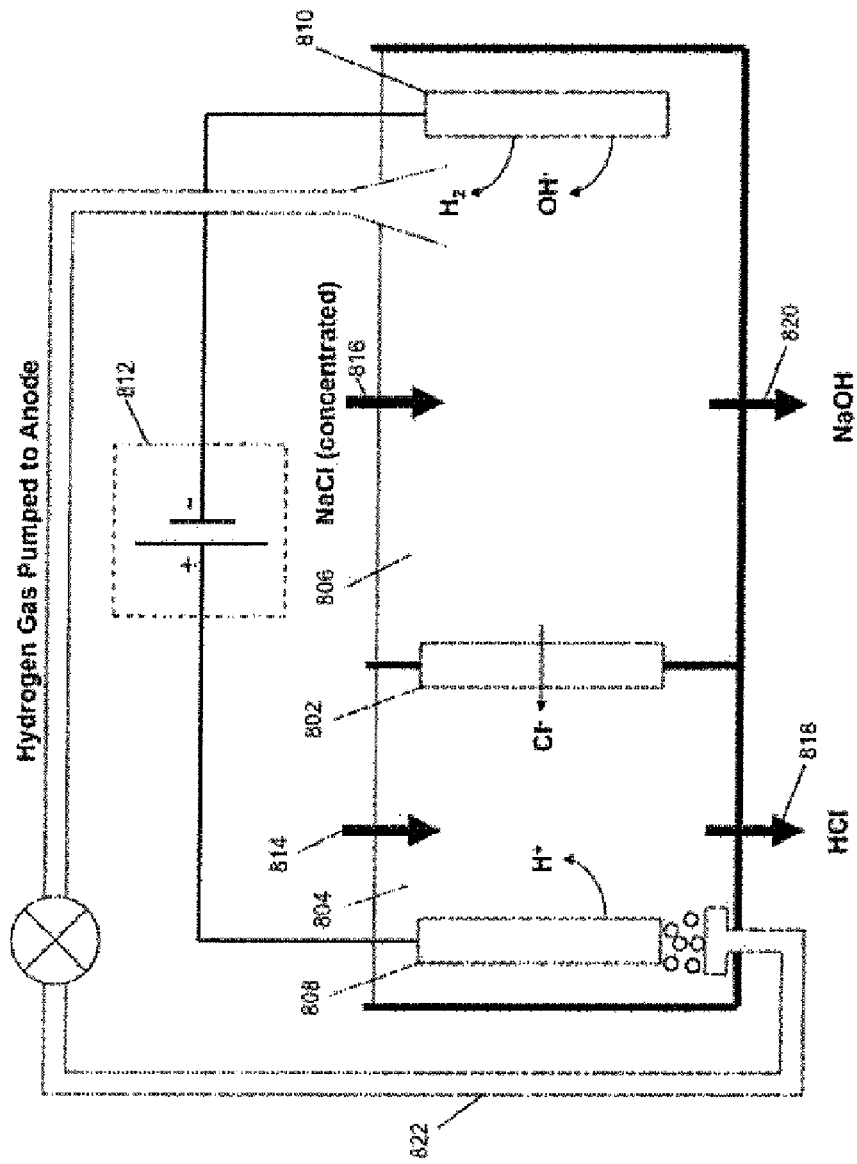
FIG. 8 provides a diagram of one embodiment of a low-voltage apparatus for producing hydroxide electrochemically.

The system also comprises a voltage regulator and/or power supply 724A, 724B configured to bias first electrode 702 positive relative to hydrogen transfer member 710, and configured to bias second electrode 706 negative to hydrogen transfer member 710. In various embodiments, power supply comprises two separate power supplies 724A, 724B as illustrated in FIGS. 7-8, one configured to bias the first electrode positively relative to the membrane, and another configured to bias the second electrode negative relative to the hydrogen transfer member 710.

In operation, power supply 724A, 724B drives an electrochemical reaction in which, without intending to be bound by any theory, it is believed that hydrogen ions in first electrolyte solution 704 are reduced to atomic hydrogen and adsorb on a surface of hydrogen transfer member 710 in contact with first electrolyte 702. At least a portion of the adsorbed hydrogen is absorbed in the body of hydrogen transfer member 710 and desorbs on a surface of hydrogen transfer member 710 into second electrolyte 708 in contact with hydrogen transfer member 710 as hydrogen ions. Regardless of mechanism, the result of the electrochemical reaction is removal of proton from first electrolyte 704, and introduction of a proton into second electrolyte 708. In embodiments wherein first electrode 702 comprises an oxidizable material e.g. iron, electrode 702 is oxidized to release iron ions (e.g., $Fe^{+2}$ and/or $Fe^{+3}$) into first electrolyte solution 704 to balance the reduction of the hydrogen ions in first electrolyte 704.

In the present system, voltages on electrodes 702, 706 are biased relative to hydrogen transfer member 710 such that a gas does not form on first electrode 702. Hence, wherein first electrolyte 704 comprises water, oxygen does not form on first electrode 702. Similarly, wherein the first electrolyte comprises chloride ions, e.g., an electrolyte comprising salt water, chlorine gas does not form on the first electrode.

Without being bound to any theory as to a mechanism for proton transfer from first electrolyte 704 to second electrolyte 708, it is believed that hydrogen ions present in first electrolyte 704 are reduced to atomic hydrogen and adsorbs on the surface of hydrogen transfer member 710 in contact the first electrolyte. In the system, power supply 724B drives another reaction at the opposing surface of membrane 710 in contact with second electrolyte 708 such that hydrogen absorbed in the body of hydrogen transfer member 710 is oxidized back to hydrogen ions and are released into second electrolyte solution 708 as hydrogen ions. To balance the reaction in which the atomic hydrogen is oxidized back to hydrogen ions, electrons are taken up at second electrode 706, for instance, by reducing a cation in second electrolytic solution 708. For example, where second electrolytic solution 708 comprises seawater, then depending upon the applied voltage some or all of sodium, calcium, magnesium, and other ions can be reduced at second electrode 706 to form a coating thereon.

In various embodiments as illustrated in FIGS. 7A-7B, the system comprises a source of $CO_2$ 726 coupled to a gas injection system 728 disposed in first cell 712. The gas injection system mixes a gas including $CO_2$ supplied by the source of $CO_2$ into first electrolyte solution 704. Exemplary sources of CO2 are described herein, and can include flue gas from burning fossil fuel burning at power plants, or waste gas from an industrial process e.g., cement manufacture or steel manufacture, for example. In various embodiments, gas injection system 728 can comprise a sparger or injection nozzle; however, any suitable mechanism and apparatus for introducing $CO_2$ into an aqueous solution, as known in the art, may be used.

Referring to FIGS. 7A and 7B, the system in an alternative embodiment further comprises a conduit 730A positioned to supply a solution of positive ions to first electrolyte 704, and conduit 730B positioned to supply negative ions to second electrolyte 708. In various embodiments, conduits 730A, 730B are adaptable for batch or continuous flow. As illustrated in FIGS. 7A and 7B, the system comprises a first electrolytic cell 712 comprising a first electrode 702 contacting a first electrolyte 704; a second electrolytic cell 714 comprising a second electrode 706 contacting a second electrolyte 708; a hydrogen transfer member 710 positioned to isolate the first electrolyte from the second electrolyte; a first conduit 730A positioned for supplying positive ions to the first electrolyte; a second conduit 730B positioned for supplying negative ions into the second electrolyte; and voltage regulators 724A, 724B operable to establish a current through electrodes 702, 706 by biasing a voltage on first electrode 702 positive relative to the hydrogen transfer member 710, and a voltage on the second electrode 706 negative relative to the hydrogen transfer member.

As will be appreciated by one skilled in the art, protons are removed from electrolyte solution 704 and introduced in to electrolyte solution 708. In some embodiments, electrolyte solution 704 further includes a source of protons as illustrated in FIGS. 7A and 7B. In some embodiments, $CO_2$ gas may be introduced into electrolyte solution 704 and through well known chemistry, react with water to form a carbonic acid that can dissociate to form a bicarbonate ion and a proton; and the bicarbonate ion may further dissociate to form a carbonate ion and another proton.

Thus, in some embodiments, e.g., where $CO_2$ is introduced, proton are both removed and introduced into electrolyte solution 704, and the net result—net removal, no change, or net introduction of protons—will depend on the relative rates of protons removal by the electrochemical process and introduction by e.g., $CO_2$ introduction. Similarly, in electrolyte solution 708, if there is a process that removes protons e.g., dissolution of a basic substance, then the net result in electrolyte solution 708 may be introduction of, no change in, or removal of protons.

In some embodiments, there is a net removal of protons (coupled with introduction of cations) in electrolyte solution 704, and/or a net introduction of protons (couple with introduction of anions, e.g., chloride) in electrolyte solution 708. Thus, in some embodiments, a cationic hydroxide, e.g. sodium hydroxide will be formed in first electrolyte solution 704 and/or hydrogen anion solution, e.g., hydrochloric acid will be formed in second solution 708. Either or both of cationic hydroxide e.g., sodium hydroxide, or the hydrogen anionic solution e.g. hydrochloric acid can be withdrawn and used elsewhere, e.g., in the sequestration of carbon dioxide as describe above, and in other industrial applications.

The voltage across the electrodes used to remove protons from solution may be low. In various embodiments, the voltage across the electrodes may be less than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, or 2.2 V. In some embodiments, the voltage across the electrodes is less than about 2.0V. In some embodiments, the voltage across the electrodes is less than about 1.5V. In some embodiments, the voltage across the electrodes is less than about 1.0V. In some embodiments, the voltage across the electrodes is less than about 0.8V. In some embodiments, the voltage across the electrodes is less than about 0.6V. In some embodiments, the voltage across the electrodes is less than about 0.4V.

Exemplary results achieved in accordance with the present system are summarized in Table 1 below.

TABLE 1

Low Energy Electrochemical Method and System (Bi-electrode)

| Volt across Electrodes | Time (min) | Initial pH at Anode | End pH at Anode | Initial pH at Cathode | End pH at Cathode |
|---|---|---|---|---|---|
| 0.45 V [0.15 V across the deprotonated solution; and 0.30 V across the protonated solution] | 30 | 4.994 | 5.204 | 7.801 | 10. 7.431 |

Low Voltage System for Production of Hydroxide

A second set of methods and systems for removing protons from aqueous solution/producing hydroxide pertains to a low energy process for electrochemically preparing an ionic solution utilizing an ion exchange membrane in an electrochemical cell. In one embodiment, the system comprises an electrochemical system wherein an ion exchange membrane separates a first electrolyte from a second electrolyte, the first electrolyte contacting an anode and the second electrolyte contacting a cathode. In the system, on applying a voltage across the anode and cathode, hydroxide ions form at the cathode and a gas does not form at the anode.

In an another embodiment, the system comprises an electrochemical system comprising a first electrolytic cell including an anode contacting a first electrolyte, and an anion exchange membrane separating the first electrolyte from a third electrolyte; and a second electrolytic cell including a second electrolyte contacting a cathode and a cation exchange membrane separating the first electrolyte from the third electrolyte; wherein on applying a voltage across the anode and cathode, hydroxide ions form at the cathode and a gas does not form at the anode.

In one embodiment the method comprises placing an ion exchange membrane between a first electrolyte and a second electrolyte, the first electrolyte contacting an anode and the second electrolyte contacting a cathode; and migrating ions across the ion exchange membrane by applying a voltage across the anode and cathode to form hydroxide ions at the cathode without forming a gas at the anode.

In another embodiment the method comprises placing a third electrolyte between an anion exchange membrane and a cation exchange membrane; a first electrolyte between the anion exchange and an anode; and second electrolyte between the cation exchange membrane and a cathode; and migrating ions across the cation exchange membrane and the anion exchange membrane by applying a voltage to the anode and cathode to form hydroxide ions at the cathode without forming a gas at the anode.

By the present methods and systems, ionic species from one solution are transferred to another solution in an low voltage electrochemical manner, thereby providing anionic solutions for various applications, including preparing a solution of sodium hydroxide for use in sequestration carbon dioxide as described herein. In one embodiment, a solution comprising $OH^-$ is obtained from salt water and used in sequestering $CO_2$ by precipitating calcium and magnesium carbonates and bicarbonates from a salt solution comprising alkaline earth metal ions as described herein.

The methods and systems in various embodiments are directed to a low voltage electrochemical system and method for generating a solution of sodium hydroxide in an aqueous solution utilizing one or more ion exchange membranes wherein, a gas is not formed at the anode and wherein hydroxyl ions are formed at the cathode. Thus, in some embodiments, hydroxide ions are formed in an electrochemical process without the formation of oxygen or chlorine gas. In some embodiments, hydroxide ions are formed in an electrochemical process where the voltage applied across the anode and cathode is less than 2.8, 2.7, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 V. In various embodiments, an ionic membrane is utilized to separate a salt water in contact with the anode, from a solution of e.g., sodium chloride in contact with the cathode. On applying a low voltage across the cathode and anode, a solution of e.g., sodium hydroxide is formed in the solution around the cathode; concurrently, an acidified solution comprising hydrochloric acid is formed in the solution around the anode. In various embodiments, a gas such as chorine or oxygen does not form at the anode.

In various embodiments, the sodium hydroxide solution is useable to sequester $CO_2$ as described herein, and the acidic solution is useable to dissolve calcium and magnesium bearing minerals to provide a calcium and magnesium ions for sequestering $CO_2$, also as described herein.

Figure 9:
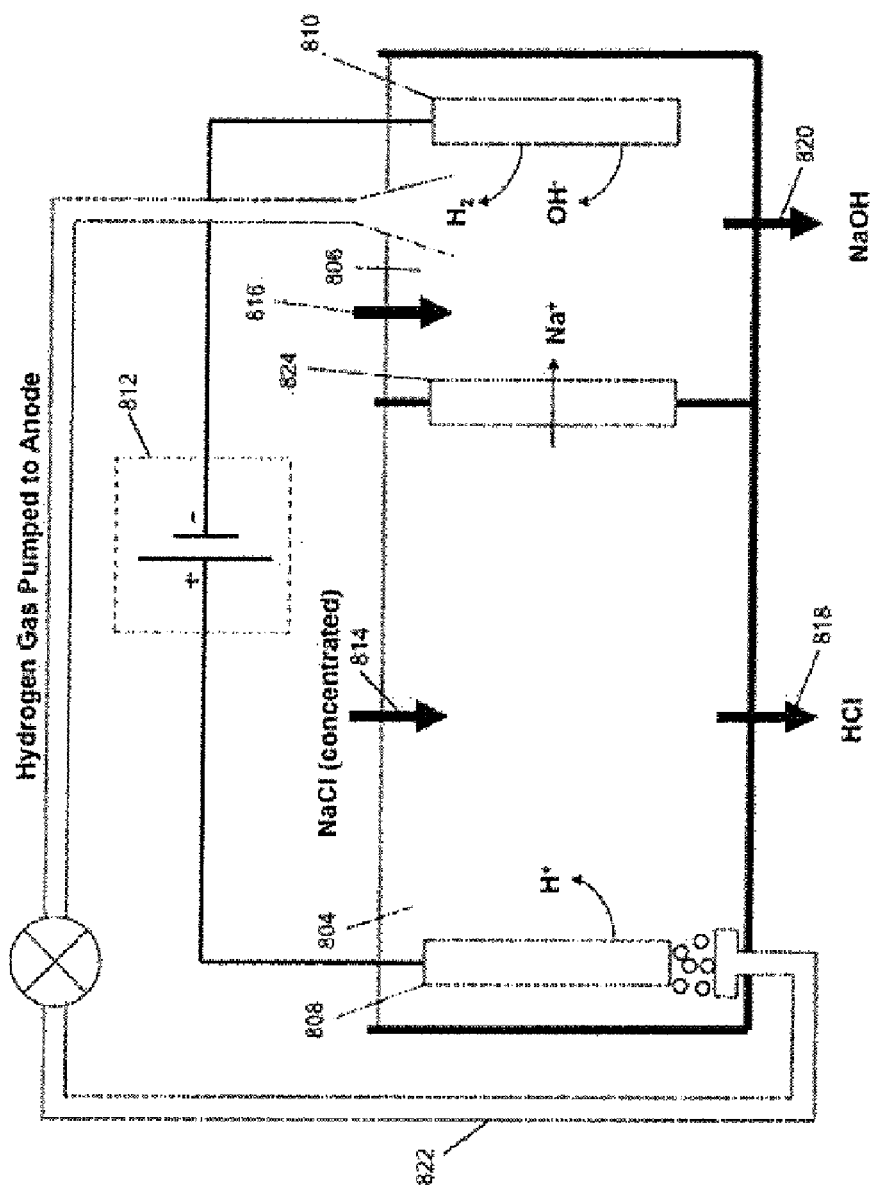
FIG. 9 provides a diagram of another embodiment of a low-voltage apparatus for producing hydroxide electrochemically.
Figure 10:
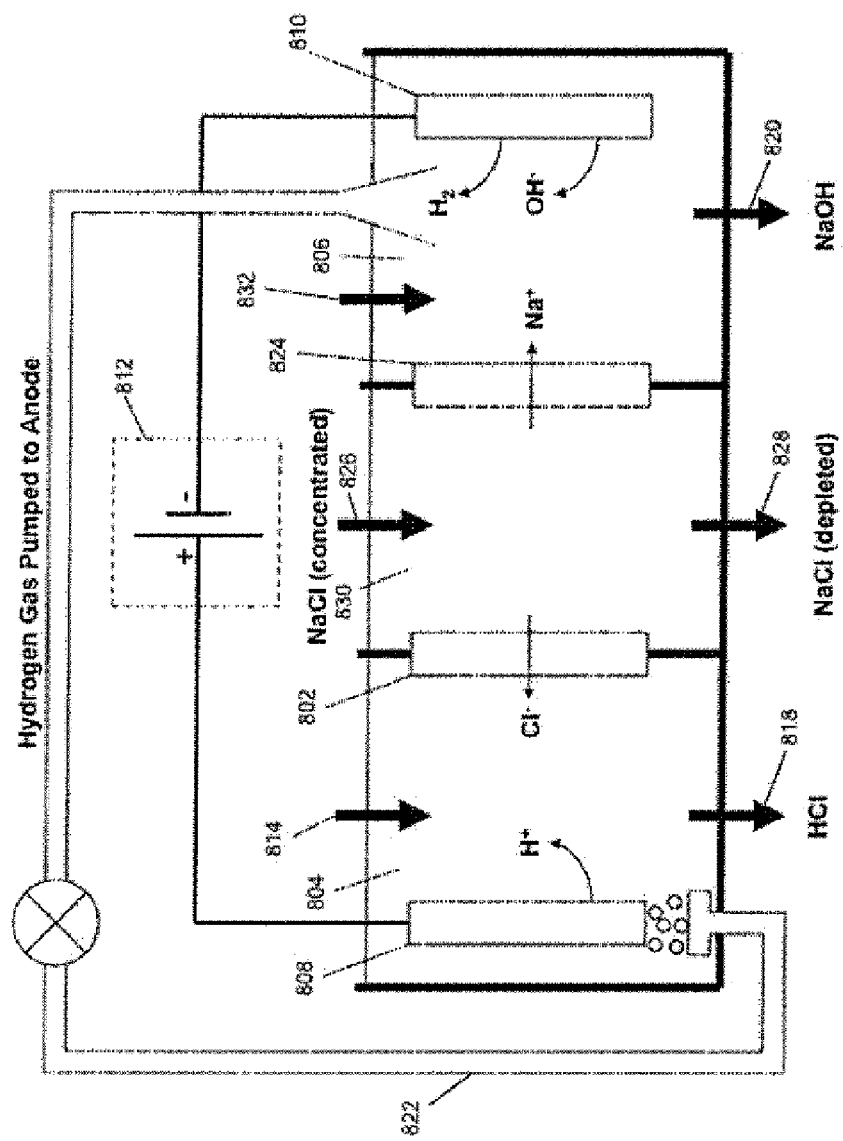
FIG. 10 provides a diagram of another embodiment of a low-voltage apparatus for producing hydroxide electrochemically.

Turning to FIGS. 8-10, in various embodiments the system is adaptable for batch and continuous processes as described herein. Referring to FIGS. 8-9, in one embodiment the system includes an electrochemical cell wherein an ion exchange membrane (802, 824) is positioned to separate a first electrolyte (804) from a second electrolyte (806), the first electrolyte contacting an anode (808) and the second electrolyte contacting a cathode (810). As illustrated in FIG. 8, an anion exchange membrane (802) is utilized; in FIG. 9, a cation exchange membrane (824) is utilized.

In various embodiments as illustrated in FIGS. 8 and 9, first electrolyte (804) comprises an aqueous salt solution comprising seawater, freshwater, brine, or brackish water or the like; and second electrolyte comprises a solution substantially of sodium chloride. In various embodiments, second (806) electrolyte may comprise seawater or a concentrated solution of sodium chloride. In various embodiments anion exchange membrane (802) and cation exchange membrane (824) comprise a conventional ion exchange membranes suitable for use in an acidic and/or basic solution at operating temperatures in an aqueous solution up to about 100° C. As illustrated in FIGS. 8 and 9, first and second electrolytes are in contact with the anode and cathode to complete an electrical circuit that includes voltage or current regulator (812). The current/voltage regulator is adaptable to increase or decrease the current or voltage across the cathode and anode in the system as desired.

With reference to FIGS. 8 and 9, in various embodiments, the electrochemical cell includes first electrolyte inlet port (814) adaptable for inputting first electrolyte (804) into the system and in contact with anode (808). Similarly, the cell includes second electrolyte inlet port (816) for inputting second electrolyte (806) into the system and in contact with cathode (810). Additionally, the cell includes outlet port (818) for draining first electrolyte from the cell, and outlet port (820) for draining second electrolyte from the cell. As will be appreciated by one ordinarily skilled, the inlet and outlet ports are adaptable for various flow protocols including batch flow, semi-batch flow, or continuous flow. In alternative embodiments, the system includes a duct (822) for directing gas to the anode; in various embodiments the gas comprises hydrogen formed at the cathode (810).

With reference to FIG. 8 where an anion membrane (802) is utilized, upon applying a low voltage across the cathode (810) and anode (808), hydroxide ions form at the cathode (810) and a gas does not form at the anode (808). Further, where second electrolyte (806) comprises sodium chloride, chloride ions migrate into the first electrolyte (804) from the second electrolyte (806) through the anion exchange membrane (802); protons form at the anode (808); and hydrogen gas forms at the cathode (810). As noted above, a gas e.g., oxygen or chlorine does not form at the anode (808).

With reference to FIG. 9 where a cation membrane (824) is utilized, upon applying a low voltage across the cathode (810) and anode (808), hydroxide ions form at the cathode (810) and a gas does not form at the anode (808). In various embodiments cation exchange membrane (824) comprises a conventional cation exchange membrane suitable for use with an acidic and basic solution at operating temperatures in an aqueous solution up to about 100° C. As illustrated in FIG. 9, first and second electrolytes are in contact with the anode and cathode to complete an electrical circuit that includes voltage and/or current regulator (812). The voltage/current regulator is adaptable to increase or decrease the current or voltage across the cathode and anode in the system as desired. In the system as illustrated in FIG. 9 wherein second electrolyte (806) comprises sodium chloride, sodium ions migrate into the second electrolyte (806) from the first electrolyte (804) through the cation exchange membrane (824); protons form at the anode (808); and hydrogen gas forms at the cathode (810). As noted above, a gas e.g., oxygen or chlorine does not form at the anode (808).

As can be appreciated by one ordinarily skilled in the art, and with reference to FIG. 8 in second electrolyte (806) as hydroxide ions from the anode (810) and enter in to the second electrolyte (806) concurrent with migration of chloride ions from the second electrolyte, an aqueous solution of sodium hydroxide will form in second electrolyte (806). Consequently, depending on the voltage applied across the system and the flow rate of the second electrolyte (806) through the system, the pH of the second electrolyte is adjusted. In one embodiment, when a potential of about 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 01.4 V or less, 1.5 V or less, 1.6 V or less, 1.7 V or less, 1.8 V or less, 1.9 V or less, or 2.0 V or less, is applied across the anode and cathode, the pH of the second electrolyte solution increased; in another embodiment, when a volt of about 0.1 to 2.0 V is applied across the anode and cathode the pH of the second electrolyte increased; in yet another embodiment, when a voltage of about 0.1 to 1 V is applied across the anode and cathode the pH of the second electrolyte solution increased. Similar results are achievable with voltages of 0.1 to 0.8 V; 0.1 to 0.7 V; 0.1 to 0.6 V; 0.1 to 0.5 V; 0.1 to 0.4 V; and 0.1 to 0.3 V across the electrodes. Exemplary results achieved in accordance with the present system are summarized in Table 2.

TABLE 2

Low Energy Electrochemical Method and System

| Volt across Electrodes | Time (sec) | Initial pH at Anode | End pH at Anode | Initial pH at Cathode | End pH at Cathode |
|---|---|---|---|---|---|
| 0.6 | 2000 | 6.7 | 3.8 | 6.8 | 10.8 |
| 1.0 | 2000 | 6.6 | 3.5 | 6.8 | 11.1 |

In this example, both the anode and the cathode comprise platinum, and the first and second electrolytes comprise a solution of sodium chloride.

Similarly, with reference to FIG. 9, in second electrolyte (806) as hydroxide ions from the anode (810) enter into the solution concurrent with migration of sodium ions from the first electrolyte to the second electrolyte, increasingly an aqueous solution of sodium hydroxide will form in second electrolyte (806). Depending on the voltage applied across the system and the flow rate of the second electrolyte through the system, the pH of the solution will be adjusted. In one embodiment, when a volt of about 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 01.4 V or less, 1.5 V or less, 1.6 V or less, 1.7 V or less, 1.8 V or less, 1.9 V or less, or 2.0 V or less is applied across the anode and cathode, the pH of the second electrolyte solution increased; in another embodiment, when a volt of about 0.1 to 2.0 V is applied across the anode and cathode the pH of the second electrolyte increased; in yet another embodiment, when a voltage of about 0.1.0 to 1 V is applied across the anode and cathode the pH of the second electrolyte solution increased. Similar results are achievable with voltages of 0.1 to 0.8 V; 0.1 to 0.7 V; 0.1 to 0.6 V; 0.1 to 0.5 V; 0.1 to 0.4 V; and 0.1 to 0.3 V across the electrodes. In one embodiment, a volt of about 0.6 volt or less is applied across the anode and cathode; in another embodiment, a volt of about 0.1 to 0.6 volt or less is applied across the anode and cathode; in yet another embodiment, a voltage of about 0.1 to 1 volt or less is applied across the anode and cathode.

In various embodiments and with reference to FIGS. 8-10, hydrogen gas formed at the cathode (810) is directed to the anode (808) where, without being bound to any theory, it is believed that the gas is adsorbed and/or absorbed into the anode and subsequently forms protons at the anode. Accordingly, as can be appreciated, with the formation of protons at the anode and migration of e.g., chloride ions into the first electrolyte (804) as in FIG. 8, or migration of e.g., sodium ions from the first electrolyte as in FIG. 10, an acidic solution comprising e.g., hydrochloric acid is obtained in the first electrolyte (804).

In another embodiment as illustrated in FIG. 10, the system in accordance with the present invention comprises an electrochemical cell including anode (808) contacting first electrolyte (804) and an anion exchange membrane (802) separating the first electrolyte from a third electrolyte (830); and a second electrolytic cell comprising a second electrolyte (806) contacting a cathode (810) and a cation exchange membrane (824) separating the first electrolyte from the third electrolyte, wherein on applying a voltage across the anode and cathode, hydrogen ions form at the cathode without a gas forming at the anode. As with the system of FIGS. 8 and 9, the system of FIG. 10 is adaptable for batch and continuous processes.

In various embodiments as illustrated in FIG. 10, first electrolyte (804) and second electrolyte (806) comprise an aqueous salt solution comprising seawater, freshwater, brine, or brackish water or the like; and second electrolyte comprises a solution substantially of sodium chloride. In various embodiments, first (804) and second (806) electrolytes may comprise seawater. In the embodiment illustrated in FIG. 10, the third electrolyte (830) comprises substantially sodium chloride solution.

In various embodiments anion exchange membrane (802) comprises any suitable anion exchange membrane suitable for use with an acidic and basic solution at operating temperatures in an aqueous solution up to about 100° C. Similarly, cation exchange membrane (824) comprises any suitable cation exchange membrane suitable for use with an acidic and basic solution at operating temperatures in an aqueous solution up to about 100° C.

As illustrated in FIG. 10, in various embodiments first electrolyte (804) is in contact with the anode (808) and second electrolyte (806) is in contact with the cathode (810). The third electrolyte (830), in contact with the anion and cation exchange membrane, completes an electrical circuit that includes voltage or current regulator (812). The current/voltage regulator is adaptable to increase or decrease the current or voltage across the cathode and anode in the system as desired.

With reference to FIG. 10, in various embodiments, the electrochemical cell includes first electrolyte inlet port (814) adaptable for inputting first electrolyte 804 into the system; second electrolyte inlet port (832) for inputting second electrolyte (806) into the system; and third inlet port (826) for inputting third electrolyte into the system. Additionally, the cell includes outlet port (818) for draining first electrolyte; outlet port (820) for draining second electrolyte; and outlet port (828) for draining third electrolyte. As will be appreciated by one ordinarily skilled, the inlet and outlet ports are adaptable for various flow protocols including batch flow, semi-batch flow, or continuous flow. In alternative embodiments, the system includes a duct (822) for directing gas to the anode; in various embodiments the gas is hydrogen formed at the cathode (810).

With reference to FIG. 10, upon applying a low voltage across the cathode (810) and anode (808), hydroxide ions form at the cathode (810) and a gas does not form at the anode (808). Further, where third electrolyte (830) comprises sodium chloride, chloride ions migrate into the first electrolyte (804) from the third electrolyte (830) through the anion exchange membrane (802); sodium ions migrate to the second electrolyte (806) from the third electrolyte (830); protons form at the anode; and hydrogen gas forms at the cathode. As noted previously, a gas e.g., oxygen or chlorine does not form at the anode (808).

As can be appreciated by one ordinarily skilled in the art, and with reference to FIG. 10 in second electrolyte (806) as hydroxide ions from the cathode (810) enter into the solution concurrent with migration of sodium ions from the third electrolyte, increasingly an aqueous solution of sodium hydroxide will form in second electrolyte (806). Depending on the voltage applied across the system and the flow rate of the second electrolyte through the system, the pH of the solution will be adjusted. In one embodiment, when a volt of about 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 01.4 V or less, 1.5 V or less, 1.6 V or less, 1.7 V or less, 1.8 V or less, 1.9 V or less, or 2.0 V or less or less is applied across the anode and cathode, the pH of the second electrolyte solution increased; in another embodiment, when a volt of about 0.1 to 2.0 V is applied across the anode and cathode the pH of the second electrolyte increased; in yet another embodiment, when a voltage of about 0.1.0 to 1 V is applied across the anode and cathode the pH of the second electrolyte solution increased. Similar results are achievable with voltages of 0.1 to 0.8 V; 0.1 to 0.7 V; 0.1 to 0.6 V; 0.1 to 0.5 V; 0.1 to 0.4 V; and 0.1 to 0.3 V across the electrodes. In one embodiment, a volt of about 0.6 volt or less is applied across the anode and cathode; in another embodiment, a volt of about 0.1 to 0.6 volt or less is applied across the anode and cathode; in yet another embodiment, a voltage of about 0.1 to 1 volt or less is applied across the anode and cathode.

Similarly, with reference to FIG. 10, in first electrolyte (804) as proton form at the anode (808) and enter into the solution concurrent with migration of chloride ions from the third electrolyte to the first electrolyte, increasingly an acidic solution will form in first electrolyte (804). Depending on the voltage applied across the system and the flow rate of the second electrolyte through the system, the pH of the solution will be adjusted. In one embodiment, when a volt of about 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 01.4 V or less, 1.5 V or less, 1.6 V or less, 1.7 V or less, 1.8 V or less, 1.9 V or less, or 2.0 V or less is applied across the anode and cathode, the pH of the second electrolyte solution increased; in another embodiment, when a volt of about 0.1 to 2.0 V is applied across the anode and cathode the pH of the second electrolyte increased; in yet another embodiment, when a voltage of about 0.1.0 to 1 V is applied across the anode and cathode the pH of the second electrolyte solution increased. Similar results are achievable with voltages of 0.1 to 0.8 V; 0.1 to 0.7 V; 0.1 to 0.6 V; 0.1 to 0.5 V; 0.1 to 0.4 V; and 0.1 to 0.3 V across the electrodes. In one embodiment, a volt of about 0.6 volt or less is applied across the anode and cathode; in another embodiment, a volt of about 0.1 to 0.6 volt or less is applied across the anode and cathode; in yet another embodiment, a voltage of about 0.1 to 1 volt or less is applied across the anode and cathode as indicated in Table 2.

As illustrated in FIG. 10, hydrogen gas formed at the cathode (810) is directed to the anode (808) where, without being bound to any theory, it is believed that hydrogen gas is adsorbed and/or absorbed into the anode and subsequently forms protons at the anode and enters the first electrolyte (804). Also, in various embodiments as illustrated in FIGS. 8-10, a gas such as oxygen or chlorine does not form at the anode (808). Accordingly, as can be appreciated, with the formation of protons at the anode and migration of chlorine into the first electrolyte, hydrochloric acid is obtained in the first electrolyte (804).

As described with reference to FIGS. 8-9, as hydroxide ions from the anode (810) and enter in to the second electrolyte (806) concurrent with migration of chloride ions from the second electrolyte, an aqueous solution of sodium hydroxide will form in second electrolyte (806). Consequently, depending on the voltage applied across the system and the flow rate of the second electrolyte (806) through the system, the pH of the second electrolyte is adjusted. In one embodiment, when a volt of about 0.1 V or less, 0.2 V or less, 0.3 V or less, 0.4 V or less, 0.5 V or less, 0.6 V or less, 0.7 V or less, 0.8 V or less, 0.9 V or less, 1.0 V or less, 1.1 V or less, 1.2 V or less, 1.3 V or less, 01.4 V or less, 1.5 V or less, 1.6 V or less, 1.7 V or less, 1.8 V or less, 1.9 V or less, or 2.0 V or less is applied across the anode and cathode, the pH of the second electrolyte solution increased; in another embodiment, when a volt of about 0.1 to 2.0 V is applied across the anode and cathode the pH of the second electrolyte increased; in yet another embodiment, when a voltage of about 0.1.0 to 1 V is applied across the anode and cathode the pH of the second electrolyte solution increased. Similar results are achievable with voltages of 0.1 to 0.8 V; 0.1 to 0.7 V; 0.1 to 0.6 V; 0.1 to 0.5 V; 0.1 to 0.4 V; and 0.1 to 0.3 V across the electrodes. In one embodiment, when a volt of about 0.6 volt or less is applied across the anode and cathode, the pH of the second electrolyte solution increased; in another embodiment, when a volt of about 0.1 to 0.6 volt or less is applied across the anode and cathode the pH of the second electrolyte increased; in yet another embodiment, when a voltage of about 0.1 to 1 volt or less is applied across the anode and cathode the pH of the second electrolyte solution increased.

Optionally, a gas including $CO_2$ is dissolve into the second electrolyte solution by bubbling the gas into the first electrolyte solution 804 as describe above. In an optional step the resulting second electrolyte solution is used to precipitate a carbonate and/or bicarbonate compounds such as calcium carbonate or magnesium carbonate and or their bicarbonates, as described herein. The precipitated carbonate compound can be used as cements and build material as described herein.

In another optional step, acidified second electrolyte solution 804 is utilized to dissolve a calcium and/or magnesium rich mineral, such as mafic mineral including serpentine or olivine for use as the solution for precipitating carbonates and bicarbonates as described herein. In various embodiments, the resulting solution can be used as the second electrolyte solution. Similarly, in embodiments where hydrochloric acid is produced in second electrolyte 806, the hydrochloric acid can be used in place of, or in addition to, the acidified second electrolyte solution.

Embodiments described above produce electrolyte solutions enriched in bicarbonate ions and carbonate ions, or combinations thereof as well as an acidified stream. The acidified stream can also find application in various chemical processes. For example, the acidified stream can be employed to dissolve calcium and/or magnesium rich minerals such as serpentine and olivine to create the electrolyte solution used in the reservoir 816. Such an electrolyte solution can be charged with bicarbonate ions and then made sufficiently basic so as to precipitate carbonate compounds as described herein.

In some embodiments, a first electrochemical process may be used to remove protons from solution to facilitate $CO_2$ absorption, without concomitant production of hydroxide, while a second electrochemical process may be used to produce hydroxide in order to further remove protons to shift equilibrium toward carbonate and cause precipitation of carbonates. The two processes may have different voltage requirements, e.g., the first process may require lower voltage than the second, thus minimizing total overall voltage used in the process. For example, the first process may be a bielectrode process as described above, operating at 1.0V or less, or 0.9V or less, or 0.8V or less, or 0.7V or less, or 0.6V or less, or 0.5V or less, or 0.4V or less, or 0.3V or less, or 0.2V or less, or 0.1V or less, while the second process may be a low-voltage hydroxide producing process as described above, operating at 1.5 V or less, or 1.4V or less, or 1.3V or less, or 1.2V or less, or 1.1 V or less, 1.0V or less, or 0.9V or less, or 0.8V or less, or 0.7V or less, or 0.6V or less, or 0.5V or less, or 0.4V or less, or 0.3V or less, or 0.2V or less, or 0.1V or less. For example, in some embodiments the first process is a bielectrode process operating at 0.6 V or less and the second process is a low-voltage hydroxide producing process operating at 1.2V or less.

Also of interest are the electrochemical approaches described in published United States Application Publication Nos. 20060185985 and 20080248350, as well as published PCT Application Publication No. WO 2008/018928; the disclosures of which are hereby incorporated by reference.

Stoichiometry dictates that the production of a carbonate to be precipitated in order to sequester $CO_2$ from a source of $CO_2$ requires the removal of two protons from the initial carbonic acid that is formed when $CO_2$ is dissolved in water (see equations 1-5, above). Removal of the first proton produces bicarbonate and removal of the second produces carbonate, which may be precipitated as, e.g., a carbonate of a divalent cation, such as magnesium carbonate or calcium carbonate. The removal of the two protons requires some process or combination of processes which typically require energy. For example, if the protons are removed through the addition of sodium hydroxide, the source of renewable sodium hydroxide is typically the chloralkali process, which uses an electrochemical process requiring at least 2.8 V and a fixed amount of electrons per mole of sodium hydroxide. That energy requirement may be expressed in terms of a carbon footprint, i.e., amount of carbon produced to provide the energy to drive the process.

A convenient way of expressing the carbon footprint for a given process of proton removal is as a percentage of the $CO_2$ removed from the source of $CO_2$. That is, the energy required for the removal of the protons may be expressed in terms of $CO_2$ emission of a conventional method of power generation to produce that energy, which may in turn be expressed as a percent of the $CO_2$ removed from the source of $CO_2$. For convenience, and as a definition in this aspect of the invention, the "$CO_2$ produced" in such a process will be considered the $CO_2$ that would be produced in a conventional coal/steam power plant to provide sufficient energy to remove two protons. Data are publicly available for such power plants for the last several years that show tons of $CO_2$ produced per total MWh of energy produced. See, e.g., the website having the address produced by combining "http://carma." with "org/api/". For purposes of definition here, a value of 1 ton $CO_2$ per MWh will be used, which corresponds closely to typical coal-fired power plants; for example, the WA Parish plant produced 18,200,000 MWh of energy in 2000 while producing approximately 19,500,000 tons of $CO_2$ and at present produces 21,300,00 MWh of energy while producing 20,900,000 tons of $CO_2$, which average out very close to the definitional 1 ton $CO_2$ per MWh that will be used herein. These numbers can then be used to calculate the $CO_2$ production necessary to remove sufficient protons to remove $CO_2$ from a gas stream, and compare it to the $CO_2$ removed. For example, in a process utilizing the chloralkali process operating at 2.8 V to provide base, and used to sequester CO2 from a coal/steam power plant, the amount of $CO_2$ produced by the power plant to supply the energy to create base by the chloralkali process to remove two protons, using the 1 ton $CO_2$/1MWh ratio, would be well above 200% of the amount of $CO_2$ sequestered by the removal of the two protons and precipitation of the $CO_2$ in stable form. As a further condition of the definition of "$CO_2$ produced" in this aspect of the invention, no theoretical or actual calculations of reduction of the energy load due to, e.g., reuse of byproducts of the process for removing the protons (e.g., in the case of the chloralkali process, use of hydrogen produced in the process in a fuel cell or by direct combustion to produce energy) are included in the total of "$CO_2$ produced." In addition, no theoretical or actual supplementation of the power supplied by the power plant with renewable sources of energy is considered, e.g., sources of energy that produce little or no carbon dioxide, such as wind, solar, tide, hydroelectric, and the like. If the process of removing protons includes the use of a hydroxide or other base, including a naturally-occurring or stockpiled base, the amount of $CO_2$ produced would be the amount that may be stoichiometrically calculated based on the process by which the base is produced, e.g., for industrially produced base, the standard chloralkali process or other process by which the base is produced, and for natural base, the best theoretical model for the natural production of the base.

Using this definition of "$CO_2$ produced," in some embodiments the invention includes forming a stable $CO_2$-containing precipitate from a human-produced gaseous source of $CO_2$, wherein the formation of the precipitate utilizes a process for removing protons from an aqueous solution in which a portion or all of the $CO_2$ of the gaseous source of $CO_2$ is dissolved, and wherein the $CO_2$ produced by the process of removing protons is less than 100, 90, 80, 70, 65, 60, 55, 50, 45, 40, 35, 30, 25, 20, 15, 10, or 5% of the $CO_2$ removed from the gaseous source of $CO_2$ by said formation of precipitate. In some embodiments, the invention includes forming a stable $CO_2$-containing precipitate from a human-produced gaseous source of $CO_2$, wherein the formation of the precipitate utilizes a process for removing protons from an aqueous solution in which a portion or all of the $CO_2$ of the gaseous source of $CO_2$ is dissolved, and wherein the $CO_2$ produced by the process of removing protons is less than 70% of the CO2 removed from the gaseous source of $CO_2$ by the formation of precipitate. In some embodiments the invention includes forming a stable CO2-containing precipitate from a human-produced gaseous source of $CO_2$, wherein the formation of the precipitate utilizes a process for removing protons from an aqueous solution in which a portion or all of the $CO_2$ of the gaseous source of $CO_2$ is dissolved, and wherein the $CO_2$ produced by the process of removing protons is less than 50% of the $CO_2$ removed from the gaseous source of $CO_2$ by the formation of precipitate. In some embodiments the invention includes forming a stable CO2-containing precipitate from a human-produced gaseous source of $CO_2$, wherein the formation of the precipitate utilizes a process for removing protons from an aqueous solution in which a portion or all of the $CO_2$ of the gaseous source of $CO_2$ is dissolved, and wherein the $CO_2$ produced by the process of removing protons is less than 30% of the $CO_2$ removed from the gaseous source of $CO_2$ by the formation of precipitate. In some embodiments, the process of removing protons is a process, such as an electrochemical process as described herein, that removes protons without producing a base, e.g., hydroxide. In some embodiments, the process of removing protons is a process, such as an electrochemical process as described herein, that removes protons by producing a base, e.g., hydroxide. In some embodiments, the process is a combination of a process, such as an electrochemical process as described herein, that removes protons without producing a base, e.g., hydroxide, and a process, such as an electrochemical process as described herein, that removes protons by producing a base, e.g., hydroxide. In some embodiments, the process of proton removal comprises an electrochemical process, either removes protons directly (e.g., direct removal of protons) or indirectly (e.g., production of hydroxide). In some embodiments a combination of processes, e.g., electrochemical processes is used, where a first process, e.g., electrochemical process, removes protons directly and a second process, e.g., electrochemical process, removes protons indirectly (e.g., by production of hydroxide).

In some instances, precipitation of the desired product following $CO_2$ charging (e.g., as described above) occurs without addition of a source divalent metal ions. As such, after the water is charged with $CO_2$, the water is not then contacted with a source of divalent metal ions, such as one or more divalent metal ion salts, e.g., calcium chloride, magnesium chloride, sea salts, etc.

In one embodiment of the invention, a carbonate precipitation process may be employed to selectively precipitate calcium carbonate materials from the solution in order to provide the desired ratio of magnesium to calcium, followed by additional $CO_2$ charging, and in some embodiments additional Mg ion charging, and a final carbonate precipitation step. This embodiment is useful in utilizing concentrated waters such as desalination brine, wherein the cation content is sufficiently high that addition of more Mg ions is difficult. This embodiment is also useful in solutions of any concentration where two different products are desired to be produced—a primarily calcium carbonate material, and then a magnesium carbonate dominated material.

The yield of product from a given precipitation reaction may vary depending on a number of factors, including the specific type of water employed, whether or not the water is supplemented with divalent metal ions, the particular precipitation protocol employed, etc. In some instances, the precipitate protocols employed to precipitate the product are high yield precipitation protocols. In these instances, the amount of product produced from a single precipitation reaction (by which is meant a single time that that the water is subjected to precipitation conditions, such as increasing the pH to a value of 9.5 or higher, such as 10 or higher as reviewed above in greater detail) may be 5 g or more, such as 10 g or more, 15 g or more, 20 g or more, 25 g or more, 30 g or more, 35 g or more, 40 g or more, 45 g or more, 50 g or more, 60 g or more, 70 g or more, 80 g or more, 90 g or more, 100 g or more, 120 g or more, 140 g or more, 160 g or more, 180 g or more, 200 g or more of the storage stable carbon dioxide sequestering product for every liter of water. In some instances, the amount of product produced for every liter of water ranges from 5 to 200 g, such as 10 to 100 g, including 20 to 100 g. In instances where the divalent metal ion content of the water is not supplemented prior to subjecting the water to precipitate conditions (for example where the water is seawater and the seawater is not supplemented with a source of divalent metal ion or ions), the yield of product may range from 5 to 20 g product per liter of water, such as 5 to 10, e.g., 6 to 8, g product per liter of water. In other instances where the water is supplemental with a source of divalent metal ions, such as magnesium and/or calcium ions, the yield of product may be higher, 2-fold higher, 3-fold higher, 5-fold higher, 10-fold higher, 20-fold higher or more, such that the yield of such processes may range in some embodiments from 10 to 200, such as 50 to 200 including 100 to 200 g product for every liter of water subjected to precipitation conditions.

In certain embodiments, a multi-step process is employed. In these embodiments, a carbonate precipitation process may be employed to selectively precipitate calcium carbonate materials from the solution, followed by additional steps of $CO_2$ charging and subsequent carbonate precipitation. The steps of additional $CO_2$ charging and carbonate precipitation can in some cases be repeated one, two, three, four, five, six, seven, eight, nine, ten, or more times, precipitating additional amounts of carbonate material with each cycle. In some cases, the final pH ranges from about 8 to 10, such as from about 9 to 10, including from about 9.5 to 10, for example, from about 9.6 to 9.8.

In certain embodiments, two or more reactors may be used to carry out the methods described herein. In these embodiments, the method may include a first reactor and a second reactor. In these cases, the first reactor is used for contacting the initial water with a magnesium ion source and for charging the initial water with $CO_2$, as described above. The water may be agitated to facilitate the dissolution of the magnesium ion source and to facilitate contact of the initial water with the $CO_2$. In some cases, before the $CO_2$ charged water is transferred to the second reactor, agitation of the $CO_2$ charged water is stopped, such that undissolved solids may settle by gravity. The $CO_2$ charged water is then transferred from the first reactor to the second reactor. After transferring the $CO_2$ charged water to the second reactor, the step of carbonate precipitation may be performed, as described herein.

In certain embodiments, a multi-step process, as described above, employing two or more reactors, as described above, can be used to carry out the methods described herein. In these embodiments, a first reactor is used for contacting the initial water with a magnesium ion source and for charging the initial water with $CO_2$, as described above. Subsequently, the $CO_2$ charged water is transferred from the first reactor to a second reactor for the carbonate precipitation reaction. In certain embodiments, one or more additional steps of $CO_2$ charging and subsequent carbonate precipitation may be performed in the second reactor, as described above.

In certain embodiments, precipitation conditions can be used that favor the formation of particular morphologies of carbonate compound precipitates. For instance, precipitation conditions can be used that favor the formation of amorphous carbonate compound precipitates over the formation of crystalline carbonate compound precipitates. In these cases, in addition to contacting the initial water with a magnesium ion source and charging the initial water with $CO_2$, as described above, a precipitation facilitator may be added. In these cases, the precipitation facilitator facilitates the formation of carbonate compound precipitates at lower pH's sufficient for nucleation, but insufficient for crystal formation and growth. Examples of precipitation facilitators include, but are not limited to, aluminum sulfate $(Al_2SO_4)_3$. In certain embodiments, the amount of precipitation facilitator added ranges from about 1 ppm to about 1000 ppm, such as from about 1 ppm to about 500, including from about 10 ppm to about 200 ppm, for example from about 25 ppm to about 75 ppm. Additionally, the pH of the water can be maintained between about 6 and 8, such as between about 7 and 8, during carbonate compound precipitation formation by alternating $CO_2$ charging and subsequent carbonate precipitation, as described above.

Alternatively, in yet other embodiments, precipitation conditions can be used that favor the formation of crystalline carbonate compound precipitates over the formation of amorphous carbonate compound precipitates.

Further details regarding specific precipitation protocols employed in certain embodiments of the invention are provided below with respect to the description of the figures of the application.

Following production of the precipitate product from the water, a composition is produced which includes precipitated product and a mother liquor (i.e., the remaining liquid from which the precipitated product was produced). This composition may be a slurry of the precipitate and mother liquor.

As summarized above, in sequestering carbon dioxide, the precipitated product is disposed of in some manner following its production. The phrase "disposed of" means that the product is either placed at a storage site or employed for a further use in another product, i.e., a manufactured or man-made item, where it is stored in that other product at least for the expected lifetime of that other product. In some instances, this disposal step includes forwarding the slurry composition described above to a long term storage site. The storage site could be an above ground site, a below ground site or an underwater site. In these embodiments, following placement of the slurry at the storage site, the mother liquor component of the slurry may naturally separate from the precipitate, e.g., via evaporation, dispersal, etc.

Where desired, the resultant precipitated product may be separated from the resultant mother liquor. Separation of the precipitate can be achieved using any convenient approach. For example, separation may be achieved by drying the precipitated product to produce a dried precipitated product. Drying protocols of interest include filtering the precipitate from the mother liquor to produce a filtrate and then air drying the filtrate. Where the filtrate is air dried, air drying may be at a temperature ranging from −70 to 120° C., as desired. In some instances, drying may include placing the slurry at a drying site, such as a tailings pond, and allowing the liquid component of the precipitate to evaporate and leave behind the desired dried product. Also of interest are freeze-drying (i.e., lyophilization) protocols, where the precipitate is frozen, the surrounding pressure is reduced and enough heat is added to allow the frozen water in the material to sublime directly from the frozen precipitate phase to gas. Yet another drying protocol of interest is spray drying, where the liquid containing the precipitate is dried by feeding it through a hot gas, e.g., where the liquid feed is pumped through an atomiser into a main drying chamber and a hot gas is passed as a co-current or counter-current to the atomiser direction.

Where the precipitated product is separated from the mother liquor, the resultant precipitate may be disposed of in a variety of different ways, as further elaborated below. For example, the precipitate may be employed as a component of a building material, as reviewed in greater detail below. Alternatively, the precipitate may be placed at a long term storage site (sometimes referred to in the art as a carbon bank), where the site may be above ground site, a below ground site or an underwater site. Further details regarding disposal protocols of interest are provided below.

The resultant mother liquor may also be processed as desired. For example, the mother liquor may be returned to the source of the water, e.g., ocean, or to another location. In certain embodiments, the mother liquor may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The methods of the invention may be carried out at land or sea, e.g., at a land location where a suitable water is present at or is transported to the location, or in the ocean or other body of alkali-earth-metal-containing water, be that body naturally occurring or manmade. In certain embodiments, a system is employed to perform the above methods, where such systems include those described below in greater detail.

The above portion of this application provides an overview of various aspects of the methods of the invention. Certain embodiments of the invention are now reviewed further in greater detail in terms of the certain figures of the invention.

FIG. 1 provides a schematic flow diagram of a carbon dioxide sequestration process that may be implemented in a system, where the system may be manifested as a stand-alone plant or as an integrated part of another type of plant, such as a power generation plant, a cement production plant, etc. In FIG. 1, water 10 is delivered to a precipitation reactor 20, e.g., via a pipeline or other convenient manner, and subjected to carbonate mineral precipitation conditions. The water employed in the process illustrated in FIG. 1 is one that includes one or more alkaline earth metals, e.g., calcium, magnesium etc., such that it may be viewed as an alkaline-earth-metal-ion-containing water, as reviewed above. In certain embodiments of the invention, the water of interest is one that includes calcium in amounts ranging from 50 ppm to 20,000 ppm, such as 200 ppm to 5000 ppm and including 400 ppm to 1000 ppm. Also of interest are waters that include magnesium in amounts ranging from 50 ppm to 40,000 ppm, such as 100 ppm to 10,000 ppm and including 500 ppm to 2500 ppm. In embodiments of the invention, the alkaline-earth-metal-ion-containing water is a saltwater. As reviewed above, saltwaters of interest include a number of different types of aqueous fluids other than fresh water, such as brackish water, sea water and brine (including man-made brines, for example geothermal plant wastewaters, desalination waste waters, etc., as well as naturally occurring brines as described herein), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt. Freshwater is water which has a salinity of less than 5 ppt dissolved salts. Saltwaters of interest may be obtained from a naturally occurring source, such as a sea, ocean, lake, swamp, estuary, lagoon, etc., or a man-made source, as desired.

As reviewed above, waters of interest also include freshwaters. In certain embodiments, the water employed in the invention may be a mineral rich, e.g., calcium and/or magnesium rich, freshwater source. In some embodiments, freshwaters, such as calcium rich waters may be combined with magnesium silicate minerals, such as olivine or serpentine, in a solution that has become acidic due to the addition of carbon dioxide from carbonic acid, which dissolves the magnesium silicate, leading to the formation of calcium magnesium silicate carbonate compounds. In certain embodiments, the water source can be freshwater wherein metal-ions, e.g., sodium, potassium, calcium, magnesium, etc. are added. Metal-ions can be added to the freshwater source using any convenient protocol, e.g., as a solid, aqueous solution, suspension etc.

In certain embodiments, the water may be obtained from the industrial plant that is also providing the gaseous waste stream. For example, in water cooled industrial plants, such as seawater cooled industrial plants, water that has been employed by the industrial plant may then be sent to the precipitation system and employed as the water in the precipitation reaction. Where desired, the water may be cooled prior to entering the precipitation reactor. Such approaches may be employed, e.g., with once-through cooling systems. For example, a city or agricultural water supply may be employed as a once-through cooling system for an industrial plant. The water from the industrial plant may then be employed in the precipitation protocol, where output water has a reduced hardness and greater purity. Where desired, such systems may be modified to include security measures, e.g., to detect tampering (such as addition of poisons) and coordinated with governmental agencies, e.g., Homeland Security or other agencies. Additional tampering or attack safeguards may be employed in such embodiments.

As shown in FIG. 1, an industrial plant gaseous waste stream 30 is contacted with the water at precipitation step 20 to produce a $CO_2$ charged water. By $CO_2$ charged water is meant water that has had $CO_2$ gas contacted with it, where $CO_2$ molecules have combined with water molecules to produce, e.g., carbonic acid, bicarbonate and carbonate ion. Charging water in this step results in an increase in the "$CO_2$ content" of the water, e.g., in the form of carbonic acid, bicarbonate and carbonate ion, and a concomitant decrease in the amount of $CO_2$ of the waste stream that is contacted with the water. The $CO_2$ charged water is acidic in some embodiments, having a pH of 6.0 or less, such as 4.0 or less and including 3.0 and less. In certain embodiments, the amount of $CO_2$ of the gas that is used to charge the water decreases by 85% or more, such as 99% or more as a result of this contact step, such that the methods remove 50% or more, such as 75% or more, e.g., 85% or more, including 99% or more of the $CO_2$ originally present in the gaseous waste stream that is contacted with the water. Contact protocols of interest include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. The gaseous stream may contact the water source vertically, horizontally, or at some other angle. The $CO_2$ may be contacted with the water source from one or more of the following positions: below, above, or at the surface level of the alkaline-earth-metal-ion-containing water. Contact may be accomplished through the use of infusers, bubblers, fluidic Venturi reactor, sparger, gas filter, spray, tray, catalytic bubble column reactors, draft-tube type reactors or packed column reactors, and the like, as may be convenient. Where desired, two or more different $CO_2$ charging reactors (such as columns or other types of reactor configurations) may be employed, e.g., in series, such as three or more, four or more, etc. In certain embodiments, various means, e.g., mechanical stirring, electromagnetic stirring, spinners, shakers, vibrators, blowers, ultrasonication, to agitate or stir the reaction solution are used to increase the contact between $CO_2$ and the water source.

As reviewed above, the gas from the industrial plant 30 may be processed before being used to charge the water. For example, the gas may be subjected to oxidation conditions, e.g., to convert CO to $CO_2$, NO to $NO_2$, and $SO_2$ to $SO_3$, where desired.

At step 20, the storage stable product is precipitated at precipitation step 20. Precipitation conditions of interest include those that modulate the physical environment of the water to produce the desired precipitate product. For example, the temperature of the water may be raised to an amount suitable for precipitation of the desired carbonate mineral to occur. In such embodiments, the temperature of the water may be raised to a value from 5 to 70° C., such as from 20 to 50° C. and including 25 to 45° C. As such, while a given set of precipitation conditions may have a temperature ranging from 0 to 100° C., the temperature may be raised in certain embodiments to produce the desired precipitate. In certain embodiments, the temperature is raised using energy generated from low- or zero-carbon dioxide emission sources, e.g., solar energy source, wind energy source, hydroelectric energy source, etc. In certain embodiments, excess and/or process heat from the industrial plant carried in the gaseous waste stream is employed to raise the temperature of the water during precipitation either as hot gases or steam. In certain embodiments, contact of the water with the gaseous waste stream may have raised the water to the desired temperature, where in other embodiments, the water may need to be cooled to the desired temperature.

In normal sea water, 93% of the dissolved $CO_2$ is in the form of bicarbonate ions ($HCO_3^-$) and 6% is in the form of carbonate ions ($CO_3^{-2}$). When calcium carbonate precipitates from normal sea water, $CO_2$ is released. In fresh water, above pH 10.33, greater than 90% of the carbonate is in the form of carbonate ion, and no $CO_2$ is released during the precipitation of calcium carbonate. In sea water this transition occurs at a slightly lower pH, closer to a pH of 9.7. While the pH of the water employed in methods may range from 5 to 14 during a given precipitation process, in certain embodiments the pH is raised to alkaline levels in order to drive the precipitation of carbonate compounds, as well as other compounds, e.g., hydroxide compounds, as desired. In certain of these embodiments, the pH is raised to a level which minimizes if not eliminates $CO_2$ production during precipitation, causing dissolved $CO_2$, e.g., in the form of carbonate and bicarbonate, to be trapped in the carbonate compound precipitate. In these embodiments, the pH may be raised to 9 or higher, such as 10 or higher, including 11 or higher.

As summarized above, the pH of the alkaline-earth-metal-ion-containing source is raised using any convenient approach. In certain embodiments, a pH raising agent may be employed, where examples of such agents include oxides (calcium oxide, magnesium oxide), hydroxides (e.g., potassium hydroxide, sodium hydroxide, brucite ($Mg(OH)_2$, etc.), carbonates (e.g., sodium carbonate) and the like.

In embodiments of the invention, ash is employed as a pH modifying agent, e.g., to increase the pH of the $CO_2$ charged water. The ash may be used as a as the sole pH modifier or in conjunction with one or more additional pH modifiers. Of interest in certain embodiments is use of a coal ash as the ash. The coal ash as employed in this invention refers to the residue produced in power plant boilers or coal burning furnaces, for example, chain grate boilers, cyclone boilers and fluidized bed boilers, from burning pulverized anthracite, lignite, bituminous or sub-bituminous coal. Such coal ash includes fly ash which is the finely divided coal ash carried from the furnace by exhaust or flue gases; and bottom ash which collects at the base of the furnace as agglomerates.

Fly ashes are generally highly heterogeneous, and include of a mixture of glassy particles with various identifiable crystalline phases such as quartz, mullite, and various iron oxides. Fly ashes of interest include Type F and Type C fly ash. The Type F and Type C flyashes referred to above are defined by CSA Standard A23.5 and ASTM C618. The chief difference between these classes is the amount of calcium, silica, alumina, and iron content in the ash. The chemical properties of the fly ash are largely influenced by the chemical content of the coal burned (i.e., anthracite, bituminous, and lignite). Fly ashes of interest include substantial amounts of silica (silicon dioxide, $SiO_2$) (both amorphous and crystalline) and lime (calcium oxide, CaO, magnesium oxide, MgO).

Table 3 below provides the chemical makeup of various types of fly ash that find use in embodiments of the invention.

TABLE 3

| Component | Bituminous | Subbituminous | Lignite |
|---|---|---|---|
| $SiO_2$ (%) | 20-60 | 40-60 | 15-45 |
| $Al_2O_3$ (%) | 5-35 | 20-30 | 20-25 |
| $Fe_2O_3$ (%) | 10-40 | 4-10 | 4-15 |
| CaO (%) | 1-12 | 5-30 | 15-40 |

The burning of harder, older anthracite and bituminous coal typically produces Class F fly ash. Class F fly ash is pozzolanic in nature, and contains less than 10% lime (CaO). Fly ash produced from the burning of younger lignite or subbituminous coal, in addition to having pozzolanic properties, also has some self-cementing properties. In the presence of water, Class C fly ash will harden and gain strength over time. Class C fly ash generally contains more than 20% lime (CaO). Alkali and sulfate ($SO_4$) contents are generally higher in Class C fly ashes.

Fly ash material solidifies while suspended in exhaust gases and is collected using various approaches, e.g., by electrostatic precipitators or filter bags. Since the particles solidify while suspended in the exhaust gases, fly ash particles are generally spherical in shape and range in size from 0.5 µm to 100 µm. Flyashes of interest include those in which at least about 80%, by weight comprises particles of less than 45 microns. Also of interest in certain embodiments of the invention is the use of highly alkaline fluidized bed combustor (FBC) fly ash.

Also of interest in embodiments of the invention is the use of bottom ash. Bottom ash is formed as agglomerates in coal combustion boilers from the combustion of coal. Such combustion boilers may be wet bottom boilers or dry bottom boilers. When produced in a wet or dry bottom boiler, the bottom ash is quenched in water. The quenching results in agglomerates having a size in which 90% fall within the particle size range of 0.1 mm to 20 mm, where the bottom ash agglomerates have a wide distribution of agglomerate size within this range. The main chemical components of a bottom ash are silica and alumina with lesser amounts of oxides of Fe, Ca, Mg, Mn, Na and K, as well as sulphur and carbon.

Also of interest in certain embodiments is the use of volcanic ash as the ash. Volcanic ash is made up of small tephra, i.e., bits of pulverized rock and glass created by volcanic eruptions, less than 2 millimetres (0.079 in) in diameter.

In one embodiment of the invention, cement kiln dust (CKD) is added to the reaction vessel as a means of modifying pH. The nature of the fuel from which the ash and/or CKD were produced, and the means of combustion of said fuel, will influence the chemical composition of the resultant ash and/or CKD. Thus ash and/or CKD may be used as a portion of the means for adjusting pH, or the sole means, and a variety of other components may be utilized with specific ashes and/or CKDs, based on chemical composition of the ash and/or CKD.

In embodiments of the invention, ash is added to the reaction as one source of these additional reactants, to produce carbonate mineral precipitates which contain one or more components such as amorphous silica, crystalline silica, calcium silicates, calcium alumina silicates, or any other moiety which may result from the reaction of ash in the carbonate mineral precipitation process.

The ash employed in the invention may be contacted with the water to achieve the desired pH modification using any convenient protocol, e.g., by placing an amount of ash into the reactor holding the water, where the amount of ash added is sufficient to raise the pH to the desired level, by flowing the water through an amount of the ash, e.g., in the form of a column or bed, etc.

In certain embodiments where the pH is not raised to a level of 12 or higher, the fly ash employed in the method, e.g., as described below, may not dissolve but instead will remain as a particulate composition. This un-dissolved ash may be separated from the remainder of the reaction product, e.g., filtered out, for a subsequent use. Alternatively, the water may be flowed through an amount of ash that is provided in an immobilized configuration, e.g., in a column or analogous structure, which provides for flow through of a liquid through the ash but does not allow ash solid to flow out of the structure with the liquid. This embodiment does not require separation of un-dissolved ash from the product liquid. In yet other embodiments where the pH exceeds 12, the ash dissolved and provides for pozzolanic products, e.g., as described in greater detail elsewhere.

In embodiments of the invention where ash is utilized in the precipitation process, the ash may first be removed from the flue gas by means such as electrostatic precipitation, or may be utilized directly via the flue gas. The use of ash in embodiments of the invention may provide reactants such as alumina or silica in addition to raising the pH.

In certain embodiments of the invention, slag is employed as a pH modifying agent, e.g., to increase the pH of the $CO_2$ charged water. The slag may be used as a as the sole pH modifier or in conjunction with one or more additional pH modifiers, e.g., ashes, etc. Slag is generated from the processing of metals, and may contain calcium and magnesium oxides as well as iron, silicon and aluminum compounds. In certain embodiments, the use of slag as a pH modifying material provides additional benefits via the introduction of reactive silicon and alumina to the precipitated product. Slags of interest include, but are not limited to, blast furnace slag from iron smelting, slag from electric-arc or blast furnace processing of steel, copper slag, nickel slag and phosphorus slag.

As indicated above, ash (or slag in certain embodiments) is employed in certain embodiments as the sole way to modify the pH of the water to the desired level. In yet other embodiments, one or more additional pH modifying protocols is employed in conjunction with the use of ash.

Alternatively or in conjunction with the use of a pH elevating agent (such as described above), the pH of the alkaline-earth-metal-ion-containing water source can be raised to the desired level by electrolysis of the water using an electrolytic or electrochemical protocol. Electrochemical protocols of interest include, but are not limited, those described above as well as those described in U.S. Provisional Application Ser. Nos. 61/081,299 and 61/091,729; the disclosures of which are herein incorporated by reference. Also of interest are the electrolytic approaches described in published United States Application Publication Nos. 20060185985 and 20080248350, as well as published PCT Application Publication No. WO 2008/018928; the disclosures of which are hereby incorporated by reference.

Where desired, additives other than pH elevating agents may also be introduced into the water in order to influence the nature of the precipitate that is produced. As such, certain embodiments of the methods include providing an additive in the water before or during the time when the water is subjected to the precipitation conditions. Certain calcium carbonate polymorphs can be favored by trace amounts of certain additives. For example, vaterite, a highly unstable polymorph of $CaCO_3$ which precipitates in a variety of different morphologies and converts rapidly to calcite, can be obtained at very high yields by including trace amounts of lanthanum as lanthanum chloride in a supersaturated solution of calcium carbonate. Other additives besides lanthanum that are of interest include, but are not limited to transition metals and the like. For instance, the addition of ferrous or ferric iron is known to favor the formation of disordered dolomite (protodolomite) where it would not form otherwise.

The nature of the precipitate can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph.

Rate of precipitation also has a large effect on compound phase formation. The most rapid precipitation can be achieved by seeding the solution with a desired phase. Without seeding, rapid precipitation can be achieved by rapidly increasing the pH of the sea water, which results in more amorphous constituents. When silica is present, the more rapid the reaction rate, the more silica is incorporated with the carbonate precipitate. The higher the pH is, the more rapid the precipitation is and the more amorphous the precipitate is.

Accordingly, a set of precipitation conditions to produce a desired precipitate from a water include, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system.

In certain embodiments, contact between the alkaline-earth-metal-ion containing water and $CO_2$ may be accomplished using any convenient protocol, (e.g., spray gun, segmented flow-tube reactor) to control the range of sizes of precipitate particles. One or more additives may be added to the metal-ion containing water source, e.g., flocculents, dispersants, surfactants, antiscalants, crystal growth retarders, sequestration agents etc, in the methods and systems of the claimed invention in order to control the range of sizes of precipitate particles.

In the embodiment depicted in FIG. 1, the water from the alkaline-earth-metal-ion-containing water source 10 is first charged with $CO_2$ to produce $CO_2$ charged water, which $CO_2$ is then subjected to carbonate mineral precipitation conditions. As depicted in FIG. 1, a $CO_2$ gaseous stream 30 is contacted with the water at precipitation step 20. The provided gaseous stream 30 is contacted with a suitable water at precipitation step 20 to produce a $CO_2$ charged water. By $CO_2$ charged water is meant water that has had $CO_2$ gas contacted with it, where $CO_2$ molecules have combined with water molecules to produce, e.g., carbonic acid, bicarbonate and carbonate ion. Charging water in this step results in an increase in the "$CO_2$ content" of the water, e.g., in the form of carbonic acid, bicarbonate and carbonate ion, and a concomitant decrease in the $pCO_2$ of the waste stream that is contacted with the water. The $CO_2$ charged water can be acidic, having a pH of 6 or less, such as 5 or less and including 4 or less. In some embodiments, the $CO_2$ charged water is not acidic, e.g., having a pH of 7 or more, such as a pH of 7-10, or 7-9, or 7.5-9.5, or 8-10, or 8-9.5, or 8-9. In certain embodiments, the concentration of $CO_2$ of the gas that is used to charge the water is 10% or higher, 25% or higher, including 50% or higher, such as 75% or higher.

$CO_2$ charging and carbonate mineral precipitation may occur in the same or different reactors of the system. As such, charging and precipitation may occur in the same reactor of a system, e.g., as illustrated in FIG. 1 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor. Further reactors may be used to, e.g., charge the water with desired minerals.

Contact of the water with the source $CO_2$ may occur before and/or during the time when the water is subjected to $CO_2$ precipitation conditions. Accordingly, embodiments of the invention include methods in which the volume of water is contacted with a source of $CO_2$ prior to subjecting the volume of alkaline-earth-metal-ion-containing water to mineral precipitation conditions. Embodiments of the invention also include methods in which the volume of water is contacted with a source of $CO_2$ while the volume of water is being subjected to carbonate compound precipitation conditions. Embodiments of the invention include methods in which the volume of water is contacted with a source of a $CO_2$ both prior to subjecting the volume of alkaline-earth-metal-ion-containing water to carbonate compound precipitation conditions and while the volume of water is being subjected to carbonate compound precipitation conditions. In some embodiments, the same water may be cycled more than once, wherein a first cycle of precipitation removes primarily calcium carbonate and magnesium carbonate minerals, and leaves remaining alkaline-earth-metal-ion-containing water to which other alkaline-earth-metal-ion sources may be added, that can have more $CO_2$ cycled through it, precipitating more carbonate compounds.

Regardless of when the $CO_2$ is contacted with the water, in some instances when the $CO_2$ is contacted with the water, the water is not exceedingly alkaline, such that the water contacted with the $CO_2$ may have a pH of 10 or lower, such as 9.5 or lower, including 9 or lower and even 8 or lower. In some embodiments, the water that is contacted with the $CO_2$ is not a water that has first been made basic from an electrochemical protocol. In some embodiments, the water that is contacted with the $CO_2$ is not a water that has been made basic by addition of hydroxides, such as sodium hydroxide. In some embodiment, the water is one that has been made only slightly alkaline, such as by addition of an amount of an oxide, such as calcium oxide or magnesium oxide.

The carbonate mineral precipitation station 20 (i.e., reactor) may include any of a number of different components, such as temperature control components (e.g., configured to heat the water to a desired temperature), chemical additive components, e.g., for introducing chemical pH elevating agents (such as KOH, NaOH) into the water, electrolysis components, e.g., cathodes/anodes, etc, gas charging components, pressurization components (for example where operating the protocol under pressurized conditions, such as from 50-800 psi, or 100-800 psi, or 400 to 800 psi, or any other suitable pressure range, is desired) etc, mechanical agitation and physical stirring components and components to re-circulate industrial plant flue gas through the precipitation plant. The precipitation station 20 may contain components that allow for the monitoring of one or more parameters such as internal reactor pressure, pH, precipitate particle size, metal-ion concentration, conductivity and alkalinity of the aqueous solution, and $pCO_2$. Monitoring conditions during the carbonate precipitation process can allow for corrective adjustments to be made during processing, or if desired, to increase or decrease carbonate compound precipitation production.

Following production of the storage stable precipitated $CO_2$ product from the water, the resultant precipitated product may be separated from the mother liquor to produce separated precipitate product, as illustrated at step 40 of FIG. 1. In some embodiments the precipitate is not separated, or is only partially separated, from the mother liquor. In such embodiments, the mother liquor including some or all of the precipitate may be disposed of by any suitable means. In some embodiments, the mother liquor including some or all of the precipitate is transported to a land or water location and placed at the location, e.g., the mother liquor including some or all of the precipitate may be transported to the ocean; this is especially useful in embodiments wherein the source of water is seawater. It will be appreciated that the carbon footprint, amount of energy used, and/or amount of $CO_2$ produced for sequestering a given amount of $CO_2$ from an industrial exhaust gas is minimized in a process where no further processing beyond disposal occurs with the precipitate. Separation of the precipitate can be achieved using any convenient approach, including a mechanical approach, e.g., where bulk excess water 42 is drained from the precipitate, e.g., either by gravity alone or with the addition of vacuum, mechanical pressing (where energy for mechanical pressing can be obtained from the industrial plant by connecting to the steam turbine, from crushing equipment used to make pulverized coal, etc.) by filtering the precipitate from the mother liquor to produce a filtrate, etc. Separation can also be achieved by centrifugation or by gravitational sedimentation of the precipitated product followed by drainage of the mother liquor. Separation of bulk water produces a wet dewatered precipitate.

In the embodiment illustrated in FIG. 1, the resultant dewatered precipitate is then dried to produce a product, as illustrated at step 60 of FIG. 1. Drying can be achieved by air drying the filtrate. Where the filtrate is air dried, air drying may be at room or elevated temperature. In certain embodiments, the elevated temperature is provided by the industrial plant gaseous waste stream, as illustrated at step 70 of FIG. 2. In these embodiments, the gaseous waste stream (e.g., flue gas) from the power plant may be first used in the drying step, where the gaseous waste stream may have a temperature ranging from 30 to 700° C., such as 75 to 300° C. The gaseous waste stream may be contacted directly with the wet precipitate in the drying stage, or used to indirectly heat gases (such as air) in the drying stage. The desired temperature may be provided in the gaseous waste stream by having the gas conveyer, e.g., duct, from the industrial plant originate at a suitable location, e.g., at a location a certain distance in the HRSG or up the flue, as determined based on the specifics of the exhaust gas and configuration of the industrial plant. In yet another embodiment, the precipitate is spray dried to dry the precipitate, where the liquid containing the precipitate is dried by feeding it through a hot gas (such as the gaseous waste stream from the industrial plant), e.g., where the liquid feed is pumped through an atomizer into a main drying chamber and hot gas is passed as a co-current or counter-current to the atomizer direction. In certain embodiments, drying is achieved by freeze-drying (i.e., lyophilization), where the precipitate is frozen, the surrounding pressure is reduced and enough heat is added to allow the frozen water in the material to sublime directly from the frozen precipitate phase to gas. Depending on the particular drying protocol of the system, the drying station may include a filtration element, freeze drying structure, spray drying structure, etc.

Where desired, the dewatered precipitate product from the separation reactor 40 may be washed before drying, as illustrated at optional step 50 of FIG. 1. The precipitate may be washed with freshwater 52, e.g., to remove salts (such as NaCl) from the dewatered precipitate. Used wash water may be disposed of 54 as convenient, e.g., disposing of it in a tailings pond, etc.

In certain embodiments of the invention, the precipitate can be separated, washed, and dried in the same station for all processes, or in different stations for all processes or any other possible combination. For example, in one embodiment, the precipitation and separation may occur in precipitation reactor 20, but drying and washing occur in different reactors. In yet another embodiment, precipitation, separation, and drying may occur all in the precipitation reactor 20 and washing occurring in a different reactor.

Following separation of the precipitate from the mother liquor, e.g., as described above, the separated precipitate may be further processed as desired. In certain embodiments, the precipitate may then be transported to a location for long term storage, effectively sequestering $CO_2$. For example, the precipitate may be transported and placed at long term storage sites, e.g., above ground, below ground, in the deep ocean, etc. as desired.

The dried product may be disposed of 62 in a number of different ways. In certain embodiments, the precipitate product is transported to a location for long term storage, effectively sequestering $CO_2$ in a stable precipitated product, e.g., as a storage stable above ground $CO_2$ sequestering material. For example, the precipitate may be stored at a long term storage site adjacent to the industrial plant and precipitation system. In yet other embodiments, the precipitate may be transported and placed at long term storage sites, e.g., above ground, below ground, etc. as desired, where the long term storage site is distal to the power plant (which may be desirable in embodiments where real estate is scarce in the vicinity of the power plant). In these embodiments where the precipitate is transported to a long term storage site, it may be transported in empty conveyance vehicles (e.g., barges, train cars, trucks, etc.) that were employed to transport the fuel or other materials to the industrial plant and/or precipitation plant. In this manner, conveyance vehicles used to bring fuel to the industrial plant, materials to the precipitation plant (e.g., alkali sources) may be employed to transport precipitated product, and therefore sequester $CO_2$ from the industrial plant.

In certain embodiments, the composition is disposed of in an underwater location. Underwater locations may vary depending on a particular application. While the underwater location may be an inland underwater location, e.g., in a lake, including a freshwater lake, or interest in certain embodiments are ocean or sea underwater locations. The composition may be still in the mother liquor, without separation or without complete separation, or the composition may have been separated from the mother liquor. The underwater location may be shallow or deep. Shallow locations are locations which are 200 feet or less, such as 150 feet or less, including 1000 feet or less. Deep locations are those which are 200 feet or more, e.g., 500 feet or more, 1000 feet or more, 2000 feet or more, including 5000 feet or more.

Where desired, the compositions made up of the precipitate and the mother liquor may be stored for a period of time following precipitation and prior to disposal. For example, the composition may be stored for a period of time ranging from 1 to 1000 days or longer, such as 1 to 10 days or longer, at a temperature ranging from 1 to 40° C., such as 20 to 25° C.

Any convenient protocol for transporting the composition to the site of disposal may be employed, and will necessarily vary depending on the locations of the precipitation reactor and site of disposal relative to each other, where the site of disposal is an above ground or below ground site disposal, etc.

In certain embodiments, a pipeline or analogous slurry conveyance structure is employed, where these approaches may include active pumping, gravitational mediated flow, etc., as desired.

While in certain embodiments the precipitate is directly disposed at the disposal site without further processing following precipitation, in yet other embodiments the composition may be further processed prior to disposal. For example, in certain embodiments solid physical shapes may be produced from the composition, where the resultant shapes are then disposed of at the disposal site of interest. One example of this embodiment is where artificial reef structures are produced from the carbonate compound compositions, e.g., by placing the flowable composition in a suitable mold structure and allowing the composition to solidify over time into the desired shape. The resultant solid reef structures may then be deposited in a suitable ocean location, e.g., a shallow underwater locations, to produce an artificial reef, as desired.

In certain embodiments, the precipitate produced by the methods of the invention is disposed of by employing it in an article of manufacture. In other words, the product is employed to make a man-made item, i.e., a manufactured item. The product may be employed by itself or combined with one or more additional materials, such that it is a component of the manufactured items. Manufactured items of interest may vary, where examples of manufactured items of interest include building materials and non-building materials, such as non-cementitious manufactured items. Building materials of interest include components of concrete, such as cement, aggregate (both fine and coarse), supplementary cementitious materials, etc. Building materials of interest also include pre-formed building materials.

Where the product is disposed of by incorporating the product in a building material, the $CO_2$ from the gaseous waste stream of the industrial plant is effectively sequestered in the built environment. Examples of using the product in a building material include instances where the product is employed as a construction material for some type of manmade structure, e.g., buildings (both commercial and residential), roads, bridges, levees, dams, and other manmade structures etc. The building material may be employed as a structure or nonstructural component of such structures. In such embodiments, the precipitation plant may be co-located with a building products factory.

In certain embodiments, the precipitate product is refined (i.e., processed) in some manner prior to subsequent use. Refinement as illustrated in step 80 of FIG. 1 may include a variety of different protocols. In certain embodiments, the product is subjected to mechanical refinement, e.g., grinding, in order to obtain a product with desired physical properties, e.g., particle size, etc. In certain embodiments, the precipitate is combined with a hydraulic cement, e.g., as a supplemental cementitious material, as a sand, a gravel, as an aggregate, etc. In certain embodiments, one or more components may be added to the precipitate, e.g., where the precipitate is to be employed as a cement, e.g., one or more additives, sands, aggregates, supplemental cementitious materials, etc. to produce final product, e.g., concrete or mortar, 90.

In certain embodiments, the carbonate compound precipitate is utilized to produce aggregates. Such aggregates, methods for their manufacture and use are described in co-pending U.S. Application Ser. No. 61/056,972 filed May 29, 2008, the disclosure of which is herein incorporated by reference.

In certain embodiments, the carbonate compound precipitate is employed as a component of hydraulic cement. The term "hydraulic cement" is employed in its conventional sense to refer to a composition which sets and hardens after combining with water. Setting and hardening of the product produced by combination of the cements of the invention with an aqueous fluid result from the production of hydrates that are formed from the cement upon reaction with water, where the hydrates are essentially insoluble in water. Such carbonate compound component hydraulic cements, methods for their manufacture and use are described in co-pending U.S. application Ser. No. 12/126,776 filed on May 23, 2008; the disclosure of which application is herein incorporated by reference.

Also of interest are formed building materials. The formed building materials of the invention may vary greatly. By "formed" is meant shaped, e.g., molded, cast, cut or otherwise produced, into a man-made structure defined physical shape, i.e., configuration. Formed building materials are distinct from amorphous building materials, e.g., particulate (such as powder) compositions that do not have a defined and stable shape, but instead conform to the container in which they are held, e.g., a bag or other container. Illustrative formed building materials include, but are not limited to: bricks; boards; conduits; beams; basins; columns; drywalls etc. Further examples and details regarding formed building materials include those described in U.S. Provisional Patent Application Ser. No. 61/110,489 filed on Oct. 31, 2008; the disclosure of which is herein incorporated by reference.

Also of interest are non-cementitious manufactured items that include the product of the invention as a component. Non-cementitious manufactured items of the invention may vary greatly. By non-cementitious is meant that the compositions are not hydraulic cements. As such, the compositions are not dried compositions that, when combined with a setting fluid, such as water, set to produce a stable product. Illustrative compositions include, but are not limited to: paper products; polymeric products; lubricants; asphalt products; paints; personal care products, such as cosmetics, toothpastes, deodorants, soaps and shampoos; human ingestible products, including both liquids and solids; agricultural products, such as soil amendment products and animal feeds; etc. Further examples and details non-cementitious manufactured items include those described in U.S. Provisional Patent Application Ser. No. 61/110,495 filed on Oct. 31, 2008; the disclosure of which is herein incorporated by reference.

The resultant mother liquor may also be processed as desired. For example, the mother liquor may be returned to the source of the water, e.g., ocean, or to another location. In certain embodiments, the mother liquor may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2. Accordingly, the resultant mother liquor of the reaction, e.g., mineral carbonate depleted water, may be disposed of using any convenient protocol. In certain embodiments, it may be sent to a tailings pond for disposal. In certain embodiments, it may be disposed of in a naturally occurring body of water, e.g., ocean, sea, lake or river. In certain embodiments, it may be employed as a coolant for the industrial plant, e.g., by a line running between the precipitation system and the industrial plant. In certain embodiments, it may be employed as grey water, as water input for desalination and subsequent use as fresh water, e.g., in irrigation, for human and animal consumption, etc. Accordingly, of interest are configurations where the precipitation plant is co-located with a desalination plant, such that output water from the precipitation plant is employed as input water for the desalination plant.

As mentioned above, in certain embodiments the mother liquor produced by the precipitation process may be employed to cool the power plant, e.g., in a once through cooling system. In such embodiments, heat picked up in the process may then be recycled back to precipitation plant for further use, as desired. In such embodiments, the initial water source may come from the industrial plant. Such embodiments may be modified to employ pumping capacity provided by the industrial plant, e.g., to increase overall efficiencies.

Where desired and subsequent to the production of a $CO_2$ sequestering product, e.g., as described above, the amount of $CO_2$ sequestered in the product is quantified. By "quantified" is meant determining an amount, e.g., in the form of a numeric value, of $CO_2$ that has been sequestered (i.e., fixed) in the $CO_2$ sequestering product. The determination may be an absolute quantification of the product where desired, or it may be an approximate quantification, i.e., not exact. In some embodiments, the quantification is adequate to give a market-acceptable measure of the amount of $CO_2$ sequestered.

The amount of $CO_2$ in the $CO_2$ sequestering product may be quantified using any convenient method. In certain embodiments the quantification may be done by actual measurement of the composition. A variety of different methods may be employed in these embodiments. For example, the mass or volume of the composition is measured. In certain embodiments, such measurement can be taken while the precipitate is in the mother liquor. In these cases, additional methods such as x-ray diffraction may be used to quantify the product. In other embodiments, the measurement is taken after the precipitate has been washed and/or dried. The measurement is then used to quantify the amount of $CO_2$ sequestered in the product, for example, by mathematical calculation. For example, a Coulometer may be used to obtain a reading of the amount of carbon in the precipitated sequestration product. This Coulometer reading may be used to determine the amount of alkaline carbonate in the precipitate, which may then be converted into $CO_2$ sequestered by stoichiometry based on several factors, such as the initial alkaline metal ion content of the water, the limiting reagent of the chemical reaction, the theoretical yield of the starting materials of the reaction, waters of hydration of the precipitated products, etc. In some embodiments, contaminants may be present in the product, and other determinations of the purity of the product, e.g., elemental analysis, may be necessary to determine the amount of $CO_2$ sequestered.

In yet other embodiments, an isotopic method is employed to determine the carbon content of the product. The ratio of carbon isotopes in fossil fuels is substantially different than the ratio of such isotopes in geologic sources such as limestone. Accordingly, the source or ratio of sources of carbon in a sample is readily elucidated via mass spectrometry that quantitatively measures isotopic mass. So even if limestone aggregate is used in concrete (which will increase total carbon determined via coulometry), the utilization of mass spectrometry for isotopic analysis will allow elucidation of the amount of the carbon attributable to captured $CO_2$ from fossil fuel combustion. In this manner, the amount of carbon sequestered in the precipitate or even a downstream product that incorporates the precipitate, e.g., concrete, may be determined, particularly where the $CO_2$ gas employed to make the precipitate is obtained from combustion of fossil fuels, e.g., coal. Benefits of this isotopic approach include the ability to determine carbon content of pure precipitate as well as precipitate that has been incorporated into another product, e.g., as an aggregate or sand in a concrete, etc.

In other embodiments, the quantification may be done by making a theoretical determination of the amount of $CO_2$ sequestered, such as by calculating the amount of $CO_2$ sequestered. The amount of $CO_2$ sequestered may be calculated by using a known yield of the above described method, such as where the yield is known from previous experimentation. The known yield may vary according to a number of factors, including one or more of the input of gas (e.g. $CO_2$) and water, the concentration of alkaline-earth-metal ions in the water, pH, salinity, temperature, the rate of the gaseous stream, the embodiment of the method selected, etc., as reviewed above. Standard information, e.g., a predetermined amount of $CO_2$ sequestered per amount of product produced by a given reference process, may be used to readily determine the quantity of $CO_2$ sequestered in a given process that is the same or approximately similar to the reference process, e.g., by determining the amount produced and then calculating the amount of $CO_2$ that must be sequestered therein.

Systems of $CO_2$ Sequestration

Aspects of the invention further include systems, e.g., processing plants or factories, for sequestering $CO_2$, e.g., by practicing methods as described above. Systems of the invention may have any configuration which enables practice of the particular production method of interest.

Figure 2:
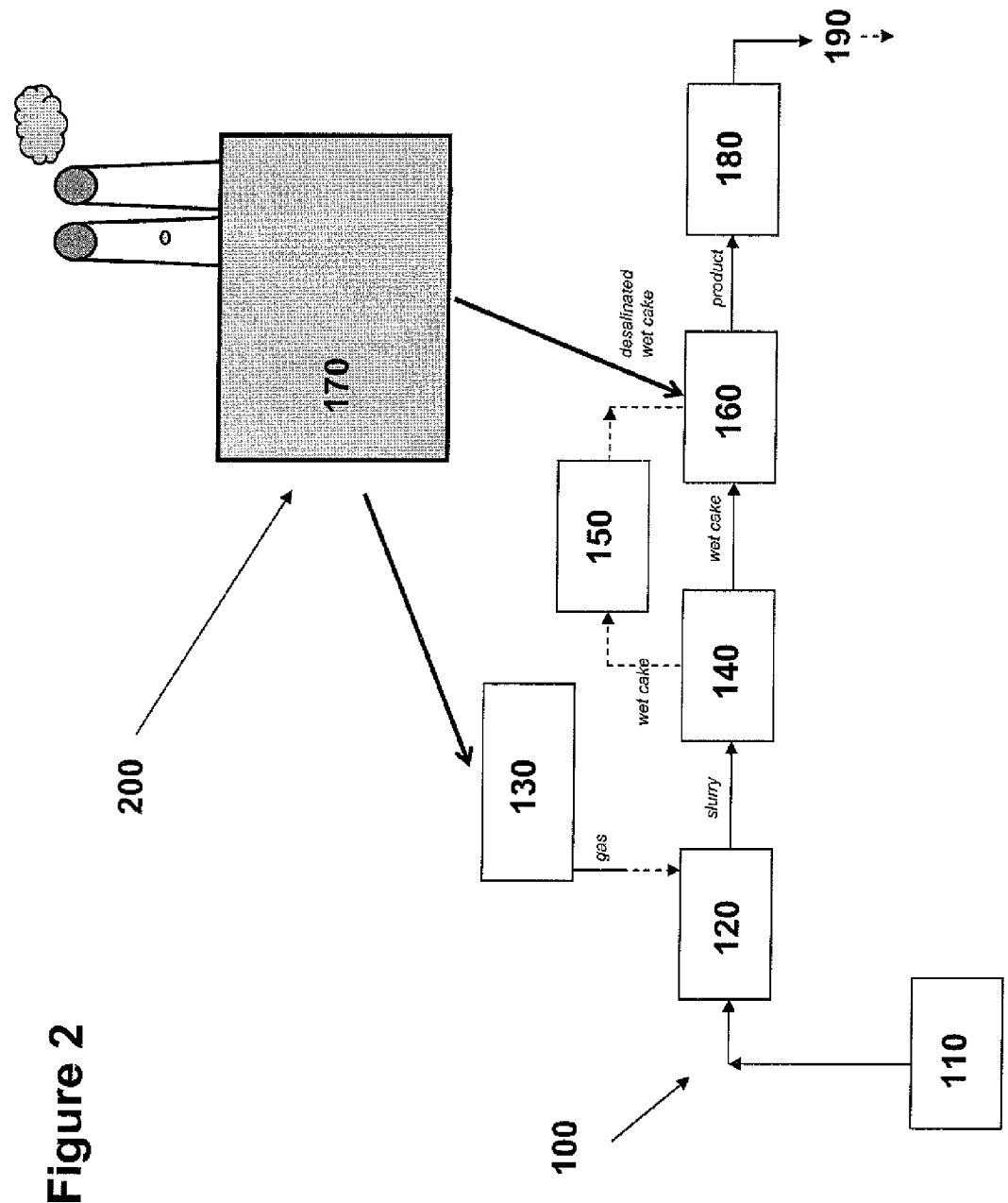
FIG. 2 provides a schematic diagram of a $CO_2$ sequestration system according to another embodiment of the invention.

FIG. 2 provides a schematic of a system according to one embodiment of the invention. In FIG. 2, system 100 includes water source 110. In certain embodiments, water source 110 includes a structure having an input for alkaline-earth-metal-ion-containing water, such as a pipe or conduit from an ocean, etc. Where the alkaline-earth-metal-ion water source that is processed by the system to produce the precipitate is seawater, the input is in fluid communication with a source of sea water, e.g., such as where the input is a pipe line or feed from ocean water to a land based system or a inlet port in the hull of ship, e.g., where the system is part of a ship, e.g., in an ocean based system.

Also shown in FIG. 2, is $CO_2$ source 130. This system also includes a pipe, duct, or conduit which directs $CO_2$ to system 100. The water source 110 and the $CO_2$ gaseous stream source 130 are connected to a $CO_2$ charger in precipitation reactor 120. The precipitation reactor 120 may include any of a number of different design features, such as temperature regulators (e.g., configured to heat the water to a desired temperature), chemical additive components, e.g., for introducing chemical pH elevating agents (such as hydroxides, metal oxides, or fly ash) into the water, electrochemical components, e.g., cathodes/anodes, mechanical agitation and physical stirring mechanisms and components to re-circulate industrial plant flue gas through the precipitation plant. Precipitation reactor 120 may also contain design features that allow for the monitoring of one or more parameters such as internal reactor pressure, pH, precipitate particle size, metal-ion concentration, conductivity and alkalinity of the aqueous solution, and $pCO_2$. This reactor 120 may operate as a batch process or a continuous process.

Precipitation reactor 120, further includes an output conveyance for mother liquor. In some embodiments, the output conveyance may be configured to transport the mother liquor to a tailings pond for disposal or in a naturally occurring body of water, e.g., ocean, sea, lake, or river. In other embodiments, the systems may be configured to allow for the mother liquor to be employed as a coolant for an industrial plant by a line running between the precipitation system and the industrial plant. In certain embodiments, the precipitation plant may be co-located with a desalination plant, such that output water from the precipitation plant is employed as input water for the desalination plant. The systems may include a conveyance (i.e., duct) where the output water (e.g., mother liquor) may be directly pumped into the desalination plant.

The system illustrated in FIG. 2 further includes a separator 140 for separating a precipitated carbonate mineral composition from a mother liquor. In certain embodiments, the separator may achieve separation of a precipitated carbonate mineral composition from a mother liquor by a mechanical approach, e.g., where bulk excess water is drained from the precipitate by gravity or with the addition of a vacuum, mechanical pressing, filtering the precipitate from the mother liquor to produce a filtrate, centrifugation or by gravitational sedimentation of the precipitate and drainage of the mother liquor.

The system also includes a washing station, 150, where bulk dewatered precipitate from separation station, 140 is washed, e.g., to remove salts and other solutes from the precipitate, prior to drying at the drying station.

The system further includes a drying station 160 for drying the precipitated carbonate mineral composition produced by the carbonate mineral precipitation station. Depending on the particular drying protocol of the system, the drying station may include a filtration element, freeze drying structure, spray drying structure, etc as described more fully above. The system may include a conveyer, e.g., duct, from the industrial plant that is connected to the dryer so that a gaseous waste stream (i.e., industrial plant flue gas) may be contacted directly with the wet precipitate in the drying stage.

The dried precipitate may undergo further processing, e.g., grinding, milling, in refining station, 180, in order to obtain desired physical properties. One or more components may be added to the precipitate where the precipitate is used as a building material.

The system further includes outlet conveyers, e.g., conveyer belt, slurry pump, that allow for the removal of precipitate from one or more of the following: the reactor, drying station, washing station or from the refining station. The product of the precipitation reaction may be disposed of in a number of different ways. The precipitate may be transported to a long term storage site in empty conveyance vehicles, e.g., barges, train cars, trucks, etc., that may include both above ground and underground storage facilities. In other embodiments, the precipitate may be disposed of in an underwater location. Any convenient protocol for transporting the composition to the site of disposal may be employed. In certain embodiments, a pipeline or analogous slurry conveyance structure may be employed, where these approaches may include active pumping, gravitational mediated flow, etc.

In certain embodiments, the system will further include a station 190 for preparing a building material, such as cement, from the precipitate. This station can be configured to produce a variety of cements, aggregates, or cementitious materials from the precipitate, e.g., as described in co-pending U.S. application Ser. No. 12/126,776; the disclosure of which application is herein incorporated by reference.

As indicated above, the system may be present on land or sea. For example, the system may be a land based system that is in a coastal region, e.g., close to a source of sea water, or even an interior location, where water is piped into the system from a salt water source, e.g., ocean. Alternatively, the system may be a water based system, i.e., a system that is present on or in water. Such a system may be present on a boat, ocean based platform etc., as desired. In certain embodiments, the system may be co-located with an industrial plant at any convenient location. The precipitation plant may be a land-based plant that is co-located with the land-based industrial plant, e.g., in a coastal region, such as close to a source of an alkaline-earth-metal-ion-containing water, e.g., seawater. Also of interest are interior locations, where water is piped into the system directly from a water source, e.g., the industrial plant, a distal lake, a distal ocean. Alternatively, the precipitation plant may be present on water, e.g., on a barge, boat, ocean based platform etc., as desired, for example where real-estate next to a industrial plant is scarce. In certain embodiments, the precipitation plant may be a mobile plant, such that it is readily co-located with an industrial plant.

Systems of the invention that are co-located with an industrial plant, such as a power plant, may be configured to allow for synchronizing the activities of the industrial plant and precipitation plant. In certain instances, the activity of one plant may not be matched to the activity of the other. For example, the precipitation plant may need to reduce or stop its acceptance of the gaseous waste stream but the industrial plant may need to keep operating. Conversely, situations may arise where the industrial plant reduces or ceases operation and the precipitation plant does not. To address situations where either the precipitation plant or industrial plant may need to reduce or stop its activities, design features that provide for continued operation of one of the co-located plants while the other reduces or ceases operation may be employed, as described in detail above. For example, the systems of the invention may include in certain embodiments, blowers, fans, and/or compressors at various points along the connecting line between the industrial plant and the precipitation plant in order to control the occurrence of backpressure in the ducts that connect the industrial plant to the precipitation plant. In certain embodiments, a gas storage facility may be present between the industrial plant and the precipitation plant. Where desired, the precipitation plant may include emissions monitors to evaluate any gaseous emissions produced by the precipitation plant as required by Air Quality Agencies.

Aspects of the invention include the use of a $CO_2$ containing industrial plant gaseous waste stream, e.g., an industrial plant flue gas, at one or more stages of a process in which a storage stable $CO_2$ containing product is precipitated. As such, the $CO_2$ containing industrial plant gaseous waste stream is employed in a precipitation process. In embodiments of the invention, the gaseous waste stream is employed at one or more steps of the precipitation process, such as in a precipitation step, e.g., where it is employed to charge water with $CO_2$, or during a precipitate drying step, e.g., where precipitated carbonate compound is dried, etc. Where desired, the flue gas from the industrial plant can be re-circulated through the precipitation plant until total adsorption of the remnant $CO_2$ approaches 100%, or a point of diminishing returns is achieved such that the remaining flue gas can be processed using alternative protocols and/or released into the atmosphere.

As reviewed above, precipitation systems of the invention may be co-located with an industrial plant. An example of such a system is illustrated in FIG. 2. In FIG. 2, flue gas outlet 170 from power plant 200 is used in both the precipitation reactor 120 as the source of $CO_2$ 130 and the dryer 160 and the source of heat. Where desired, backpressure controls are employed to at least reduce, if not eliminate, the occurrence of backpressure which could arise from directing a portion of, if not all of, the industrial plant gaseous waste stream to the precipitation plant 100. Any convenient manner of controlling backpressure occurrence may be employed. In certain embodiments, blowers, fans and/or compressors are provided at some point along the connecting line between the industrial plant and precipitation plant. In certain embodiments, the blowers are installed to pull the flue gas into ducts that port the flue gas to the precipitation plant. The blowers employed in these embodiments may be electrically or mechanically driven blowers. In these embodiments, if present at all, backpressure is reduced to a level of 5 inches or less, such as one inch or less. In certain embodiments, a gas storage facility may be present between the industrial plant and the precipitation plant. When present, the gas storage facility may be employed as a surge, shutdown and smoothing system so that there is an even flow of flue gases to the precipitation plant.

Aspects of the invention include synchronizing the activities of the industrial plant and precipitation plant. In certain instances, the activity of one plant may not be matched to the activity of the other. For example, the precipitation plant may need to reduce or stop its acceptance of the gaseous waste stream but the industrial plant may need to keep operating. Conversely, situations may arise where the industrial plant reduces or ceases operation and yet the precipitation plant does not. To address such situations, the plants may be configured to provide for continued operation of one of the co-located plants while the other reduces or ceases operation may be employed. For example, to address the situation where the precipitation plant has to reduce or eliminate the amount of gaseous waste stream it accepts from the industrial plant, the system may be configured so that the blowers and ducts conveying waste stream to the precipitation plant shut off in a controlled sequence to minimize pressure swings and the industrial plant flue acts as a bypass stack for discharge of the gaseous waste stream. Similarly, if the industrial plant reduces or eliminates its production of gaseous waste stream, e.g., the industrial plant is dispatched wholly or partially down, or there is curtailment of industrial plant output under some pre-agreed level, the system may be configured to allow the precipitation plant to continue operation, e.g., by providing an alternate source of $CO_2$, by providing for alternate heating protocols in the dryer, etc.

Where desired, the precipitation plant may include emissions monitors to evaluate any gaseous emissions produced by the precipitation plant and to make required reports to regulatory agencies, both electronic (typically every 15 minutes), daily, weekly, monthly, quarterly, and annually. In certain embodiments, gaseous handling at the precipitation plant is sufficiently closed that exhaust air from the precipitation plant which contains essentially all of the unused flue gas from the industrial plant is directed to a stack so that required Continuous Emissions Monitoring Systems can be installed in accordance with the statutory and regulatory requirements of the Country, province, state city or other political jurisdiction.

In certain embodiments, the gaseous waste stream generated by the industrial plant and conveyed to the precipitation plant has been treated as required by Air Quality Agencies, so the flue gas delivered to the precipitation plan already meets Air Quality requirements. In these embodiments, the precipitation plant may or may not have alternative treatment systems in place in the event of a shutdown of the precipitation plant. However, if the flue gas delivered to has been only partially treated or not treated at all, the precipitation plant may include air pollution control devices to meet regulatory requirements, or seek regulatory authority to emit partially-treated flue gas for short periods of time. In yet other embodiments, the flue gas is delivered to precipitation plant for all processing. In such embodiments, the system may include a safeguard for the situation where the precipitation plant cannot accept the waste stream, e.g., by ensuring that the pollution controls installed in the industrial plant turn on and control emissions as required by the Air Quality Agencies.

The precipitation plant that is co-located with the industrial plant may be present at any convenient location, be that on land or water. For example, the precipitation plant may be a land-based plant that is co-located with the land-based industrial plant, e.g., in a coastal region, such as close to a source of sea water. Also of interest are interior locations, where water is piped into the system directly from a water source, e.g., the industrial plant, a distal lake, a distal ocean. Alternatively, the precipitation plant may be present on water, e.g., on a barge, boat, ocean based platform etc., as desired, for example where real-estate next to a industrial plant is scarce. In certain embodiments, the precipitation plant may be a mobile plant, such that it is readily co-located with a industrial plant.

As indicated above, of interest in certain embodiments are waste streams produced by integrated gasification combined cycle (IGCC) plants. In these types of plants, the initial fuel, e.g., coal, biomass, etc., is first subjected to a gasification process to produce syngas, which may be shifted, generating amounts of $CO_2$, CO and $H_2$. The product of the gasification protocol may be conveyed to the precipitation plant to first remove $CO_2$, with the resultant $CO_2$ scrubbed product being returned to a power plant for use as fuel. In such embodiments, a line from the gasification unit of a power plant may be present between a power plant and precipitation plant, and a second return line may be present between the precipitation plant and a power plant to convey scrubbed syngas back to a power plant.

In certain embodiments, the co-located industrial plant and precipitation plant (or integrated plant) is operated with additional $CO_2$ emission reduction approaches. For example, material handling, vehicles and earthmoving equipment, locomotives, may be configured to use biofuels in lieu of fossil fuels. In such embodiments, the site may include fuel tanks to store the biofuels In addition to sequestering $CO_2$, embodiments of the invention also sequester other components of industrial plant generated gaseous waste streams. For example, embodiments of the invention results in sequestration of at least a portion of one or more of NOx, SOx, VOC, Mercury and particulates that may be present in the waste stream, such that one or more of these products are fixed in the solid precipitate product.

In FIG. 2, precipitation system 100 is co-located with industrial plant 200. However, precipitation system 100 is not integrated with the industrial plant 200. Of further interest in certain embodiments therefore is an integrated facility which, in addition to an industrial plant, includes power generation, water treatment (seawater desalinization or mineral rich freshwater treatment) and precipitation components' as described in U.S. patent application Ser. No. 12/163,205, the disclosure of which is herein incorporated by reference. The water source for the precipitation plant may be derived from the waste streams of the water treatment plant. The resultant mother liquor from the carbonate precipitation plant may be used as the feedstock for the water treatment plant. The resultant integrated facility essentially uses fuel, minerals and untreated water as inputs, and outputs energy, a processed industrial product, e.g., cement, clean water, clean air and carbon-sequestering building materials.

Figure 3:
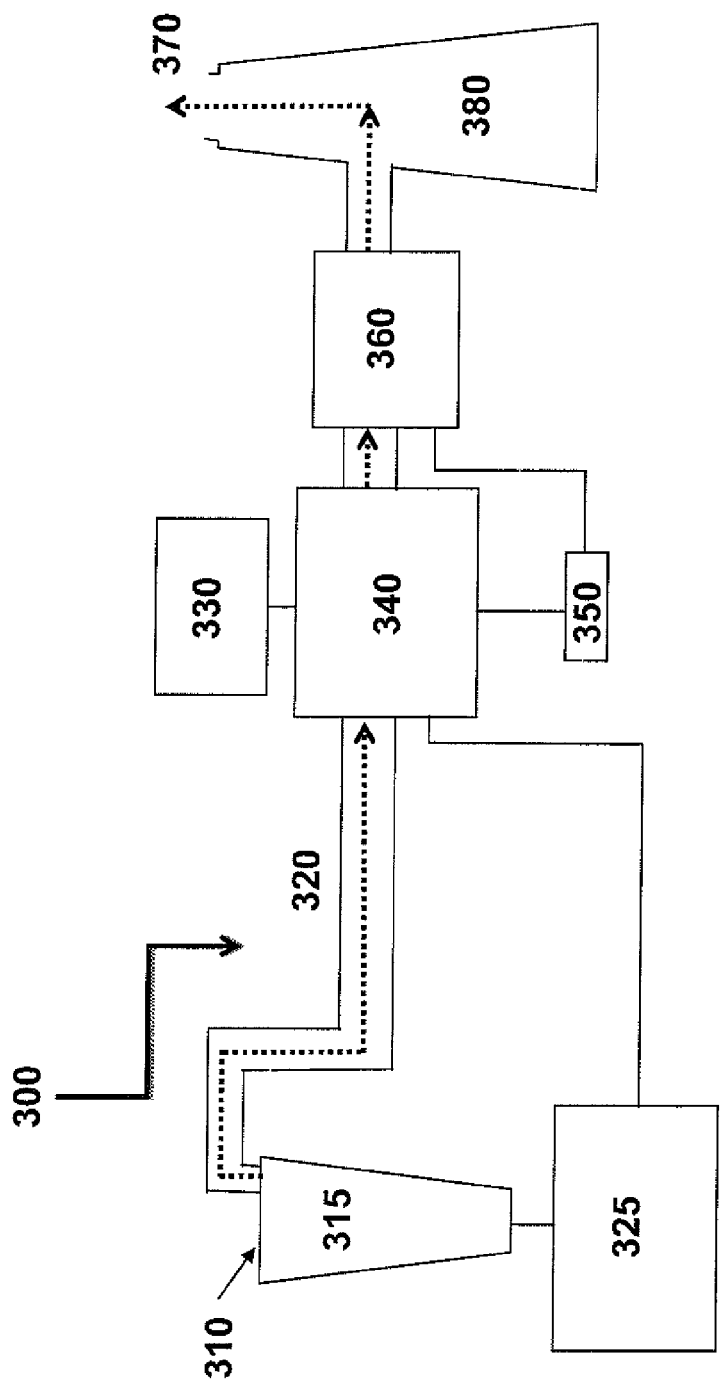
FIG. 3 provides a schematic diagram of power plant that is integrated with a $CO_2$ sequestration system according to an embodiment of the invention.

FIG. 3 provides an example of where a precipitation system 100 is integrated with an industrial plant, in this case a coal fired power plant 300. In power plant 300, coal 310 fuels steam boiler 315 to produce steam which in turn runs a turbine (not shown) to produce power. Steam boiler 315 also produces bottom ash or boiler slag 325 and flue gas 320. Flue gas 320 contains fly ash, $CO_2$ and sulfates. Flue gas 320 and bottom ash 325 are combined with water from water source 330 in reactor 340 and subjected to precipitation reactions, as described above. Pump 350 facilitates transport of precipitated product from reactor 340 to spray dryer 360, which employs flue gas 320 to spray dry the precipitated product for subsequent disposal, e.g., by placement in a landfill or use in a building product. Treated flue gas 370 exits spray dryer 360 and then is discharged to the atmosphere in stack 380. Treated flue gas 370 is gas in which the fly ash, sulfur, and $CO_2$ content has been substantially reduced, if not completely removed, as compared to flue gas 320. As an example of the system shown in FIG. 3, the $CO_2$ source may be flue gas from coal or other fuel combustion, which is contacted with the volume of saltwater with little or no pretreatment of the flue gas. In these embodiments, the use of fuels such as high-sulfur coal, sub-bituminous coal, lignite and the like, which are often inexpensive and considered low quality, is practical due to the ability of the process to remove the SOx and other pollutants as well as removing $CO_2$. These fuels may also provide higher levels of co-reactants such as alumina and silica in fly ash carried by the flue gas, producing modified carbonate mineral precipitates with beneficial properties.

When co-located with a power plant, methods of the invention provide sequestration of substantial amounts of $CO_2$ from the gaseous waste stream produced by the power plant with a limited parasitic energy requirement. In some instances, the methods provide for removal of 5% or more, 10% or more, 25% or more, 50% or more, 75% or more of the $CO_2$ from the gaseous waste stream with a parasitic energy requirement of 50% or less, such as 30% or less, including 25% or less. The parasitic energy requirement is the amount of energy generated by the power plant that is required to operate the carbon dioxide sequestration process. In some instances the above levels of $CO_2$ removal are achieve with a parasitic energy requirement of 20% or less, 15% or less, 10% or less.

Figure 4:
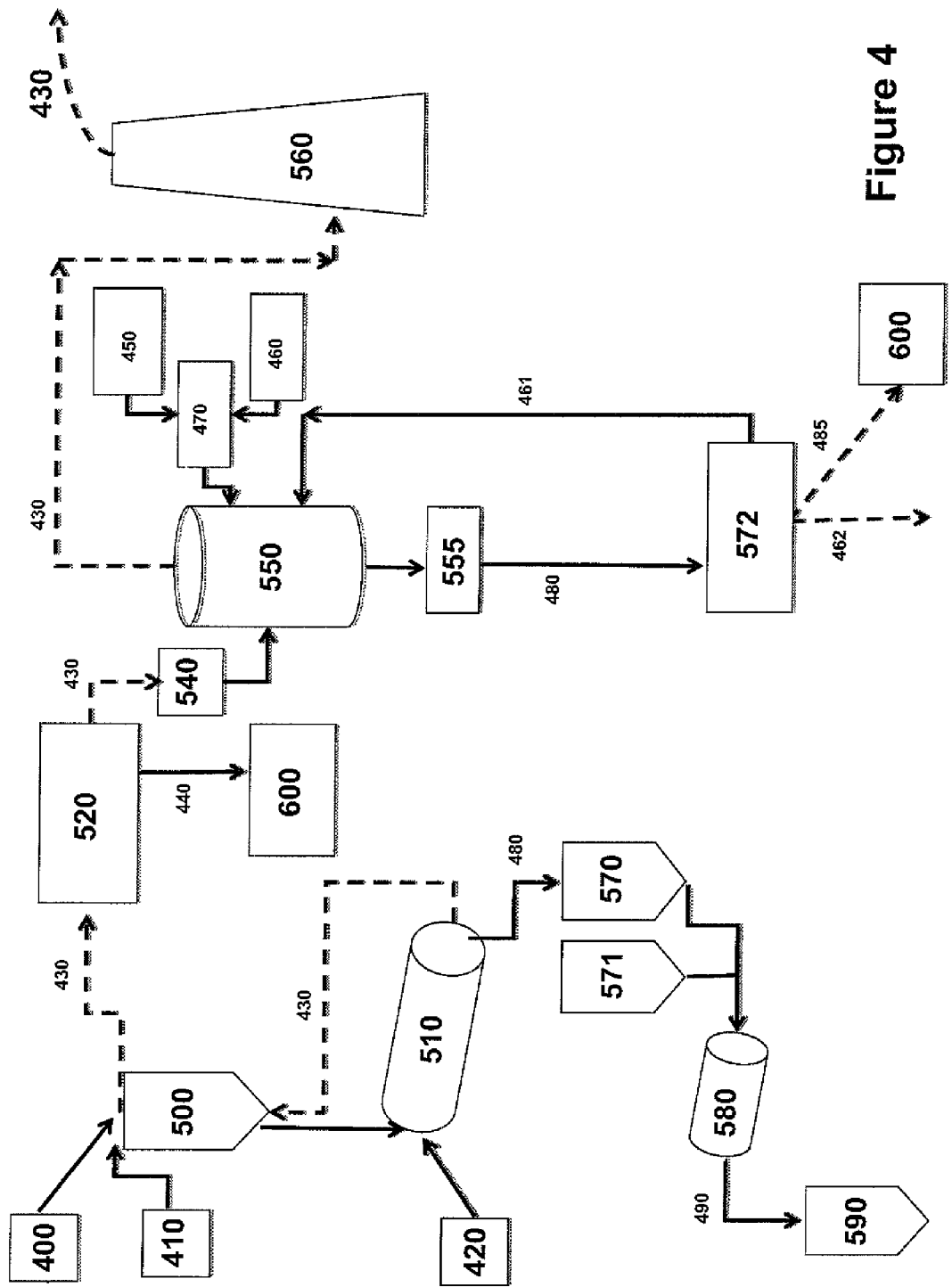
FIG. 4 provides a schematic diagram of a portland cement plant.

Another type of industrial plant which may be co-located with a precipitation plant of the invention is a cement plant, such as a portland cement production plant. FIG. 4 provides a schematic of an exemplary portland cement production facility. In FIG. 4, limestone 400 along with shales and other additives 410 are milled to appropriate size and moved through precalciner 500, which uses waste heat from flue gas 430 to preheat the mixture, utilizing waste heat from kiln 510 to improve operational efficiency. The preheated mixture enters kiln 510 where it is further heated by burning coal 420. The resultant clinker 480 is collected and stored in silos 570, where it is blended with additives 571 such as gypsum, limestone, etc. and ground to desired size in ball mill 580. The product which exits the ball mill is portland cement 490 which is stored in cement silo 590 prior to shipment to customers.

The flue gas 430 which comes from kiln 510 contains both gaseous and particulate contaminants. The particulate contaminants are known as kiln dust 440, and are removed from the flue gas via electrostatic precipitators or baghouses 520. The kiln dust so removed is commonly sent to landfill 600, though occasionally kiln dust is recycled into the kiln, or sold as a supplementary cementitious material. The flue gas is then pulled by fan 540 into wet scrubber 550, where the sulfur oxides in the flue gas are removed by reaction with a lime slurry 470 made from calcined lime 450 and water 460 or calcined lime slurry, producing a calcium sulfite (e.g., gypsum) slurry 480 which is moved to reclaim tank 572 using a pump 555 and normally dewatered in reclaim tank 572 where excess solids are settled out 485 and disposed of in landfill 600. Waste water 462 is discharged and some reclaim water 461 is sent back to tank 550. The flue gas 430 exits wet scrubber 550 and is released to the atmosphere via stack 560.

The flue gas so released has a high concentration of $CO_2$, which is released both by the burning of coal and via the calcination required to oxidize limestone to portland cement.

Figure 5:
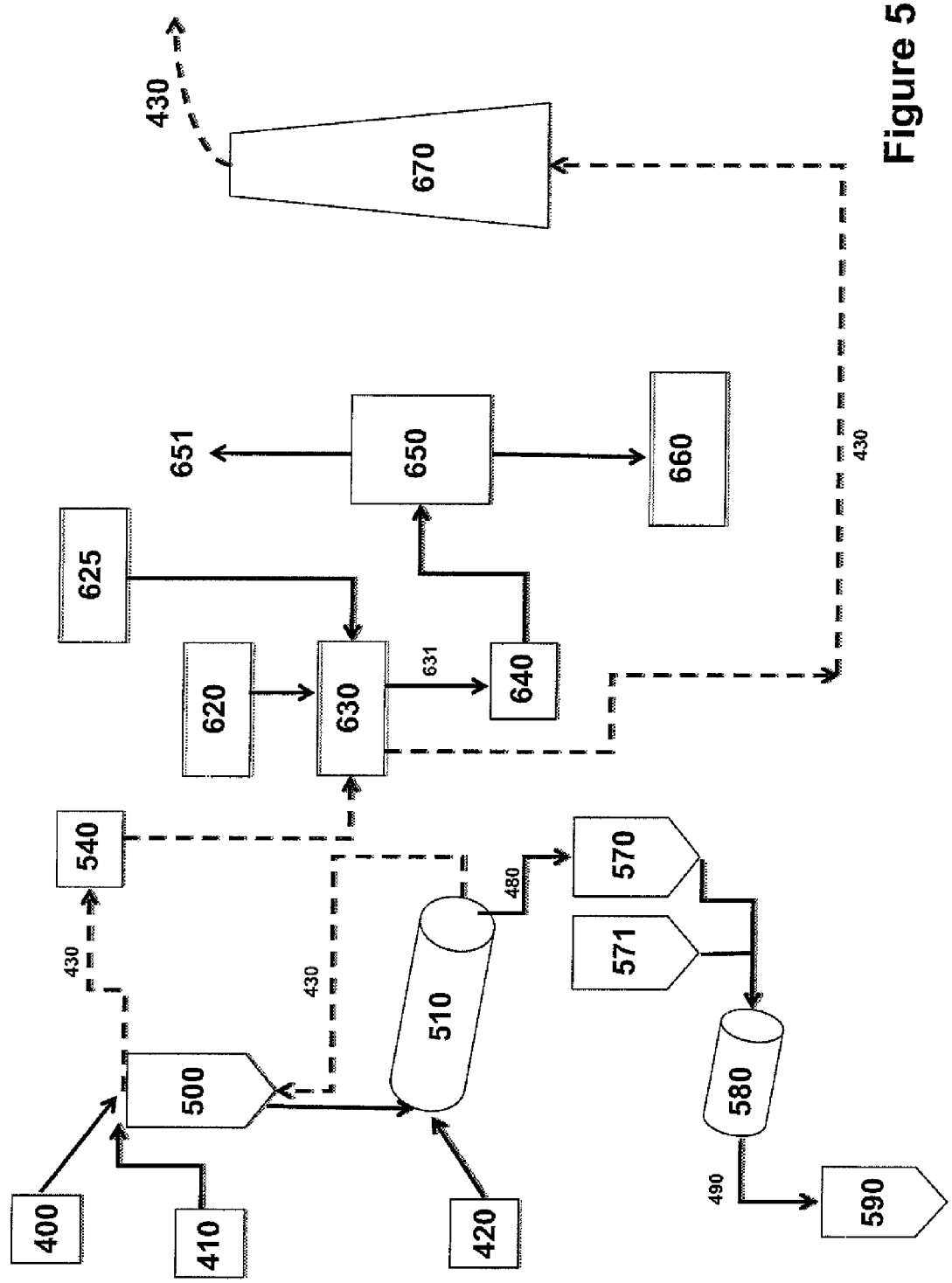
FIG. 5 provides a schematic diagram of a cement plant co-located with a precipitation plant according to one embodiment of the invention FIG. 6 provides a schematic of a cement plant which does not require a mined limestone feedstock according to one embodiment of the invention FIG. 7A provides a diagram of one embodiment of a bi-electrode apparatus for removing protons form solutions electrochemically.

FIG. 5 shows a schematic of an exemplary co-located cement plant and precipitation plant according to one embodiment of the invention. The process in this example is the same as that in FIG. 4, except that a carbonate precipitation plant replaces the flue gas treatment system of FIG. 4. Once the flue gas exits the precalciner 500, it is pulled by fan 540 to reactor 630, wherein a precipitation reaction is initiated utilizing seawater 620 and alkali 625. The resultant slurry 631 is pumped via pump 640 to drying station 650, where water 651 is discharged and dried cementitious material 660 is stored for shipment to customers. Flue gas 430 is emitted from stack 670 with a portion if not all of the contaminants removed, including mercury, $SO_x$, particulates, and $CO_2$.

FIG. 5 shows a schematic of an exemplary cement plant which does not require a limestone quarry, according to one embodiment of the invention. In this embodiment, the product of reactor 630 may take the form of a relatively pure calcium carbonate during portions of time during its operation, and other forms of building materials during other portions of time. In this example, rather than mined limestone, the precalciner 500 and kiln 510 is charged with a mixture of shale and other ingredients 410 blended with a relatively pure precipitated calcium carbonate 670. Previously mentioned and incorporated by reference U.S. patent application Ser. No. 12/126,776 details protocols of precipitating an aragonite calcium carbonate from seawater using flue gas. By using the product of the flue gas treatment reactor as a feedstock, the cement plant draws its calcium ion from the sea via the precipitated product, and only requires mined limestone in the first short period of operation until sufficient precipitated calcium carbonate is generated to charge the kiln.

Figure 6:
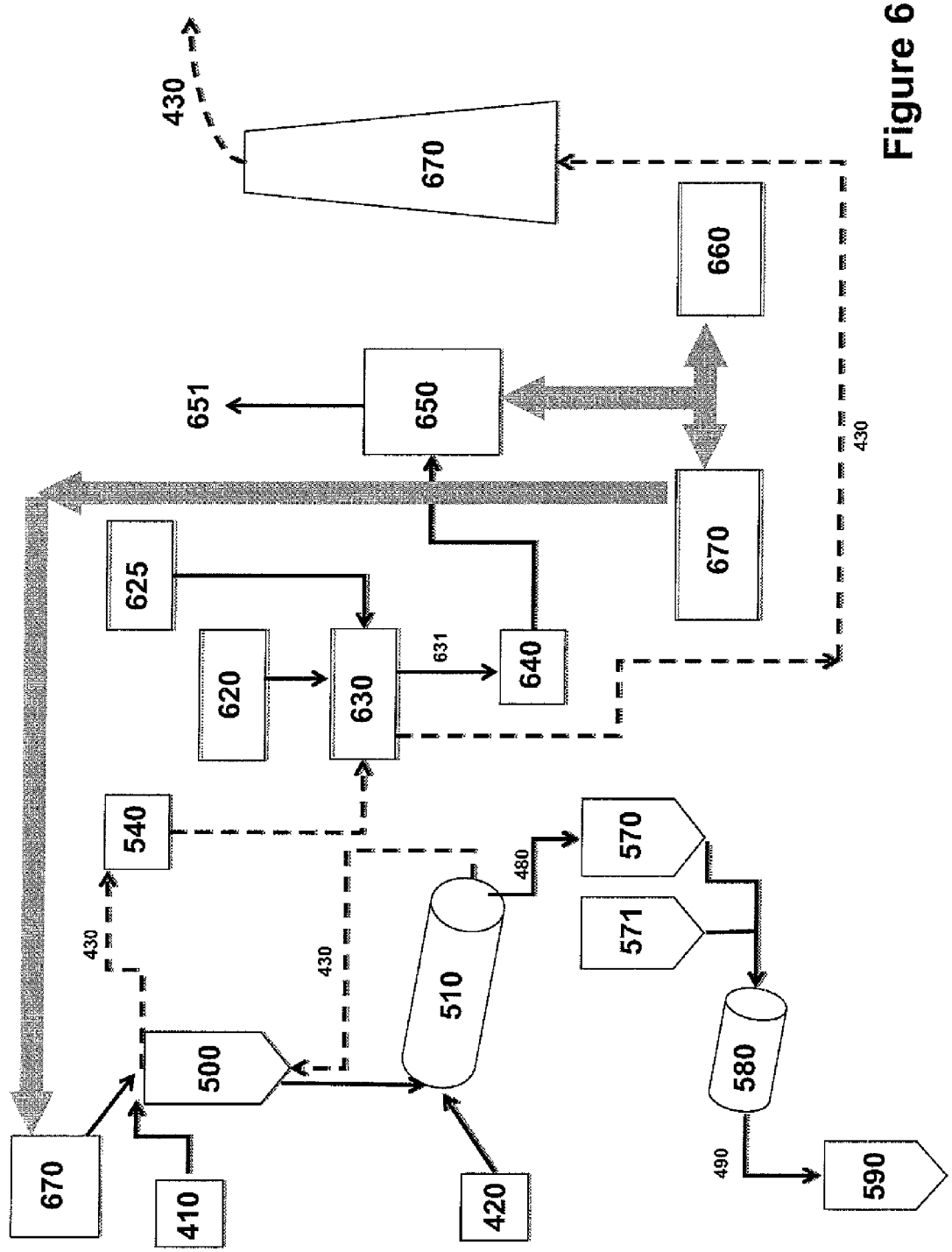

In embodiments of the invention, the carbonate precipitation is performed in two stages. The first stage selectively precipitates calcium carbonate, which can then be used as a feedstock for the cement plant as illustrated in FIG. 6. The second precipitation stage can produce a number of different materials, including cements, aggregates, above ground carbon sequestering materials, and the like.

Portland cement is 60-70% by mass CaO, which is produced by heating $CaCO_3$, requiring heat and releasing one molecule of $CO_2$ for every molecule of CaO released. Because of the additional $CO_2$ released from the burning of fuel, the output of precipitated $CaCO_3$ from the precipitation plant will exceed the amount required to provide feedstock for the cement plant. In this instance a portion of the time of operation of the precipitation plant may be devoted to production of other cementitious materials 660 such as those described in U.S. application Ser. No. 12/126,776; the disclosures of which are herein incorporated by reference.

The portland cement 490 produced as shown in FIG. 6 is carbon neutral as the $CO_2$ from its manufacture is sequestered into precipitated carbonate mineral 670 and cementitious materials 660. The portland cement 490 may be sold as is, or blended or interground with cementitious material 660 to produce a blended cement.

Figure 11:
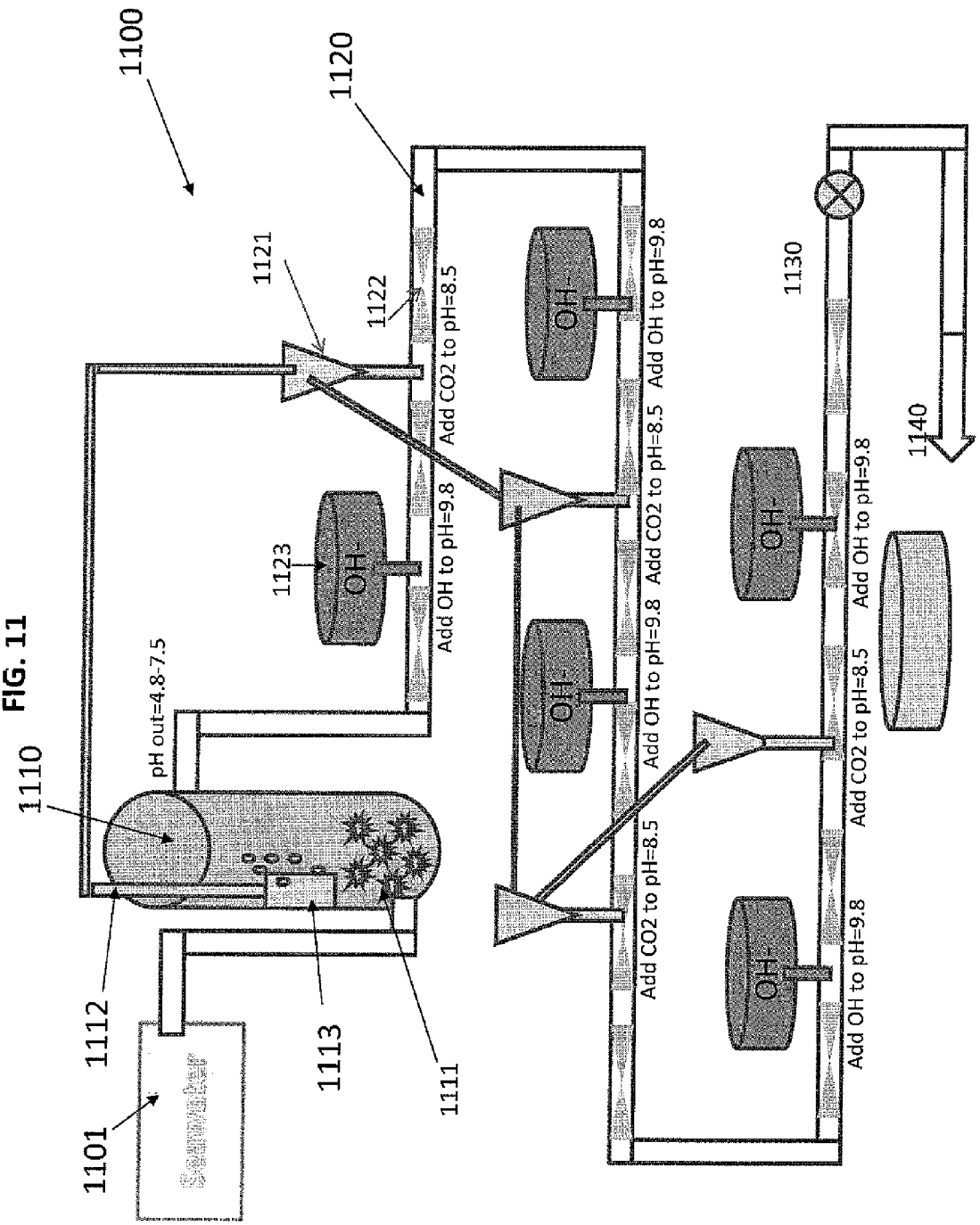
FIG. 11 provides a schematic of a system according to one embodiment of the invention.

An example of a continuous feed system of interest is depicted in FIG. 11. In FIG. 11, system 1100 includes water source (e.g., pipe from ocean to provide seawater) 1101 which is in fluid communication with reactor 1110. Also present in reactor 1110 is Ca/Mg/OH ion sources and catalysts 1111, which have been added in amounts sufficient to raise the Mg/Ca ion ratio in water present in reactor 1110 to 3 or more. Reactor 1110 may configured as a packed bed column, and configured from bicarbonate charging, if desired. $CO_2$ containing gas, e.g., flue gas 1112, is combined with water in reactor 1110 by sparger/bubbler 1113. The Mg ion source and $CO_2$ are combined with the water in reactor 1110 to produce $CO_2$ charged acidic water, which flows out of reactor 1110 at a pH of between 4.8 and 7.5. Next, the $CO_2$ charged acidic water flows through conduit 1120 where it is cycled with mixing through different levels of alkalinity, e.g., 8.5 and 9.8, with the use of various $CO_2$ gas injectors 1121, OH— modulators 1123 (such as introduces of pH elevating agents, electrodes, etc.) and static mixers 1122 positioned at various locations along conduit 1120. The flow rate through conduit 1120 may be controlled as desired, e.g., to be between 1 GPM and 1,000,000 GPM, such as 30 GPM and 100,000 GPM and including 4,000 GPM and 60,000 GPM. The length of conduit 1120 may vary, ranging from 100 ft to 20,000 ft, such as 1000 ft to 7000 ft. At the end of conduit 1120, as slurry product 1130 is obtained, which slurry product includes the precipitated $CO_2$ sequestering product and mother liquor. The resultant slurry is then forwarded to a water/solids separator or settling tank, as illustrated at 1140.

Figure 12A:
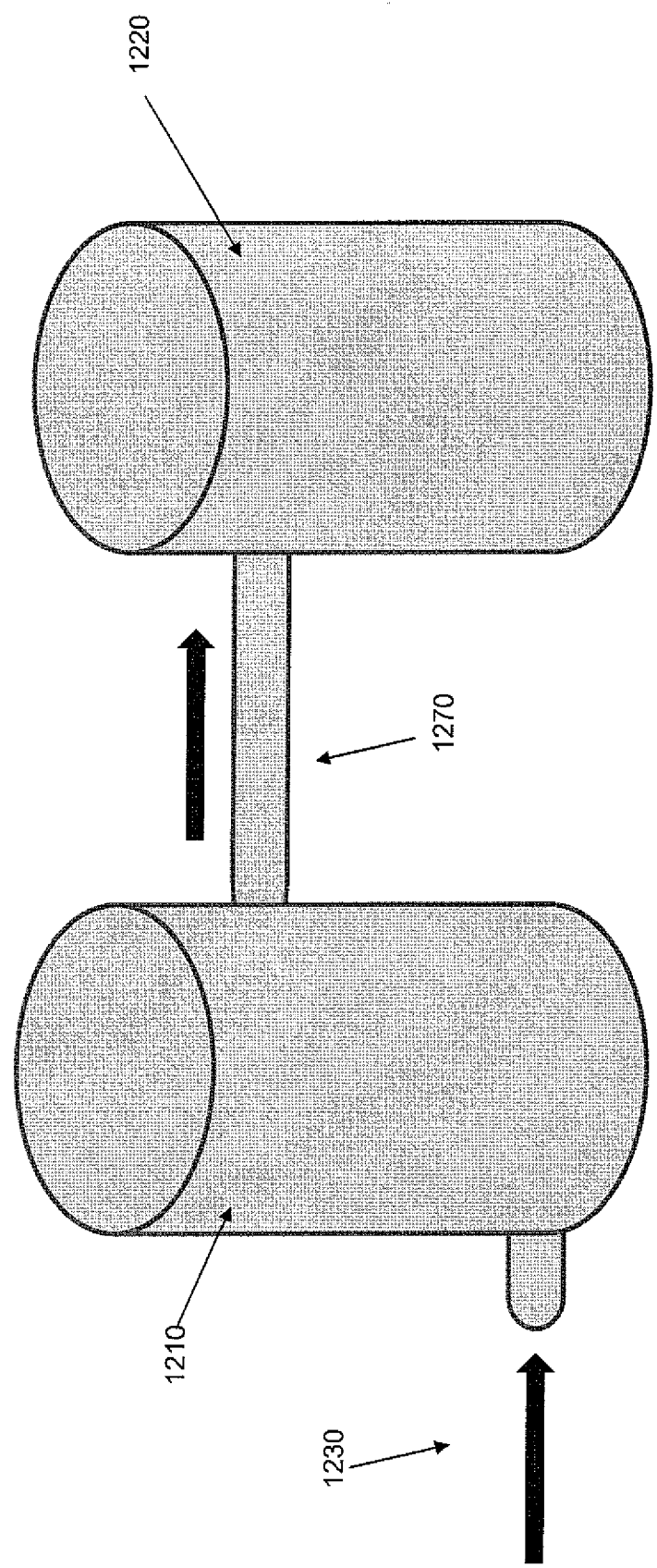
FIGS. 12A, 12B and 12C provide schematics of a system according to one embodiment of the invention.
Figure 12B:
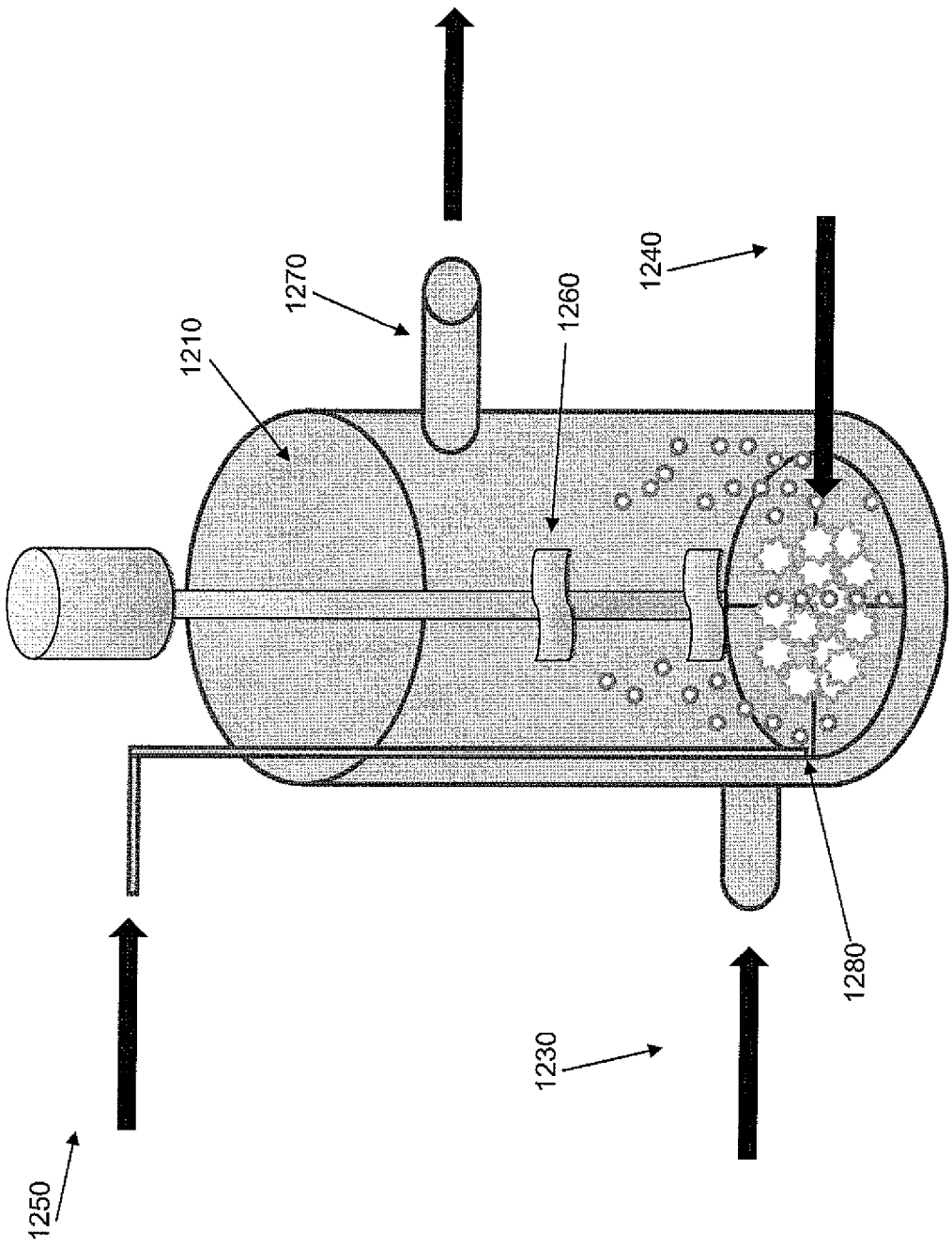
Figure 12C:
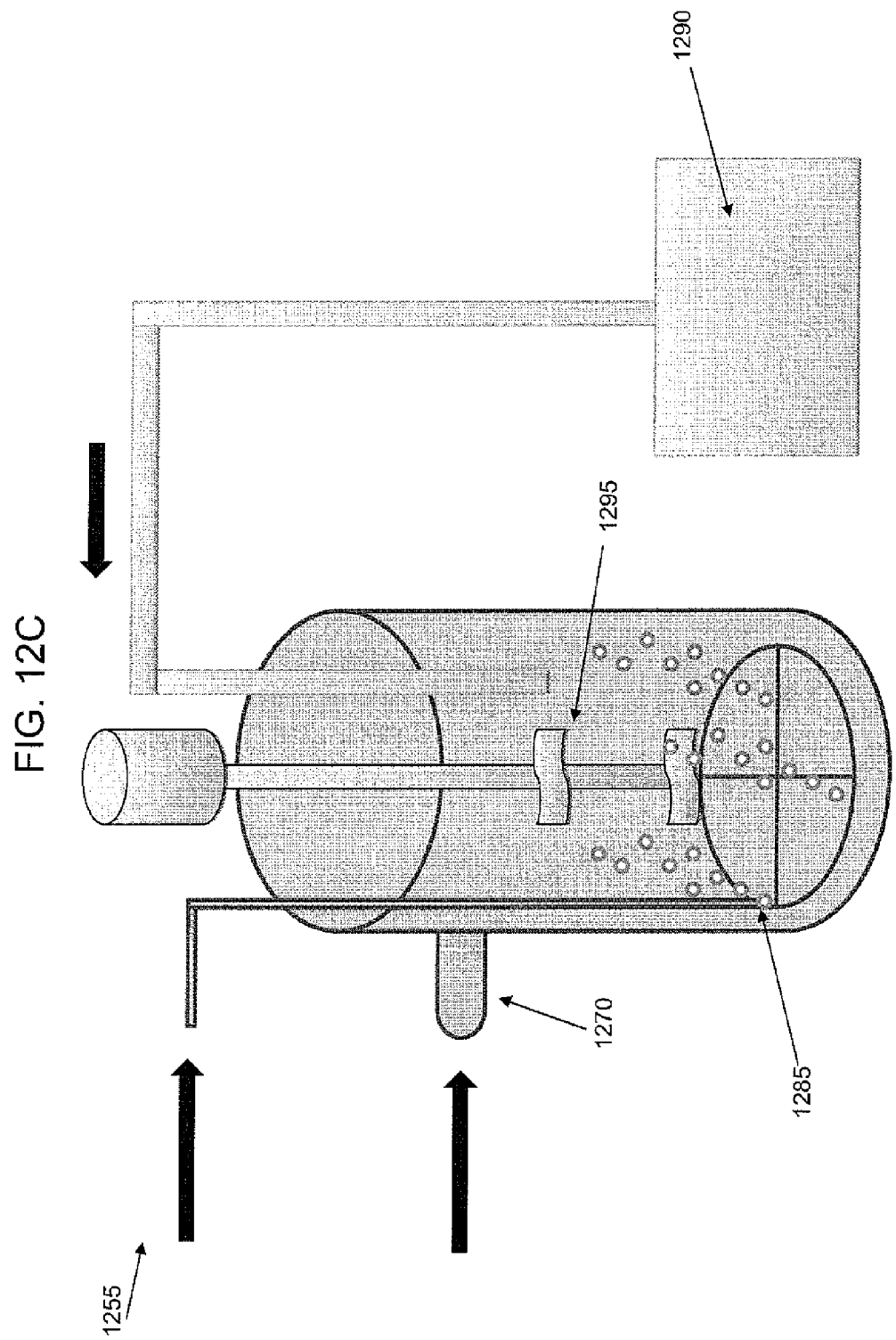

In certain embodiments, two or more reactors may be used to carry out the methods described herein. A schematic of an embodiment using two reactors is shown in FIGS. 12A, 12B, and 12C. In this embodiment, the method may include a first reactor 1210 and a second reactor 1220. In these cases, the first reactor 1210 is used for contacting the initial water, e.g. fresh seawater 1230, with a magnesium ion source 1240 and for charging the initial water with $CO_2$ containing gas, e.g. flue gas 1250 (where this step is also referred to as bicarbonate charging). The flue gas 1250 may be contacted with the water in the first reactor 1210 through a sparger/bubbler 1280. The water is agitated with agitator 1260 to facilitate the dissolution of the magnesium ion source and to facilitate contact of the initial water with the $CO_2$ containing gas. In some cases, before the $CO_2$ charged acidic water is transferred to the second reactor 1220, agitation of the $CO_2$ charged acidic water is stopped, such that undissolved solids may settle by gravity. The $CO_2$ charged acidic water is then transferred through conduit 1270 from the first reactor 1210 to the second reactor 1220.

After transferring the $CO_2$ charged acidic water to the second reactor 1220, the step of carbonate precipitation may be performed. In some cases, a pH raising agent 1290 is contacted with the water in the second reactor 1220 to facilitate formation of the carbonate containing precipitate. The contents of the second reactor 1220 may be agitated with agitator 1295. In certain embodiments, one or more additional steps of $CO_2$ charging and subsequent carbonate precipitation may be performed in the second reactor, as described above. In these cases, additional $CO_2$ containing gas, e.g. flue gas 1255, is contacted with the water in the second reactor 520 through sparger/bubbler 1285. The resulting slurry product includes the precipitated $CO_2$ sequestering product and mother liquor, which is then forwarded to a water/solids separator or settling tank, as described above.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXPERIMENTAL

Example I

Precipitation of P00099

A. P00099 Precipitation Process

The following protocol was used to produce the P00099 precipitate. 380 L of filtered seawater was pumped into a cylindrical polyethylene 60°-cone bottom graduated tank. This reaction tank was an open system, left exposed to the ambient atmosphere. The reaction tank was constantly stirred using an overhead mixer. pH, room temperature, and water temperature were constantly monitored throughout the reaction.

25 g of granulated (Ca,Mg)O (a.k.a., dolime or calcined dolomite) was mixed into the seawater. Dolime that settled to the bottom of the tank was manually re-circulated from the bottom of the tank through the top again, in order to facilitate adequate mixing and dissolution of reactants. A second addition of 25 g of dolime was performed in an identical manner, including a manual recirculation of settled reactant. When the pH of the water reached 9.2, a gas mixture of 10% $CO_2$ (and 90% compressed air) was slowly diffused through a ceramic airstone into solution. When the pH of the solution fell to 9.0, another 25 g addition of dolime was added to the reaction tank, which caused the pH to rise again. The additions of dolime were repeated whenever the pH of the solution dropped to 9.0 (or below), until a total of 225 g were added. A manual recirculation of settled reactant was performed in between each dolime addition.

After the final addition of dolime, the continuous diffusion of gas through the solution was stopped. The reaction was stirred for an additional 2 hours. During this time, the pH continued to rise. To maintain a pH between 9.0 and 9.2, additional gas was diffused through the reaction when the pH rose above 9.2 until it reached 9.0. Manual re-circulations of settled reactant were also performed 4 times throughout this 2 hour period.

2 hours after the final addition of dolime, stirring, gas diffusion and recirculation of settled reactant was stopped. The reaction tank was left undisturbed for 15 hours (open to the atmosphere).

After the 15 hour period, supernatant was removed through the top of the reaction tank using a submersible pump. The remaining mixture was removed through the bottom of the tank. The collected mixture was allowed to settle for 2 hours. After settling, the supernatant was decanted. The remaining slurry was vacuum filtered through 11 µm pore size filter paper, in a Büchner funnel. The collected filter cake was placed into a Pyrex dish and baked at 110° C. for 24 hours.

The dried product was ground in a ball mix and fractioned by size through a series of sieves to produce the P00099 precipitate.

B. Materials Analysis

Of the different sieve fractions collected, only the fraction containing particles retained on the 38 µm-opening sieve and passing through the 75 µm-opening sieve was used.

1. Chemical Characteristics

The P00099 precipitate used for the blend were analyzed for elemental composition using XRF. Results for the main elements are reported for the QUIKRETE™ type I/II Portland cement used in this blend as well as for the P00099 precipitate. In Table 4, below.

TABLE 4

Table 4: XRF analysis of the type I/II portland cement and P00099-002 used in this blend

| Sample | $Na_2O$ % | MgO % | $Al_2O_3$ % | $SiO_2$ % | $P_2O_5$ ppm | $SO_3$ % | Cl % | $K_2O$ % | CaO % | $Fe_2O_3$ % | Sr ppm | $CO_3$ % diff. |
|---|---|---|---|---|---|---|---|---|---|---|---|---|
| OPC1 | 2.15 | 1.95 | 4.32 | 20.31 | 2336 | 2.54 | 0.072 | 0.36 | 62.88 | 3.88 | 1099 | 0.002 |
| P00099 | 1.36 | 3.44 | 0.14 | 0.083 | 462 | 0.65 | 1.123 | 0.04 | 45.75 | 0.12 | 3589 | 46.82 |

The XRD analysis of this precipitate indicates the presence of aragonite and magnesium calcite (composition close to $Mg_{0.1}Ca_{0.9}CO_3$) and in minor amounts, brucite and halite (Table 5). The FT-IR analysis of the P00099 precipitate confirmed the presence of aragonite, calcite and brucite.

TABLE 5

| Sample | Aragonite | Magnesium Calcite | Brucite | Halite |
|---|---|---|---|---|
| P00099 | 79.9 | 17.1 | 2.8 | 0.2 |

The total inorganic carbon content measured by coulometry is in fair agreement with the same value derived from the XRD Rietveld estimated composition coupled with XRF elemental composition. Table 6 provides a coulometric analysis of P00099 compared to % C derived from XRD/XRF data

TABLE 6

| Total C from coulometry | Total C derived from other analytical data |
|---|---|
| 10.93 ± 0.16% | 11.5% |

2. Physical Characteristics

SEM observations on the precipitate confirmed the dominance of aragonite (needle-like) as well as the size of the particle agglomerates. The determined BET specific surface areas ("SSA") of the Portland cement and the P00099 precipitate are given in Table 7.

TABLE 7

| Type I/II Quikrete Portland cement | P00099 |
|---|---|
| 1.18 ± 0.04 m$^2$/g | 8.31 ± 0.04 m$^2$/g |

The particle size distribution was determined after 2 min of pre-sonication to dissociate the agglomerated particles.

Example II

Use of Fly Ash as an Alakali Source

A. Methods 500 mL of seawater (initial pH=8.01) was continuously stirred in a glass beaker using a magnetic stir bar. The pH and temperature of the reaction was continuously monitored. Class F fly ash (~10% CaO) was incrementally added as a powder, allowing the pH to equilibrate in between additions.

B. Results and Observations:

(Amounts of fly ash listed are the cumulative totals, i.e. the total amount added at that point in the experiment.)
After the additions of 5.00 g of fly ash the pH reached 9.00.
34.14 g-->9.50
168.89 g-->9.76
219.47 g-->10.94
254.13 g-->11.20
300.87 g-->11.28

Much more fly ash was needed to raise the pH of the seawater than distilled water. The initial pH raise (8 to 9) required much less fly ash than the further raises. The pH remained fairly stable around 9.7 for much of the reaction. The rate of rate of pH increase went up after ~10. Also of note was an initial drop in pH when the fly ash was added. This drop in pH is quickly overcome by the effects of the calcium hydroxide. SEM images of vacuum dried slurry from the reaction showed some spheres of the fly ash that had partially dissolved. The remaining spheres also seemed to be embedded in a possibly cementitious material.

C. Conclusions

In fresh (distilled) water, it was found that small amounts of class F fly ash (<1 g/L) immediately raised the pH from 7 (neutral) to ~11. The small amount necessary to raise the pH is most likely due to the unbuffered nature of nature of distilled water. Seawater is highly buffered by the carbonate system, and thus it took much more fly ash to raise the pH to similar levels.

Example III

Production of High Yields

A. Process 1

A 20% $CO_2$/80% Air gas mixture was sparged into 1 L of seawater until a pH<5 was reached. Once reached, 1.0 g of $Mg(OH)_2$ was added to the 1 L of carbonic acid/seawater solution. The 20/80 gas mixture continued to be sparged for 20 minutes to ensure maximal dissolution of the $Mg(OH)_2$ and gases. After dissolution, sparging was stopped and 2M NaOH was added until a pH of 9.8 was reached. Sparging of the 20/80 gas was resumed until a pH of 8.5 was reached. 2M NaOH and counter-additions of the 20/80 gas were continued maintaining a pH range between 8.5 and 9.8 until a total of 200 ml of 2M NaOH was added. A yield of 6.91 g was observed having a Coulometer reading of 10.6% carbon (~80% carbonate).

B. Process 2

A 20% $CO_2$/80% Air gas mixture was sparged into 1 L of seawater until a pH<5 was reached. Once reached, 2.69 g of $Mg(OH)_2$ was added to the 1 L of carbonic acid/seawater solution. The 20/80 gas mixture continued to be sparged for 20 minutes to ensure maximal dissolution of the $Mg(OH)_2$ and gases. After dissolution, sparging was stopped and 2M NaOH was added until a pH of 9.8 was reached. Sparging of the 20/80 gas was resumed until a pH of 8.5 was reached. 2M NaOH and counter-additions of the 20/80 gas were continued maintaining a pH range between 8.5 and 9.8 until a total of 200 ml of 2M NaOH was added. A yield of 10.24 g was observed having a Coulometer reading of 9.7% carbon (~75% carbonate).

Figure 13A:
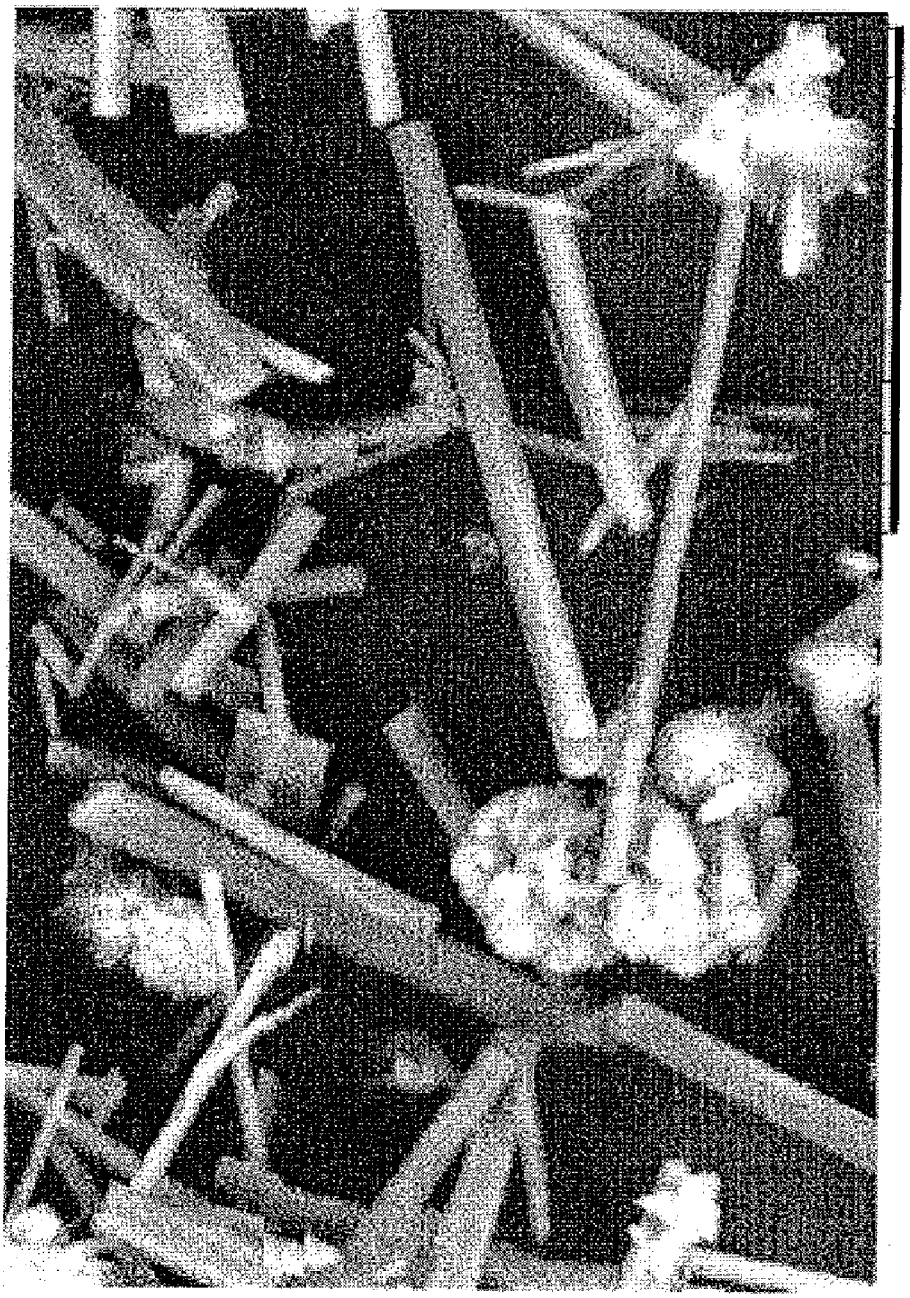
FIGS. 13A and 13B provide pictures of precipitate of the invention.
Figure 13B:
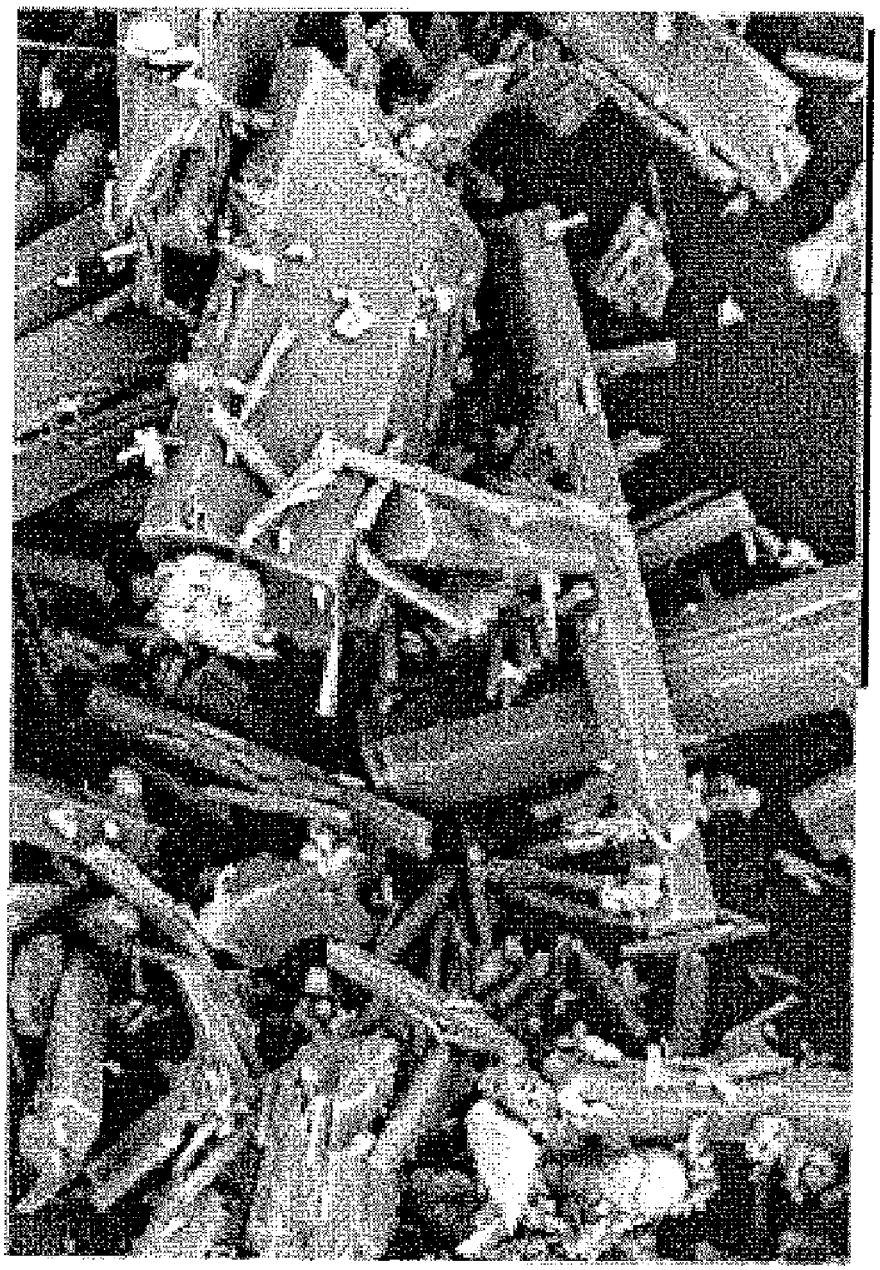

SEM, EDS, and X-Ray Diffraction of the precipitated carbonates showed amorphous and crystalline Ca and Mg carbonates, and also the presence of Ca/Mg carbonates. Pictures of the precipitates are provided in FIGS. 13A and 13B.

C. Process 3

Figure 14:
FIG. 14 provides a picture of amorphous precipitate of the invention.

$CO_2$ was sparged into 1 L seawater until a pH 7 or lower was reached. 0 to 5.0 g Mg ion supplement referred to as "Moss Mag" and obtained from Calera Corporation's Moss Landing site (which is the former site of the Kaiser Aluminum & Chemical Corporation and National Refractorie in Moss Landing Calif., where the supplement is Mg rich waste product found in tailings ponds of the site) was added while mixing and continuing to sparge $CO_2$. 0.175 ppm $Al_2(SO4)_3$ was added. $CO_2$ was continued to be sparged and base was added while maintaining a pH between 7 and 8 ending at a pH of 7. Sparging of $CO_2$ was stopped and base was added until a pH between 9.0 and 10.4 was reached. As shown in FIG. 14, the above reaction conditions favour the formation of amorphous carbonate compound precipitates. The resultant amorphous precipitate product is readily spray dried to produce a dry product.

D. Process 4

As shown in FIGS. 12A, 12B and 12C, in certain embodiments, a multi-step, multi-reactor process is used to carry out the methods disclosed herein. In the first reactor, a magnesium ion source obtained from a Moss Landing, Calif. site (hereinafter referred to as Moss Mag), was put into solution using carbonic acid and agitation. The pH of the seawater in the first reactor was maintained a pH of 7.0 or less during Moss Mag dissolution. In certain embodiments, 1.0 gram of 50-150 µm Moss Mag was dissolved into solution per 1 L of seawater. A pH of 6.2-6.6 or a hardness reading >0.08 grams/liter indicated that the appropriate amount of Moss Mag was dissolved in solution. A source of $CO_2$, e.g. flue gas, was sparged into the water in the first reactor. About 40-50% of the total flue gas consumed during the entire reaction is dissolved into the seawater in this step. Flue gas was sparged until the pH no longer responded to flue gas dissolution which took approximately 30-60 minutes. Agitation was stopped to allow unreacted Moss Mag, sand or other large particles to gravity settle before transferring the $CO_2$ charged acidic water from the first reactor to the second reactor.

The $CO_2$ charged acidic water was then transferred from the first reactor to the second reactor. The second reactor was used for both nucleation site generation and crystal growth. After transferring the solution from the first reactor to the second reactor, the following steps were performed:

1. 50% NaOH was added until a pH of 9.5 was reached. For example, for a 1000 gallon reaction, about 20-25 kg of 50% NaOH was added using a dosing pump capable of pumping 5-25 ml/sec of 50% NaOH. After reaching a pH of 9.5, the addition of 50% NaOH was stopped.
2. A $CO_2$ source including a mixture of 20% $CO_2$/80% compressed air was sparged into the second reactor until a pH of 8.5 was reached. After reaching a pH of 8.5, the sparging of the $CO_2$ was stopped.
3. Alternating steps of adding 50% NaOH into the reactor to raise the pH and sparging $CO_2$ to lower the pH were performed. The pH was maintained between 8.5-9.8 during the alternate addition of the 50% NaOH and sparging of $CO_2$. Alternate dosing of 50% NaOH and sparging of $CO_2$ was continued until a total of 90 kg (i.e., 65-70 kg in this step+20-25 kg from the first step) of 50% NaOH was added to the reactor.
4. The final pH after the last addition of 50% NaOH was between 9.6-9.8.
5. Agitation was stopped and the precipitate was allowed to gravity settle overnight and then water/solids separation was performed. Alternatively, after agitation was stopped, the precipitate was allowed to gravity settle for 15 minutes and then accelerated water/solids separation was performed. Precipitate was maintained at a temperature below 50° C.

Resulting yields ranged from 30-50 lbs of precipitate per 1000 gallon reactor and depended on Mg ion dissolution and total hardness prior to precipitation.

Example IV $CO_2$ Absorption

A. Process 1

In this example, absorption of carbon dioxide on the laboratory-scale is described. 4.00 L of seawater was magnetically stirred while 100% $CO_2$ was heavily sparged through the solution for 19 minutes where the pH reached a minimum of 4.89. To this solution, 32.00 g of jet milled $Mg(OH)_2$ was added over a period of 2 minutes. Simultaneously, $CO_2$ was continuously added for a total of 18 minutes to maintain a pH between 7.90 and 8.00 as $Mg(OH)_2$ dissolved. Next, 100.00 mL of 2 M NaOH was added over a period of 5 minutes while the pH was maintained between 8.00 and 8.10 by addition of $CO_2$. To facilitate precipitation, 275 mL of 2 M NaOH was added over a period of 5 minutes and the resultant solution was stirred for an additional 52 minutes. The slurry was vacuum filtered and dried in an oven at 50° C. for 22 hours to recover 19.5 g of calcium and magnesium carbonates (primarily aragonite and nesquehonite, respectively) per 1 L of initial seawater solution.

B. Process 2

In this example, absorption of carbon dioxide on the laboratory-scale is described. A 100-gallon cone-bottomed plastic reaction vessel was filled with 100 gallons (380 L) of seawater, which was stirred throughout the entire process with an overhead stirrer (Portable Mixer w/Shaft, 2-4" SS Propeller Blades (1-push, 1-pull), and Mounting Frame). The first step was to sparge the solution with $CO_2$ concentrated at 20% $CO_2$ and 80% Compressed Air, with a flow rate of 25 scfh. Equilibrium was determined by the stabilization of the solution pH. The second step was to add 2.70 g/L of $Mg(OH)_2$ (1.02 kg) with heavy mixing. To further facilitate the dissolution of $Mg(OH)_2$, $CO_2$ was sparged through the solution. The third step was to add a solution of 50 wt % NaOH until a pH of 9.8 was reached, followed by additional $CO_2$ sparging to lower the pH to 8.0. These last two steps of an addition of 50 wt % NaOH to a pH of 9.8 and $CO_2$ sparging to a pH of 8.0 was repeated until a total of 16.0 kg of 50 wt % NaOH had been added to the solution, where the final addition of NaOH was used to reach a pH of 10.0. The precipitate was separated and collected from the solution in a yield of 10.24 g/L of calcium carbonate and magnesium carbonate hydrates.

C. Process 3

Figure 15:
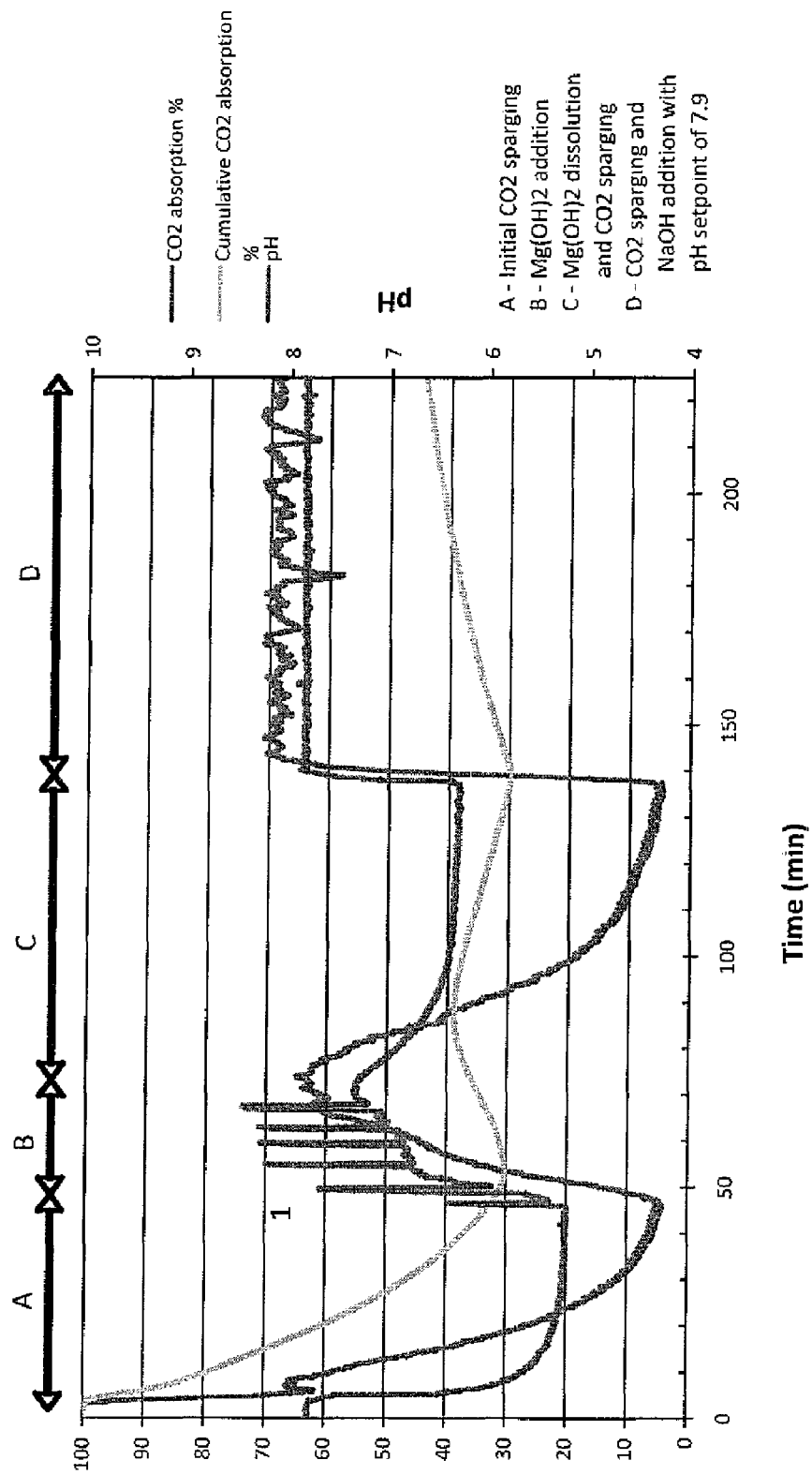
FIG. 15 provides graphical results of a $CO_2$ absorption experiment reported in the Experimental Section, below.

In this example, absorption of carbon dioxide on the laboratory-scale is described. A 100-gallon cone-bottomed plastic reaction vessel was filled with 100 gallons (380 L) of seawater, which was stirred throughout the entire process with an overhead stirrer. The first step was to sparge the solution with $CO_2$ concentrated at 20% by volume at a flow rate of 100 scfm (standard cubic feet per minute). Equilibrium was determined when the concentration of $CO_2$ in the vessel headspace approached that of the inlet gas. The calculated absorption of $CO_2$ during this step was understandably low. The second step was to slowly add 379 g of $Mg(OH)_2$ to avoid a sharp increase in pH which would favor the undesired carbonate precipitation. To further facilitate the dissolution of $Mg(OH)_2$, $CO_2$ was sparged through the solution to an end pH of 6.3. The final step was to continuously capture $CO_2$ in the solution. Over the course of 3.5 hours, 4.9 kg of NaOH was added to balance the pH at 7.9 while $CO_2$ was sparged and reacted to form bicarbonate ions. The calculated absorption of $CO_2$ during this step was between 68% and 70%. Results are provided in FIG. 15 which shows the evolution of pH and $CO_2$ absorption (instantaneous and cumulative). Artifacts at point 1 in the pH plot were from removal of the pH probe to add $Mg(OH)_2$.

D. Process 4

In this example, absorption of carbon dioxide on the industrial-scale is described. A 1000-gallon reaction vessel was filled with 900 gallons (3400 L) of seawater, which was stirred throughout the entire process. The first step was to load the solution with 3.3 kg $Mg(OH)_2$, which increases both the pH and the magnesium content. Next, 10% by volume $CO_2$ was sparged and the pH of 7.9 was maintained by a continuous addition of NaOH up to 30 kg. The total duration of these steps was 5-6 hours. A final charge of 38 kg NaOH was added to increase the pH so that carbonates would form and precipitate. The duration of this step was 10-20 minutes. The solution was stirred for 1 hour more to allow further precipitation. The reaction was allowed to settle overnight. The solution was decanted and the solid product was recovered by either filter press or vacuum filtration. Additionally, the solution could be rinsed after the decant process; whereby water was added and the sample was filter pressed. Alternatively, water was added after initial vacuum filtration, stirred, and filtered again. Finally, the product was spray dried. The overall yield was 5-7 g/L of the original solution.

Example V

High Yield Dissolution of Mafic Mineral in HCl

In this example, the dissolution of olivine and subsequent use to precipitate $CO_2$ is described. A solution of 10% HCl (475.66 g) was used to dissolve olivine (10.01 g, particle size ~5.8 μm) at 50° C. After the solution was stirred for 10 hours and allowed to sit for 9 hours to provide a $Mg^{2+}_{(aq)}$ concentration of 0.2491 mol/L, it was vacuum filtered hot to recover 404.52 g filtrate. Over the period of 1 hour, 15.01 g $NaOH_{(s)}$ and 5.23 g $NaOH_{(aq)}$ (in a 50 wt % solution) were used to neutralize the solution. Simultaneously, 100% $CO_2$ was heavily sparged through the mixture to provide a final pH of 8.9 where precipitate formed. The slurry was vacuum filtered and dried at 50° C. for 17 hours to yield 19.26 g which contained $MgCO_3.H_2O$, NaCl, an Fe-based compound and a Si-based compound.

Example VI

Electrochemistry

Exemplary results achieved in accordance with the present bi-electrode system are summarized in Table 8 below.

TABLE 8

| Low Energy Electrochemical Bi-electrode Method and System | | | | | |
|---|---|---|---|---|---|
| V across Electrodes | Time (min) | Initial pH at Anode | End pH at Anode | Initial pH at Cathode | End pH at Cathode |
| 0.45 V 0.30 V in the | 30 | 4.994 | 5.204 | 7.801 | 7.431 |

TABLE 8-continued

Low Energy Electrochemical Bi-electrode Method and System

| V across Electrodes | Time (min) | Initial pH at Anode | End pH at Anode | Initial pH at Cathode | End pH at Cathode |
|---|---|---|---|---|---|
| 1$^{st}$, and 0.15 V in the 2$^{nd}$ compartment | | | | | |

In this example, an electrochemistry system for de-protonating seawater that has been charged with $CO_2$ is described. The cell that was used consisted of two 1-liter compartments separated by a palladium foil. The first compartment was charged with $CO_2$ until a pH of 4.994 was achieved. A sacrificial tin anode was placed into the first compartment, and the tin electrode and palladium membrane were held under galvanostatic control at 100 nA/cm$^2$, which represented a voltage of 0.30V. The second compartment consisted of a tin electrode and $SnCl_2$ dissolved in seawater. The palladium membrane and tin electrode in the second compartment where held at 0.15V. The system was run for 30 minutes and as set forth in Table 8, the system showed an increase in pH in the first electrolyte, and a decrease in pH in the second electrolyte.

Exemplary results achieved in accordance with the present ionic membrane system are summarized in Table 9 below.

TABLE 9

Low Energy Electrochemical Ion Exchange System and Method

| Volt across Electrodes | Time (sec) | Initial pH at Anode | End pH at Anode | Initial pH at Cathode | End pH at Cathode |
|---|---|---|---|---|---|
| 0.6 V | 2000 | 6.7 | 3.8 | 6.8 | 10.8 |
| 1.0 V | 2000 | 6.6 | 3.5 | 6.8 | 11.1 |

In this example, an electrochemical cell for producing NaOH and HCl at a low operating voltage utilizing an ion exchange membrane positioned between an anode and a cathode is described. The cell that was used consisted of two 250 mL compartments that were separated by an anionic exchange membrane (PC-SA-250-250 (PCT GmbH of Germany)). In both compartments 0.5M NaCl in a 18 MΩ aqueous solution was used. Both the anode and cathode were constructed from a 10 cm×5 cm, 45 mesh Pt gauze. The anode compartment had $H_2$ gas sparged under the Pt electrode, and the two electrodes were held at a bias of 0.6 V and 1.0 V for 2000 seconds. As set forth in Table 9, the two tests achieved a significant increase in the pH in the cathode compartment, and a decrease pH in the anode compartment.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any design features developed that perform the same function, regardless of structure. The scope of the present invention, therefore, is not intended to be limited to the exemplary embodiments shown and described herein. Rather, the scope and spirit of present invention is embodied by the appended claims.

That which is claimed is:

1. A method, comprising:
    treating at least a portion of flue gas emitted from a cement plant, wherein said flue gas comprises carbon dioxide, with a proton removing agent to produce a solution comprising carbonate ions;
    treating said solution with alkaline-earth-metal-ions to produce a carbonate precipitate comprising metastable compound selected from the group consisting of vaterite, amorphous calcium carbonate, and combination thereof, under one or more of precipitation conditions comprising precipitation facilitator, pH, temperature, additive, ion ratio, rate of precipitation, mixing rate, presence of seed crystals, catalysts, membranes or substrates, batch or continuous protocol, or combination thereof; and
    producing a building material directly from at least a portion of said precipitate, wherein said building material is a cement composition comprising metastable compound selected from the group consisting of vaterite, amorphous calcium carbonate, and combination thereof.

2. The method of claim 1, further comprising dewatering said precipitate to produce a slurry comprising said precipitate.

3. The method of claim 1, wherein said precipitate comprises calcium carbonate, magnesium carbonate, calcium magnesium carbonate, or combination thereof.

4. The method of claim 1, wherein said precipitate further comprises strontium in an amount ranging from 3 to 10,000 ppm.

5. The method of claim 1, wherein said alkaline-earth-metal-ions are obtained from a mineral selected from the group consisting of serpentine, olivine, and combination thereof.

6. The method of claim 1, wherein said solution further comprises bicarbonate ions.

7. The method of claim 1, wherein said proton removing agent raises a pH of said solution to 9.5 or higher.

8. The method of claim 1, wherein said building material is selected from the group consisting of hydraulic cement, aggregate, supplemental cementitious material, and combination thereof.

9. The method of claim 1, wherein said proton removing agent is selected from the group consisting of oxide, hydroxide, carbonate, mineral, cement kiln dust, ash, natural body of alkaline water, slag, and combination thereof.

10. The method of claim 9, wherein said hydroxide is made using an electrochemical process.

11. The method of claim 1, wherein said alkaline-earth-metal-ions are obtained from saltwater or fresh water.

12. The method of claim 11, wherein said saltwater is brackish water, sea water, or brine.

* * * * *